United States Patent
Suh et al.

(10) Patent No.: US 9,066,146 B2
(45) Date of Patent: Jun. 23, 2015

(54) ELECTRONIC DEVICE AND METHOD FOR PROVIDING INFORMATION RELATED TO BROADCAST VIEWING

(71) Applicant: LG ELECTRONICS INC., Seoul (KR)

(72) Inventors: Mongwon Suh, Pyeongtaek-si (KR); Hyesook Ha, Pyeongtaek-si (KR); Juyoung Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/676,908

(22) Filed: Nov. 14, 2012

(65) Prior Publication Data

US 2013/0125172 A1  May 16, 2013

Related U.S. Application Data

(60) Provisional application No. 61/560,239, filed on Nov. 15, 2011.

(30) Foreign Application Priority Data

Jan. 9, 2012 (KR) .................... 10-2012-0002688
Jan. 9, 2012 (KR) .................... 10-2012-0002689

(51) Int. Cl.
| | |
|---|---|
| G06F 3/00 | (2006.01) |
| G06F 13/00 | (2006.01) |
| H04N 5/445 | (2011.01) |
| H04N 21/4788 | (2011.01) |
| H04L 12/58 | (2006.01) |
| H04N 21/433 | (2011.01) |
| H04N 21/462 | (2011.01) |
| H04N 21/475 | (2011.01) |

(52) U.S. Cl.
CPC ............ *H04N 21/4788* (2013.01); *H04L 51/32* (2013.01); *H04N 21/4334* (2013.01); *H04N 21/4622* (2013.01); *H04N 21/4753* (2013.01); *H04N 21/4756* (2013.01)

(58) Field of Classification Search
None
See application file for complete search history.

(56) References Cited

U.S. PATENT DOCUMENTS

| | | | | |
|---|---|---|---|---|
| 2002/0112239 | A1* | 8/2002 | Goldman | 725/46 |
| 2005/0204383 | A1* | 9/2005 | Boulanger | 725/40 |
| 2006/0174277 | A1* | 8/2006 | Sezan et al. | 725/46 |

(Continued)

FOREIGN PATENT DOCUMENTS

| | | |
|---|---|---|
| CN | 101001235 A | 7/2007 |
| EP | 2 276 240 A2 | 1/2011 |

(Continued)

OTHER PUBLICATIONS

European Search Report dated Feb. 8, 2013 for Application 12007563.5.

(Continued)

*Primary Examiner* — Oschta Montoya
(74) *Attorney, Agent, or Firm* — KED & Associates LLP

(57) ABSTRACT

An electronic device and a method for providing view information are disclosed. A controller controls a request for broadcast rank to a relay server. A network interface receives a display page transmitted as a response to the request for broadcast rank. A display displays the received display page. The display page includes at least one feed associated with a real-time broadcast program and one of the at least one feed includes the number of users who view an associated real-time broadcast program.

11 Claims, 45 Drawing Sheets

(56) References Cited

U.S. PATENT DOCUMENTS

| | | | |
|---|---|---|---|
| 2008/0276279 A1* | 11/2008 | Gossweiler et al. | 725/46 |
| 2009/0083417 A1* | 3/2009 | Hughes et al. | 709/224 |
| 2009/0100469 A1 | 4/2009 | Conradt et al. | |
| 2009/0133081 A1 | 5/2009 | Sakai et al. | |
| 2009/0271820 A1* | 10/2009 | Choi et al. | 725/37 |
| 2009/0293079 A1* | 11/2009 | McKee et al. | 725/10 |
| 2011/0119595 A1* | 5/2011 | Bydeley et al. | 715/738 |
| 2012/0174157 A1* | 7/2012 | Stinson et al. | 725/40 |
| 2013/0117773 A1* | 5/2013 | Davies | 725/14 |

FOREIGN PATENT DOCUMENTS

| | | |
|---|---|---|
| EP | 2 276 253 A2 | 1/2011 |
| GB | 2479947 A | 11/2011 |

OTHER PUBLICATIONS

Mitchell et al., "Social TV: Toward Content Navigation Using Social Awareness," Proceedings of the 8$^{th}$ International Interactive Conference on Interactive TV & Video, EUROITV '10 (Jan. 1, 2010); pp. 283-291.

* cited by examiner

FIG. 24
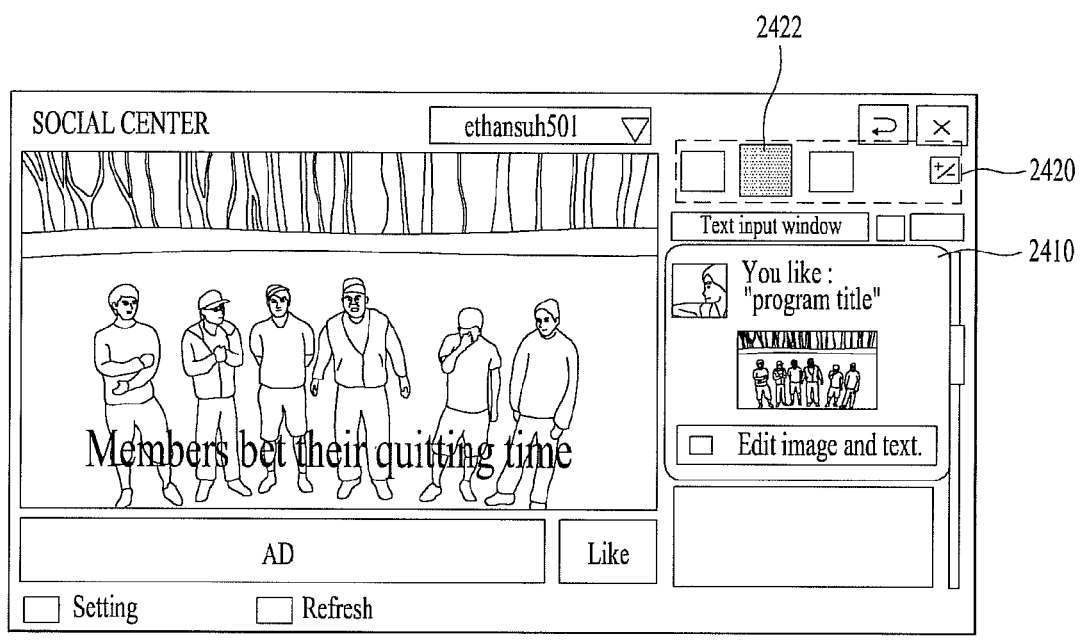
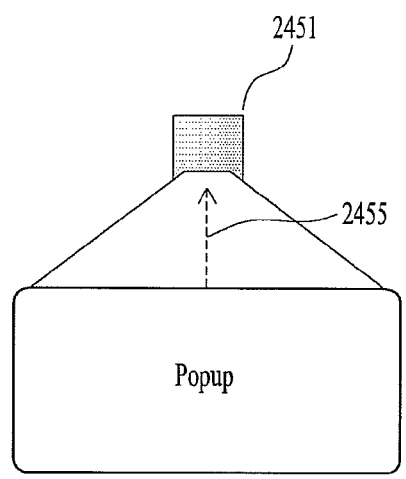

ELECTRONIC DEVICE AND METHOD FOR PROVIDING INFORMATION RELATED TO BROADCAST VIEWING

CROSS-REFERENCE TO RELATED APPLICATION(S)

This application claims the benefit of U.S. Provisional Application No. 61/560,239, filed on Nov. 15, 2011, Korean Application No. 10-2012-0002688, filed on Jan. 9, 2012, and Korean Application No. 10-2012-0002689, filed on Jan. 9, 2012, which are hereby incorporated by reference in their entirety.

BACKGROUND

1. Field

The present invention relates to an electronic device and a method for providing view information, and more particularly, to an electronic device and a method for providing view information based on a social networking service.

2. Background

A broadcast receiver refers to a device having a function of receiving and processing broadcast images so that users can view. The broadcast receiver displays, for example, a broadcast selected by a user from among broadcast signals broadcast from a broadcast station on a display. Current analog broadcasting is being transitioned into digital broadcasting all over the world.

Digital broadcasting refers to a broadcasting service which broadcasts digital images and audio signals. Digital broadcasting has low data loss due to robustness against external noise, advantageous error correction, high resolution, and high definition, as compared with analog broadcasting. In addition, digital broadcasting is able to provide a bidirectional service, in contrast to analog broadcasting.

In addition to a function for providing digital broadcasting, the broadcast receiver may also provide a Social Networking Service (SNS). SNS refers to a service which generates relations among other people online and is a concept including information sharing with one-person media such as Twitter, MySpace, and Facebook of the U.S. and Cyworld and MeToday of Korea. Currently, many people daily use SNSs to communicate with other people or share or search for information. SNS users may form new personal connections or intensify relationships with existing personal connections.

SUMMARY OF THE INVENTION

Accordingly, the present invention is directed to an electronic device and method for providing information related to broadcast viewing that substantially obviate one or more problems due to limitations and disadvantages of the related art.

An object of the present invention is to provide an electronic device which is capable of conveniently recommending and sharing content between users of a social networking environment and a method for providing a content recommendation service.

Another object of the present invention is to provide an electronic device which is capable of easily and conveniently counting and sharing a current broadcast view state between users of a social networking environment and a method for providing view information.

To achieve these objects and other advantages and in accordance with the purpose of the invention, as embodied and broadly described herein, a method for providing a content recommendation service between users of a social networking environment may include detecting a user action for requesting content recommendation, extracting content information about content displayed on a screen in response to the detected user action, generating a content post request message including the extracted content information and identification (ID) information, and transmitting the generated content post request message to an electronic device or a server.

The ID information may include at least one of a user identifier, a session identifier for identifying a session with an SNS server, or a session identifier secret. The session identifier may include at least one of a session ID, a token, or a cookie.

The method for providing a content recommendation service may further include checking whether a user has logged in to the SNS server in response to the detected user action.

The method for providing a content recommendation service may further include displaying a message for requesting login to an SNS server in response to the detected user action, generating a login request message including login information which is input through the message, and transmitting the generated login request message to the server.

The method for providing a content recommendation service may further include checking whether a user has logged in to the electronic device in response to the detected user action.

The method for providing a content recommendation service may further include receiving feed data for displaying a feed associated with the content post request message from an SNS server and displaying the feed using the feed data.

The displayed content may include at least one of text, image content, audio content, video content, a real-time broadcast program, or an application.

The display content may be displayed on a webpage.

The method for providing a content recommendation service may further include capturing at least part of an image of the displayed content in response to the detected user action and the content post request message may further include the captured image.

The method for providing a content recommendation service may further include recording part of the displayed content in response to the detected user action, and the content post request message may further include the recorded part. The recording may include storing image frames of the displayed content in a memory, detecting a user action for requesting recording stop, stopping storing the image frames in response to the user action, and generating a media file including at least part of the stored image frames.

The method for providing a content recommendation service may further include displaying a content recommendation confirmation message including at least part of the extracted content information, detecting a user action for requesting editing, and displaying a Graphical User Interface (GUI) for editing in response to the user action. The content post request message may further include information input through the GUI.

If a preset time has elapsed after the GUI is displayed, the content post request message may be automatically moved to a menu object for displaying a display page including an associated feed and may then disappear.

In another aspect of the present invention, an electronic device for providing a content recommendation service between users of a social networking environment may include a controller for detecting a user action for requesting content recommendation, extracting content information about content displayed on a screen in response to the detected user action, and generating a content post request message including the extracted content information and ID information, and a network interface for transmitting the generated content post request message to an electronic device or a server.

The electronic device may further include a tuner for receiving the content.

In still another aspect of the present invention, a method for providing a content recommendation service between users of a social networking environment may include receiving a content post request message including content information of content recommended by a user's an electronic device and ID information, obtaining an address of an SNS server based on the ID information, and transmitting at least part of the content information included in the received content post request message.

The method for providing a content recommendation service may further include assigning a metadata ID to the content information and storing the content information. The transmission of at least part of the content information may further include transmitting the metadata ID.

In a further aspect of the present invention, a method for providing view information between users of a social networking environment may include receiving feed data for displaying at least one feed associated with a real-time broadcast program, wherein one of the at least one feed includes the number of users who view an associated real-time broadcast program and displaying the at least one feed on a screen.

The feed may further include a list of users who recommend the associated real-time broadcast program. The list of the users includes at least one of photos of the users or SNS accounts of the users. The method for providing view information may further include detecting a user action for selecting a user included in the list of the users and connecting with an SNS account of the selected user in response to the detected user action.

The feed may further include broadcast information about the associated real-time broadcast program. The broadcast information may include at least one of a channel name, a major channel number, a minor channel number, a broadcast program name, a broadcast start time, or a broadcast end time.

The at least one feed may be displayed through arrangement based on the number of users.

The method for providing view information may further include detecting a user action for selecting one of the at least one displayed feed, switching to a channel for receiving a real-time broadcast program associated with the selected feed in response to the detected user action, and displaying the real-time broadcast program received through the switched channel on the screen.

The screen may include a region for displaying a real-time broadcast program and a region for displaying a display page including the at least one displayed feed.

The number of the users may be the number of users of a social networking environment who view a real-time broadcast associated with the feed in one country.

The method for providing view information may further include transmitting broadcast information for a displayed real-time broadcast program to a server. The broadcast information may be transmitted when the real-time broadcast program is displayed for a preset time or more. The broadcast information may include at least one of country information or region information.

In another aspect of the present invention, an electronic device for providing view information between users of a social networking environment may include a network interface for receiving feed data for displaying at least one feed associated with a real-time broadcast program, wherein one of the at least one feed includes the number of users who view an associated real-time broadcast program, a controller for controlling reception of the feed data and controlling the at least one feed to be displayed using the feed data, and a display for displaying the at least one feed.

The electronic device may further include a tuner for receiving a real-time broadcast program.

In another aspect of the present invention, a method for providing view information between users of a social networking environment may include receiving, from an electronic device of a user, broadcast information about a real-time broadcast program that the electronic device displays, calculating the number of users who view the real-time broadcast program based on the received broadcast information, generating feed data for displaying at least one feed, wherein one of the at least one feed is associated with one real-time broadcast program and includes the number of users who view the associated real-time broadcast program, and transmitting the generated feed data.

The method for providing view information may further include obtaining a list of users who recommend the real-time broadcast program, wherein one of the at least one feed includes a list of users who recommend the associated real-time broadcast program.

The method for providing view information may further include receiving a content post request message including broadcast information about the recommended real-time broadcast program and ID information from the electronic device, obtaining an SNS account from the ID information, and storing the obtained SNS account and at least part of the broadcast information in association with each other, wherein obtaining the SNS account includes accessing a storage region in which the SNS account is stored. The ID information may include at least one of a user identifier, a session identifier for identifying a session with an SNS server, or a session identifier secret. The session identifier may include at least one of a session ID, a token, or a cookie.

The electronic device and the method for providing a content recommendation service according to the present invention automatically obtain information about recommendation target content and share the obtained information through a social networking environment, so that users of the social networking environment can easily and conveniently recommend content and can easily use recommended information.

The electronic device and the method for providing view information according to the present invention automatically collect view information and share the collected view information through a social networking environment, so that users of the social networking environment can easily and conveniently collect and share a current broadcast view state.

BRIEF DESCRIPTION OF THE DRAWINGS

The embodiments will be described in detail with reference to the following drawings in which like reference numerals refer to like elements wherein:

FIG. 24 is a diagram explaining an exemplary embodiment of a process in which a content recommendation confirmation message disappears.

DETAILED DESCRIPTION

Exemplary embodiments of the present invention will be described with reference to the attached drawings.

The terms "module" and "unit" attached to describe the names of components are used herein to help the understanding of the components and thus should not be considered as having particular meanings or roles. Accordingly, the terms "module" and "unit" may be used interchangeably.

An electronic device as set forth herein is an intelligent electronic device equipped with a computer support function in addition to a broadcasting reception function, for example. Since an Internet function is added to a broadcasting reception function, the electronic device may have an interface which is more convenient than a hand-writing input device, a touch screen, a touch pad, or a remote controller. Further, because the electronic device supports wired or wireless Internet, the electronic device may include e-mail transmission/reception, Web browsing, banking, and gaming functions and the like when connected to the Internet or a computer. To implement these functions, the electronic device may operate based on a standard, general-purpose Operating System (OS).

Various applications may be freely added to or deleted from, for example, a general-purpose OS kernel of the electronic device according to the present disclosure. Therefore, the electronic device may perform a number of user-friendly functions. The electronic device may be a network TV, a Hybrid Broadcast Broadband TV (HBBTV), a smart TV, an Open Hybrid TV (OHTV), etc. and as occasion demands, is applicable to smart phones, Personal Computers (PC) and home appliances.

Embodiments of the present disclosure will be described in detail with reference to the attached drawings, but it should be understood that they are merely illustrative of the present disclosure and should not be interpreted as limiting the scope of the present disclosure.

In addition, although the terms used in the present disclosure are selected from generally known and used terms, some of the terms mentioned in the description of the present disclosure, the detailed meanings of which are described in relevant parts of the description herein, have been selected at the discretion of the applicant. Furthermore, the present disclosure must be understood, not simply by the actual terms used but by the meanings of each term lying within. Accordingly, the terms used herein should be understood not simply by the actual terms used but by the meaning lying within and the description disclosed herein.

Figure 1:
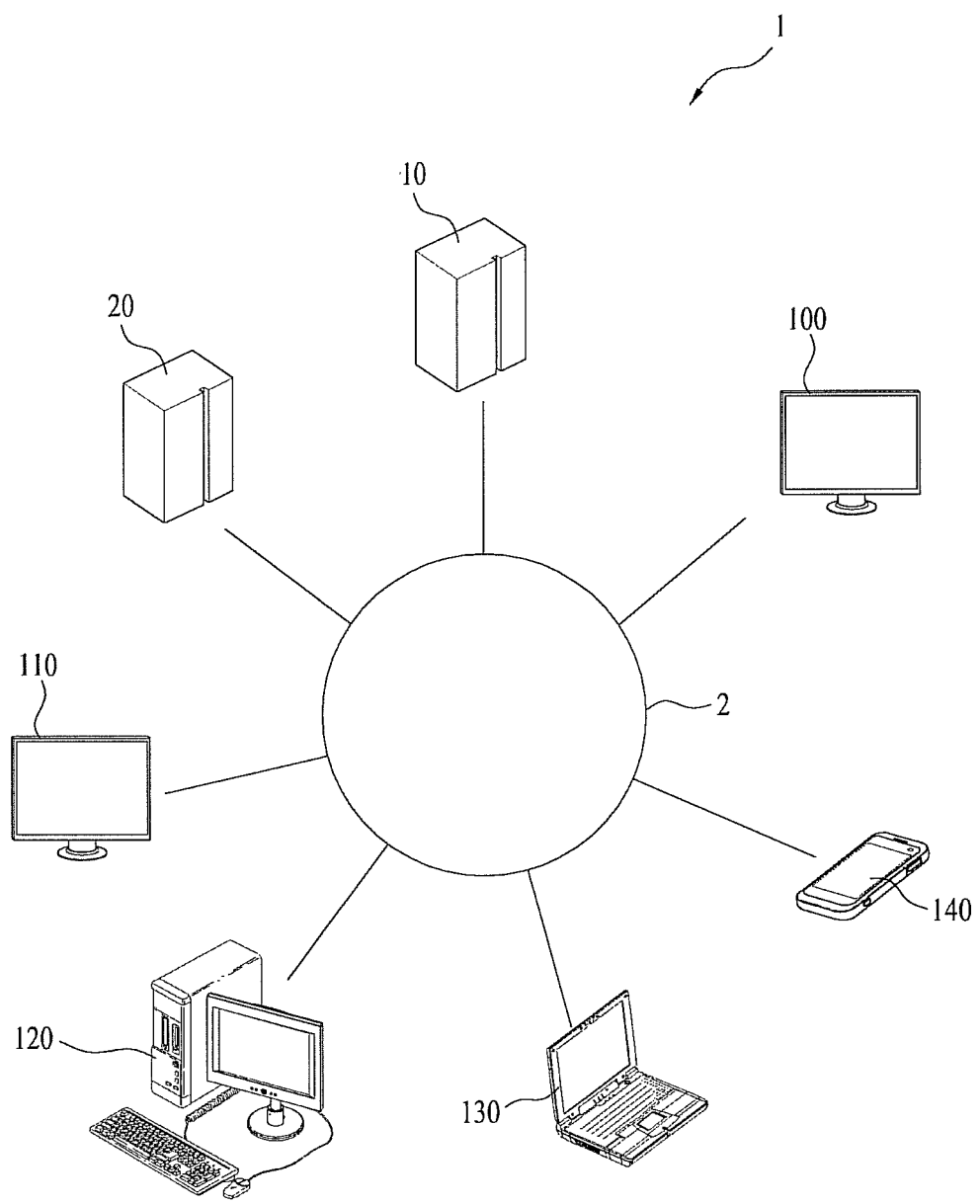
FIG. 1 is a diagram schematically illustrating the configuration of an exemplary embodiment of a social networking system according to the present invention.

FIG. 1 is a diagram schematically illustrating the configuration of an exemplary embodiment of a social networking system according to the present invention.

Referring to FIG. 1, a broadcast system 1 according to the present invention may include a first server 10, a second server 20, a first digital TV 100, a second digital TV 110, a personal computer system 120, a notebook computer 130, and a mobile terminal 140. The first server 10, the second server 20, the first digital TV 100, the second digital TV 110, personal computer system 120, the notebook computer 130, and the mobile terminal 140 may be connected to a network 2.

The network 2 may include a backbone network and a subscriber network. The backbone network may include one of an X.25 network, a frame relay network, an Asynchronous Transfer Mode (ATM) network, a Multi Protocol Label Switching (MPLS) network and a Generalized Multi Protocol Label Switching (GMPLS), or a plurality of integrated networks. The subscriber network may be a Fiber To The Home (FTTH)), an Asymmetric Digital Subscriber Line (ADSL), a cable network, a Wireless LAN (IEEE 802.11b, IEEE 802.11a, IEEE802.11g, or IEEE802.11n), a Wireless Broadband (WiBro), WiMax, and a High Speed Downlink Packet Access (HSDPA). In some embodiments, the network 2 may be an Internet network or a mobile communication network.

The first server 10 may provide a service for connecting the first digital TV 100, the second digital TV 110, the personal computer system 120, the notebook computer 130, and the mobile terminal 140 to one another. The first server 10 may be a relay server for relaying the first digital TV 100, the second digital TV 110, the personal computer system 120, the notebook computer 130, and the mobile terminal 140 to the second server 20. The first server 10 may have a fixed IP address. The first digital TV 100, the second digital TV 110, the personal computer system 120, the notebook computer 130, and the mobile terminal 140 may access the first server 10 using the fixed IP address.

The second server 20 may provide a Social Networking Service (SNS) to the first digital TV 100, the second digital TV 110, the personal computer system 120, the notebook computer 130, and the mobile terminal 140. The second server 20 may serve as an SNS server.

The first digital TV 100 and the second digital TV 110 may be network TVs, smart TVs, Hybrid Broadcast Broadband TVs (HbbTVs), 3DTVs, or Open Hybrid TVs (OHTVs). The personal computer system 120 may be a desktop computer, a laptop computer, a tablet, or a handheld computer.

The mobile terminal 140 may be a cellular phone, a smart phone, a digital broadcast terminal, a Personal Digital Assistant (PDA), a Portable Multimedia Player (PMP), or a navigation system.

The first digital TV 100, the second digital TV 110, the personal computer system 120, the notebook computer 130, and the mobile terminal 140 may receive an SNS from the second server 20. Users of the first digital TV 100, the second digital TV 110, the personal computer system 120, the notebook computer 130, and the mobile terminal 140 may be users of a social networking environment.

Figure 2:
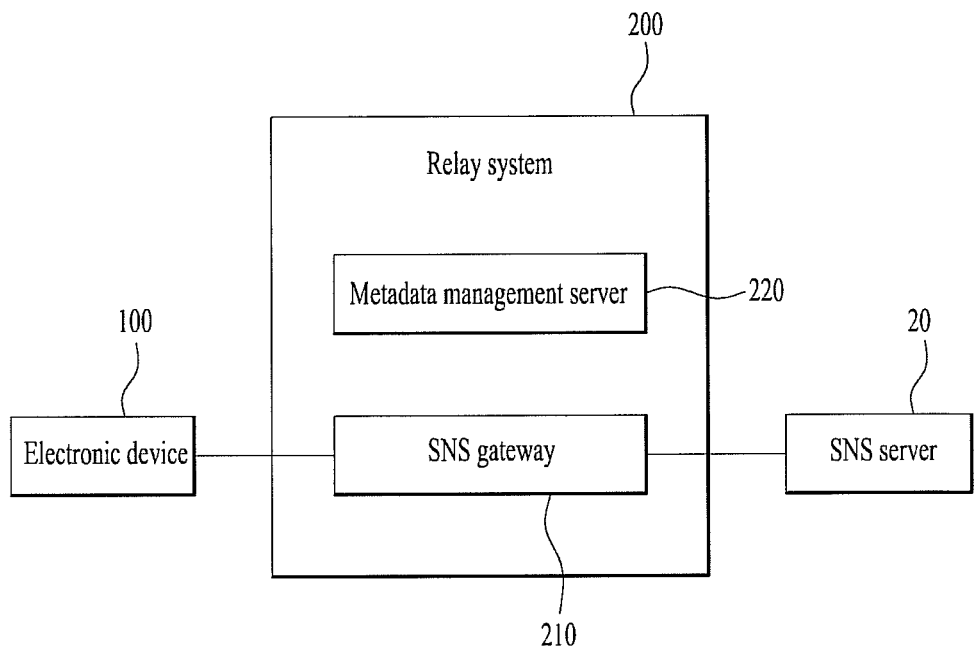
FIG. 2 is a diagram schematically illustrating the configuration of an exemplary embodiment of a relay system according to the present invention.

FIG. 2 is a diagram schematically illustrating the configuration of an exemplary embodiment of a relay system according to the present invention.

Referring to FIG. 2, a relay system 200 may be an embodiment of the first server 10. The relay system 200 may include an SNS gateway 210 and a metadata management server 220.

The metadata management server 220 stores and manages metadata. The metadata may include content information and identification (ID) information. The content information refers to information about content. The content information may include at least one of content post information or content playback information.

The content post information may include at least one of a country code, a region code, a session identifier, a session identifier secret, a content name, a content module name, a content description, a content thumbnail Uniform Resource Locator (URL), a content thumbnail binary, a recommendation message, or a web URL. The country code is a code assigned to each country to identify the country. The region code is a code assigned to each region to identify the region. The session identifier is an identifier for identifying a session with an SNS server and may include at least one of a session ID, a token, or a cookie. The session identifier secret indicates a secret of a session identifier and the content name indicates the name of content. The content module name represents content type and the content description indicates a description of content. The content thumbnail URL is a URL indicating the location of a content thumbnail to be included in a feed of a display page. The content thumbnail binary represents image data of a thumbnail to be included in a feed of a display page. The recommendation message is a message which is input when a user recommends content and the web URL indicates the location of an information page for content.

The content playback information may include at least one of content type information, an audio ID (or an audio identifier), a content ID (or a content identifier), a channel name, a physical channel number, a major channel number, a minor channel number, a source index, a start time, or an end time. The content type information indicates a content type. The content type may be at least one of text, image content, audio content, video content, a real-time broadcast program, or an application. The content type may further identify a content source. For example, the content type may include a search result and may include content which is on sale on a web. In some embodiments, the content module name may include the same information as the content information.

If content is a real-time broadcast program, the content information may indicate broadcast information which includes at least one of a channel name, a physical channel number, a major channel number, a minor channel number, a source index, a broadcast program name, a broadcast start time, or a broadcast end time.

The metadata may include a metadata identifier or metadata ID for identifying metadata for content or a transaction.

The metadata management server 220 receives metadata from the SNS gateway 210 and stores the received metadata. The metadata management server 220 may store the received metadata so that the metadata can be searched through metadata IDs. For example, the metadata management server 220 may store metadata indexed by metadata IDs.

If the SNS gateway 210 requests metadata, the metadata management server 220 searches for the requested metadata and provides the requested metadata to the SNS gateway 210. Here, the SNS gateway 210 may transmit a search request message including a metadata ID to the metadata management server 220. The metadata management server 220 may search for metadata related to the metadata ID included in the received search request message and transmit the retrieved metadata to the SNS gateway 210.

The SNS gateway 210 stores user identifiers and user SNS IDs in association with each other. The user identifier may be a user account of an electronic device of a user and the user SNS ID may be an account of an SNS server. The user SNS ID may be plural. That is, one user identifier and a plurality of user SNS IDs may be stored in association with each other. The electronic device may include the first digital TV 100, the second digital TV 110, the personal computer system 120, the notebook computer 130, and the mobile terminal 140.

The SNS gateway 210 may store an IP address of an SNS server. If a user logs in to the SNS server, the SNS gateway 210 may temporarily store a user identifier and a session identifier for identifying a session with the logged-in SNS server in association with the user identifier and the session identifier.

The SNS gateway 210 receives a content post request message from the digital TV 100, the second digital TV 110, the personal computer system 120, the notebook computer 130, and the mobile terminal 140. The content post request message may include content information and ID information.

The ID information may include at least one of a user identifier for identifying a user who has transmitted the content post request message, a session identifier for identifying a session with an SNS server of a current user, or a session identifier secret of a current user. That is, the session identifier and session identifier secret in the content post information of the content information may be included in the ID information.

The SNS gateway 210 acquires an SNS server address based on the ID information included in the content post request message which is received from the electronic device. In some embodiments, the SNS gateway 210 may acquire the SNS server address based on the type of a message received from the electronic device. The type of a message may include a content post request message and a broadcast rank request message.

The SNS gateway 210 may transmit content information included in the content post request message received from the electronic device to the SNS server indicated by the acquired SNS server address. In this case, the SNS gateway 210 may transmit the content information through a session indicated by a session identifier. The transmitted content information may be content information included in the content post request message, portion of the content information included in the content post request message, or information obtained by processing the content information included in the content post request message. A content post relay message including the content information may be transmitted to the SNS server.

The SNS gateway 210 may transmit metadata including at least one of the content information or the ID information included in the content post request message received from the electronic device to the metadata management server 220. The SNS gateway 210 may assign a metadata ID to the metadata and may transmit the metadata to the metadata management server 220 together with the assigned metadata ID. The SNS gateway 210 may store the metadata ID and broadcast information of the content information included in the content post request message in association with each other. The SNS gateway 210 may store the metadata ID and the ID information included in the content post request message in association with each other. The SNS gateway 210 may obtain an SNS account based on the ID information included in the content post request message and store the obtained SNS account and the broadcast information of the content information included in the content post request message so as to be associated with each other.

The SNS gateway 210 may receive broadcast information about a real-time broadcast program from the electronic device. The SNS gateway 210 may calculate the number of users who view the real-time broadcast program based on the received broadcast information. The SNS gateway 210 may generate feed data for displaying a feed related to one real-time broadcast program. The SNS gateway 210 may generate a display page including the feed related to one real-time broadcast program. The generated display page may include the generated feed data.

The SNS gateway 210 may include, in the feed, the number of users of the real-time broadcast program related to the feed included in the display page. The SNS gateway 210 may include, in the feed, a list of users who have recommended the real-time broadcast program related to the feed. The SNS gateway 210 may acquire SNS accounts associated with the received broadcast information by accessing a storage region in which the broadcast information and SNS accounts are stored in association with each other, generate a list including the acquired SNS accounts, and include the generated list in the feed as the list of users who have recommended the real-time broadcast program. Here, the generated list may further include thumbnails of the SNS accounts. The thumbnails may be photos of users.

The SNS gateway 210 may transmit the generated feed data or the generated display page to the electronic device. The SNS gateway 210 may transmit the generated feed data or the generated display page to the electronic device that has transmitted the broadcast rank request message. The feed data or the display data may be transmitted by a broadcasting or multicasting scheme. The electronic device may access a specific address to receive the feed data or the display page. The address may include at least one of an IP address, a port number, or a URL.

Figure 3:
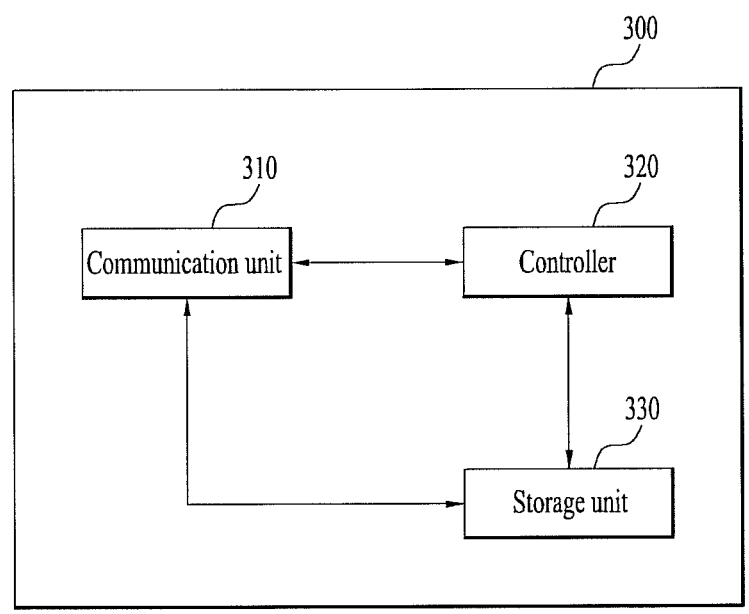
FIG. 3 is a block diagram illustrating the configuration of an exemplary embodiment of a server according to the present invention.

FIG. 3 is a block diagram illustrating the configuration of an exemplary embodiment of a server according to the present invention.

Referring to FIG. 3, a server 300 may function as either the first server 10 or the second server 20 or as both the first server 10 and the second server 20. The server 300 may include a communication unit 310, a controller 320, and a storage unit 330.

The communication unit 310 may receive packets transmitted through the network 2 and transmit the packets to the first digital TV 100, the second digital TV 110, the personal computer system 120, the notebook computer 130, and the mobile terminal 140. The packets may be transmitted through a Session Initiation Protocol (SIP), a User Datagram Protocol (UDP), and a Transport Control Protocol (TCP). The packets may include at least one of a registration request signal, a response signal, a connection request signal, a connection configuration signal, moving picture streaming, a webpage, a file, a content post request message, a broadcast rank request message, a display page, or metadata.

The controller 320 may control packet transmission of the communication unit 210 based on at least one of an SIP, a Simple Mail Transfer Protocol (SMTP), a Hypertext Transfer Protocol (HTTP), a File Transfer Protocol (FTP), a Real-Time Streaming Protocol (RTSP), or Multi Media Streaming (MMS) protocol.

The controller 320 controls operation of the server 300 according to data included in the received packets. For example, if a broadcast rank request message is received from the electronic device, the controller 320 controls the server 300 to transmit feed data or a display page to the electronic device. If a content post request message is received, the controller 320 may generate metadata ID for content information included in the content post request message and control the server 300 to transmit the content information to the metadata management server 220 or the server 20 together with the generated metadata ID.

The storage unit 330 may store at least one of metadata ID, metadata, an SNS account, SNS account authentication information, an SNS server address, a user identifier, user identifier authentication information, or message type ID information for identifying the type of a received message.

Figure 4:
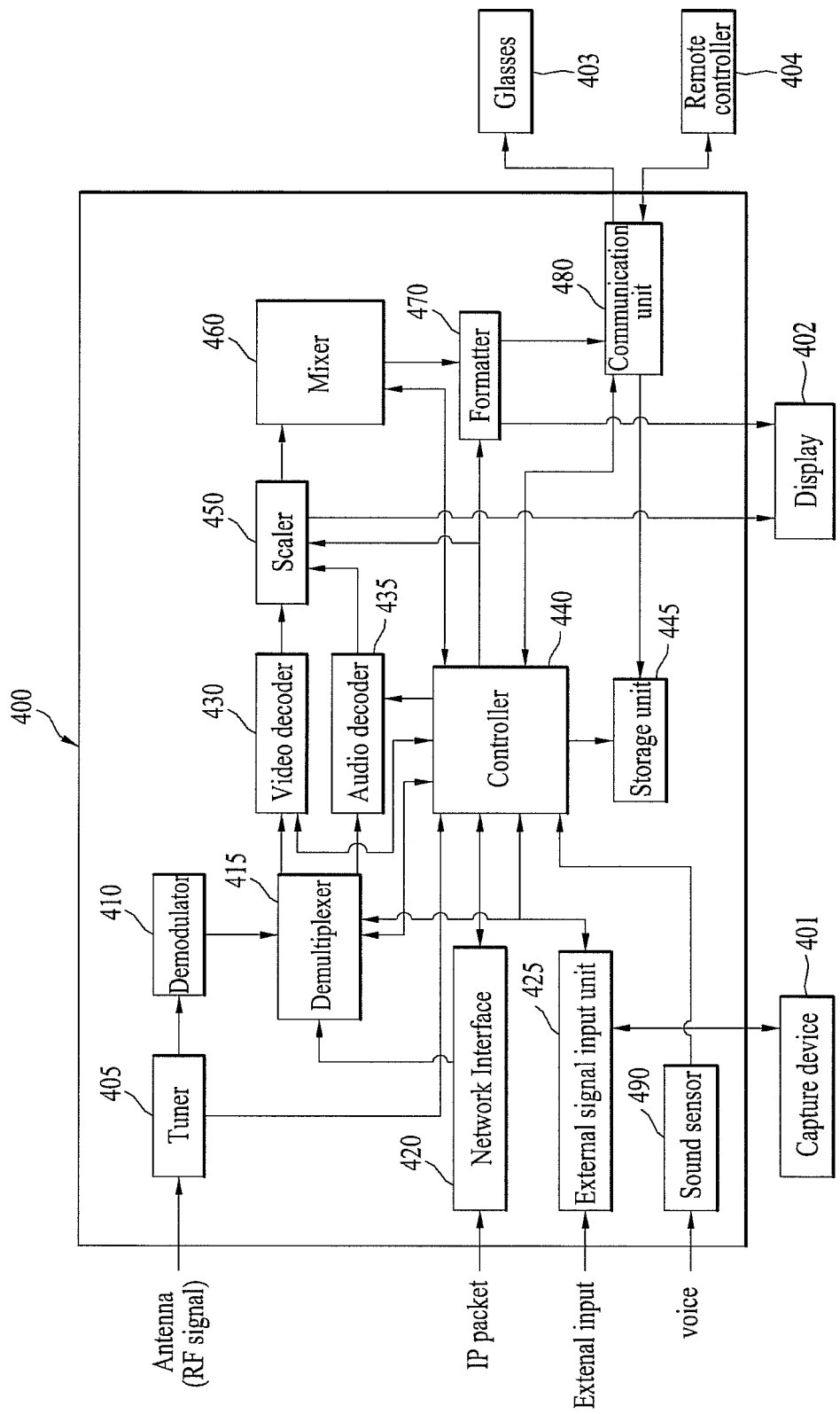
FIG. 4 is a block diagram illustrating the configuration of an exemplary embodiment of an electronic device according to the present invention.

FIG. 4 is a block diagram illustrating the configuration of an exemplary embodiment of an electronic device according to the present invention.

Referring to FIG. 4, an electronic device 400 may perform a function of at least one of the first broadcast receiver 100, the second broadcast receiver 110, the personal computer system 120, the notebook computer 130, or the mobile communication terminal 140.

The electronic device 400 may include a tuner 405, a demodulator 410, a demultiplexer 415, a network interface 420, an external signal input unit 425, a video decoder 430, an audio decoder 435, a controller 440, a storage unit 445, a scaler 450, a mixer 460, a formatter 470, a communication unit 480, and a sound sensor 490. The electronic device 400 may further include a capture device 401, a display 402, glasses 403, and a remote controller 404.

The tuner 405 selects a Radio Frequency (RF) broadcast signal corresponding to a channel selected by a user from among RF broadcast signals received through an antenna and converts the selected RF broadcast signal into an Intermediate Frequency (IF) signal or a baseband video or audio signal. The selected RF broadcast signal may include a real-time broadcast program and broadcast information about the real-time broadcast program.

The demodulator 410 receives a Digital IF (DIF) signal converted by the tuner 405 and performs a demodulation operation.

The demodulator 410 may also perform channel decoding. To this end, the demodulator 410 may include a Trellis decoder, a deinterleaver, or a Reed Solomon decoder to perform Trellis decoding, deinterleaving, or Reed Solomon decoding.

After demodulating and channel decoding, the demodulator 410 may generate a Transport Stream (TS) signal. The stream signal may be a signal obtained by multiplexing a video signal, an audio signal, or a data signal.

The demultiplexer 415 may receive stream signals from the demodulator 410, the network interface 420, and the external signal input unit 425. The demultiplexer 415 may demultiplex the received stream signals into the video signal, audio signal, and data signal and output the demultiplexed image, audio, and data signals to the video decoder 430, the audio decoder 435, and the controller 440, respectively.

The video decoder 430 receives the video signal from the demultiplexer 415, restores the received video signal, and outputs the restored video signal to the display 402 or the scaler 450. Here, the video signal may include a stereoscopic video signal.

The audio decoder 435 receives the audio signal from the demultiplexer 415, restores the received audio signal, and outputs the restored audio signal to the display 402 or the scaler 450.

The network interface 420 receives packets received from the network 2 and transmits the packets to the network 2. The network interface 420 may receive content from the second server 20, the first digital TV 100, the second digital TV 110, the personal computer system 120, the notebook computer 130, and the mobile terminal 140 through the network 2. Here, the content may include applications, moving picture streams, moving picture files, music files, picture files, etc. The network interface 420 may receive an IP packet for transmitting broadcast data from a service providing server through the network 2. The broadcast data may be real-time broadcast service data or Internet service data.

If the IP packet includes a stream signal, the network interface 420 may extract the stream signal from the IP packet and output the extracted stream signal to the demultiplexer 415. Here, the stream signal may be received from the second server 20, the first digital TV 100, the second digital TV 110, the personal computer system 120, the notebook computer 130, and the mobile terminal 140.

The network interface 420 may output signals and received content to the controller 440.

The external signal input unit 425 may provide an interface or a user interface for connecting an external device to the electronic device 400. The external device refers to a device for outputting various types of images and voice, such as a Digital Versatile Disc (DVD) player, a Blu-ray disc player, a game console, a camcorder, a computer (notebook), etc. The electronic device 400 may control video signals and audio signals received from the external signal input unit 425 to be displayed and may store or use data signals.

The external device may be the capture device 401. The capture device 401 may include a plurality of cameras. The capture device 401 may capture images of human beings. The capture device 401 may recognize, focus on, and zoom in on a human hand shape to capture the hand shape. The captured hand shape may be recognized as a spatial gesture. That is, the controller 440 may recognize the captured hand shape as the spatial gesture and execute commands for performing operations related to the recognized spatial gesture. The spatial gesture may be defined as a gesture recognized from an image frame or an image received from the capture device 401, mapped to one or more specific computing operations.

In some embodiments, the electronic device 400 may include the capture device 401.

The external signal input unit 425 may be a touch pad or a touchscreen. The touchscreen may be integrated into the display 402 or may be an element separate from the display 402. If the touchscreen is integrated into the display 402, the display 402 may be referred to as a touchscreen display. As the touchscreen is disposed at the front part of the display 402, users may directly manipulate a Graphical User Interface (GUI) displayed on the screen of the display 402. For example, users may put their finger on an object to be controlled.

The touch pad is generally separate from the display 402. For example, the display 402 is generally placed on a vertical plane and the touch pad is generally placed on a horizontal place. Such a location of the touch pad causes a user to be less intuitive and, therefore, it is more difficult to use the touch pad than the touchscreen.

The touch pad and the touchscreen may be a multi-point input device.

The controller 440 may recognize a touch gesture pressed onto the external signal input unit 425 and control the electronic device 400 based on the touch gesture. The touch gesture may be defined as interaction formularized with the external signal input unit 425, mapped to one or more specific computing operations. The touch gesture may be made by hand, in more detail, through finger motion. Alternatively or in addition thereto, the touch gesture may be made using a stylus. Here, a subject implementing the touch gesture, such as a finger or a stylus, is called an object.

The external signal input unit 425 receives a touch gesture and the controller 440 executes commands for performing operations related to the touch gesture. Furthermore, the storage unit 445 may store a gesture operating program which may be a part of an operating system or an additional application. The gesture operating program generally includes a series of commands for recognizing the occurrence of a gesture (touch gesture or spatial gesture) and informing one or more software agents of the gesture and/or which actions should be taken in response to the gesture.

If a user makes one or more gestures, the external signal input unit 425 transmits gesture information to the controller 440. The controller 440 interprets the touch gestures using the commands, more specifically, the gesture operating program stored in the storage unit 445 and controls different components of the electronic device 400 such as the display 402, demultiplexer 415, network interface 420, external signal input unit 425, storage unit 445, scaler 450, mixer 460, formatter 470, and sound sensor 490. The gestures may be identified as commands for performing an operation of an application stored in the storage unit 445, correcting a GUI object appearing on the display 402, correcting data stored in the storage unit 445, and performing operations in the demultiplexer 415, network interface 420, scaler 450, mixer 460, and formatter 470. For example, such commands may be associated with zoom, panning, scrolling, page skip, rotation, size adjustment, image channel change, content reception, Internet access, etc.

Various different touch gestures may be used. For example, a touch gesture may be a single-point or multi-point gesture, a static or dynamic gesture, a continuous or segmented gesture, and/or other gestures. The single-point gesture refers to a gesture made by a single contact point, for example, one finger, palm, or stylus. The multi-point gesture is made by a plurality of points, for example, fingers, a finger and a palm, a finger and a stylus, a plurality of styluses, and/or a combination thereof. The static gesture refers to a gesture which does not include motion and the dynamic gesture refers to a gesture including motion. The continuous gesture is made by a single stroke and the segmented gesture is made by separate steps or a sequence of strokes.

Contact between an object and a touchscreen has different patterns. For example, a single-point gesture on the touchscreen includes a down event and a subsequent up event at the same location or almost the same location as the down event. A dynamic gesture on the touchscreen includes a down event, at least one subsequent drag event, and a subsequent event.

In some embodiments, a parameter is used to describe a process in which a finger approaches a touchscreen display, contacts the touchscreen display, and is removed from the touchscreen display. The parameter may be a function of at least one of a distance between the finer and the touchscreen display, a pressure exerted by the finger onto the touchscreen display, a contact area between the finger and the touchscreen display, a voltage between the finger and the touchscreen display, a capacitance between the finger and the touchscreen display, or other physical parameters.

In some embodiments, if the magnitude of a parameter (e.g. capacitance) between the finger and the touchscreen display exceeds a predetermined threshold value, a down event occurs. If a cursor location corresponding to the finger is moved to a location B from a location A while the magnitude of the parameter exceeds the predetermined threshold value, a drag event occurs. When the magnitude of the parameter is lowered below the predetermined threshold value, an up event occurs.

The controller 440 executes commands and performs operation related to the electronic device 400. For example, the controller 440 may control input and output between components of the electronic device 400 and reception and processing of data, using the commands searched from the storage unit 445. The controller 440 may be implemented on a single chip, a plurality of chips, or a plurality of electric elements. For example, a dedicated or embedded processor, a single purpose processor, a controller, an ASIC, etc. may be used for the controller 440. The controller 440 may include at least one processor.

The controller 440 may detect a user action and control the electronic device 400 based on the detected user action. The user action may include selection of a physical button of a display or a remote controller, implementation of a prescribed touch gesture or selection of a soft button on a touchscreen display, implementation of a prescribed spatial gesture recognized from an image captured from a capture device, and implementation of prescribed speaking recognized through voice recognition with respect to a voice signal received by the sound sensor 490. The controller 400 may interpret the user action as at least one implementable command. The controller 400 may control the components of the electronic device 400 in response to the at least one interpreted command. That is, the controller 440 may control input and output between the components of the electronic device 400 and reception and processing of data, using the at least one command.

The controller 440 executes computer code together with an Operating System (OS) and generates and uses data. The OS is generally known and a detailed description thereof will not be given. For example, the OS may be a Windows series OS, Unix, Linux, Palm OS, DOS, Android, and Mac OS. The OS, other computer code, and data may be included in the storage unit 445 which operates in association with the controller 440.

The storage unit 445 generally provides a place for storing program code and data used by the electronic device 400. For example, the storage unit 445 may be implemented as a Read Only Memory (ROM), a Random Access Memory (RAM), or a hard disk drive. The program code and data may be stored in a removable storage medium and, if necessary, may be loaded to or installed in the electronic device 400. The removable storage medium includes a CD-ROM, PC card, a memory card, a floppy disc, a magnetic tape, or a network component.

The scaler 450 scales signals processed by the video decoder 430 and the audio decoder 435 to signals of a proper size so as to be output through the display 402 or a speaker (not shown).

The scaler 450 adjusts and outputs an aspect ratio of a GUI, an image, a stereoscopic image, or a combination of at least two thereof, according to the type of displayed content or user setting. The aspect ratio may be a value of 21:9, 16:9, 4:3, or 3:2. The scaler 450 may adjust a horizontal screen length and a vertical screen length to have a specific ratio.

The mixer 460 mixes the outputs of the scaler 450 and the controller 440.

The formatter 470 converts image and audio signals generated from the mixer 460 into signals suitable for an output format of the display 402. If a 2D image is displayed, the formatter 470 passes input signals without performing the above conversion function. If a stereoscopic image is displayed, the formatter 470 may function as a 3D formatter for processing input signals into a 3D format suitable for a format of the stereoscopic image and an output frequency of the display 402 under the control of the controller 440.

The formatter 470 outputs the converted image signal for a stereoscopic image to the display 402 and generates a synchronization signal for the output stereoscopic image signal, which is output to the communication unit 480. The synchronization signal is a signal for synchronizing a display time of a left-eye viewpoint image or a right-eye viewpoint image with an opening and closing time of a left-eye lens and a right-eye lens of the shutter glasses 403.

The communication unit 480 is a communication module for providing two-way omnidirectional (or non-directional) communication and performs wireless communication with other communication devices through a communication scheme according to a predetermined communication specification. The communication specification may be ZigBee, Bluetooth, Ultra Wideband (UWB), Radio Frequency Identification (RFID), or Wireless LAN. The communication device may be the electronic device 400, the glasses 403, and the remote controller 404.

The communication unit 480 may include an infrared receiver which is capable of receiving infrared data from the remote controller 404.

The sound sensor 490 may receive voice and output the received voice to the controller 440. The controller 440 may recognize voice output by the sound sensor 490 and control the electronic device 400 based on the recognized voice.

Figure 5:
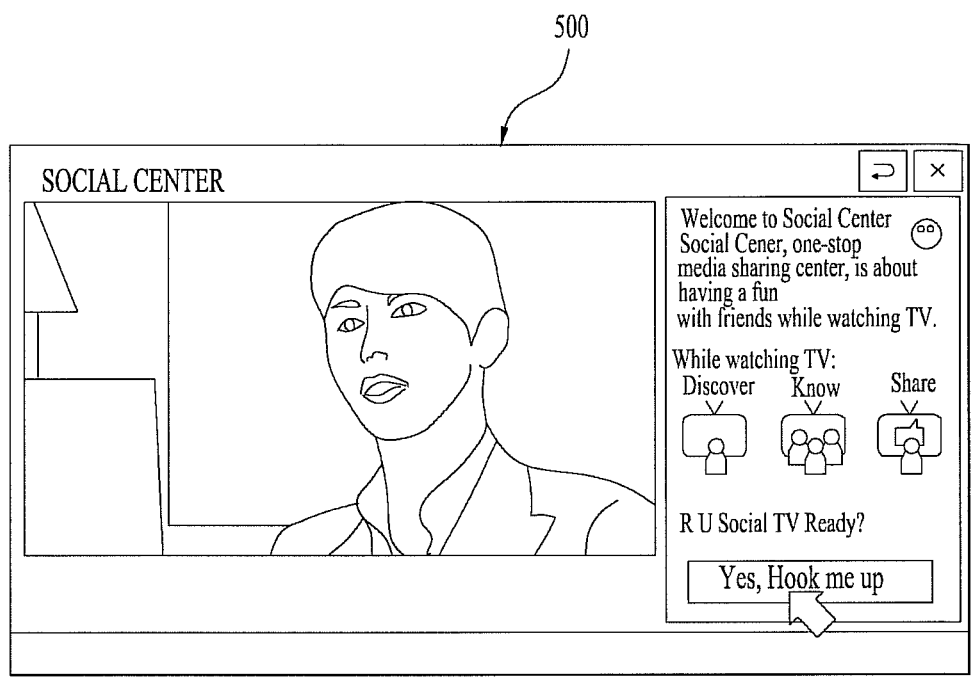
FIG. 5 is a diagram illustrating an exemplary embodiment of an initial screen of an electronic device according to the present invention.

FIG. 5 is a diagram illustrating an exemplary embodiment of an initial screen of an electronic device according to the present invention.

Referring to FIG. 5, the display 402 may display a screen 500. The screen 500 may be an initial screen of the electronic device 400. The controller 440 may control the initial screen 500 to be displayed when the electronic device 400 is first booted.

Figure 6:
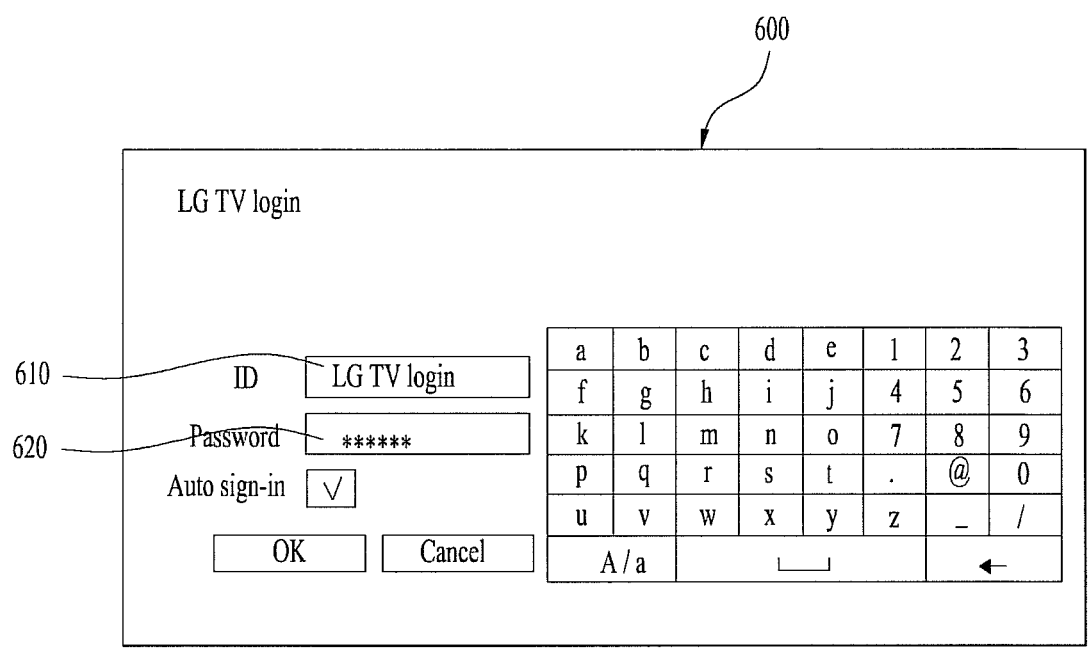
FIG. 6 is a diagram illustrating an exemplary embodiment of a Graphical User Interface (GUI) for receiving user registration information.

FIG. 6 is a diagram illustrating an exemplary embodiment of a GUI for receiving user registration information.

Referring to FIG. 6, the display 402 may display a screen 600. The screen 600 displays a GUI for receiving user registration information of the electronic device 400.

A user may enter a user identifier (or user ID) 610 and a password 620 through the GUI 600. The user identifier and password input through the GUI 600 may be stored in at least one of the electronic device 400 or the server 10 and may be used as login information of at least one of the electronic device 400 or the server 10.

Figure 7:
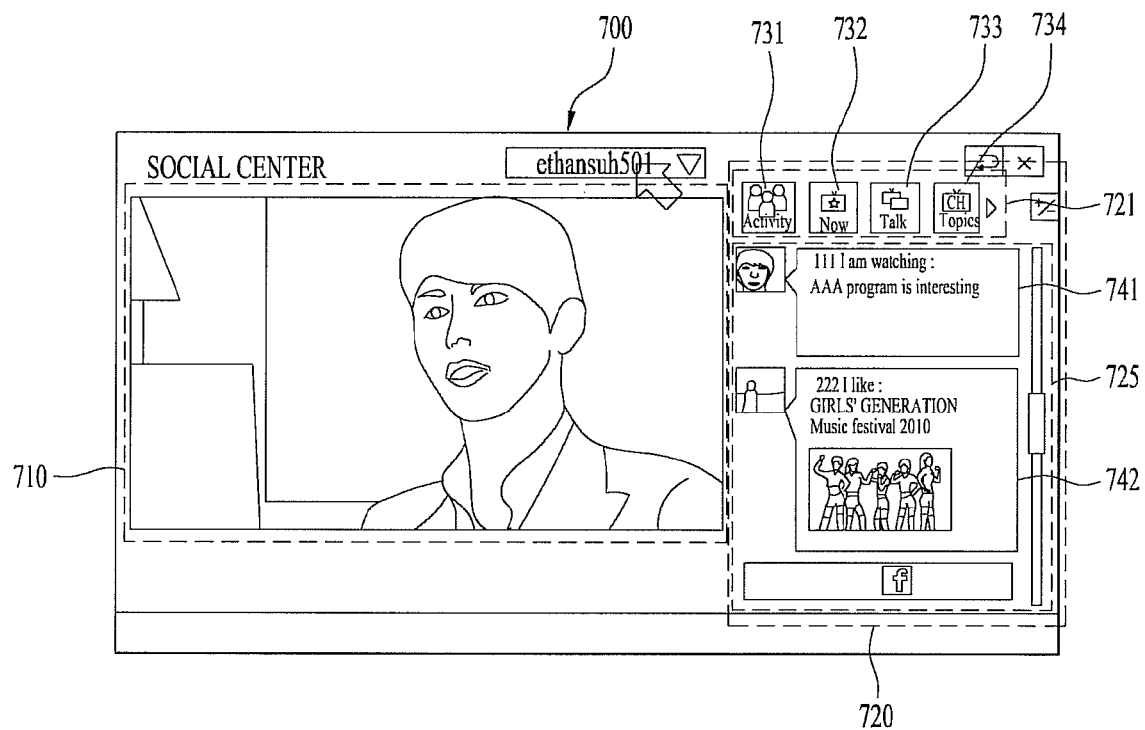
FIG. 7 is a diagram illustrating an exemplary embodiment of a login initial screen of an electronic device according to the present invention.

FIG. 7 is a diagram illustrating an exemplary embodiment of a login initial screen of an electronic device according to the present invention.

Referring to FIG. 7, the display 402 may display a screen 700. The screen 700 is a login initial screen of an electronic device. If login to the electronic device is successful, the controller 440 may control the screen 700 to be displayed.

The screen may include a content display region 710 and an active region 720. The content display region 710 displays content. The active region 720 may include a menu region 721 for selecting an SNS server or services and a page region 725 for displaying a display page related to a service. The menu region 721 includes icons 731, 732, 733, and 734 for selecting specific services and the page region 725 displays feeds 741 and 743 included in the display page.

Figure 8:
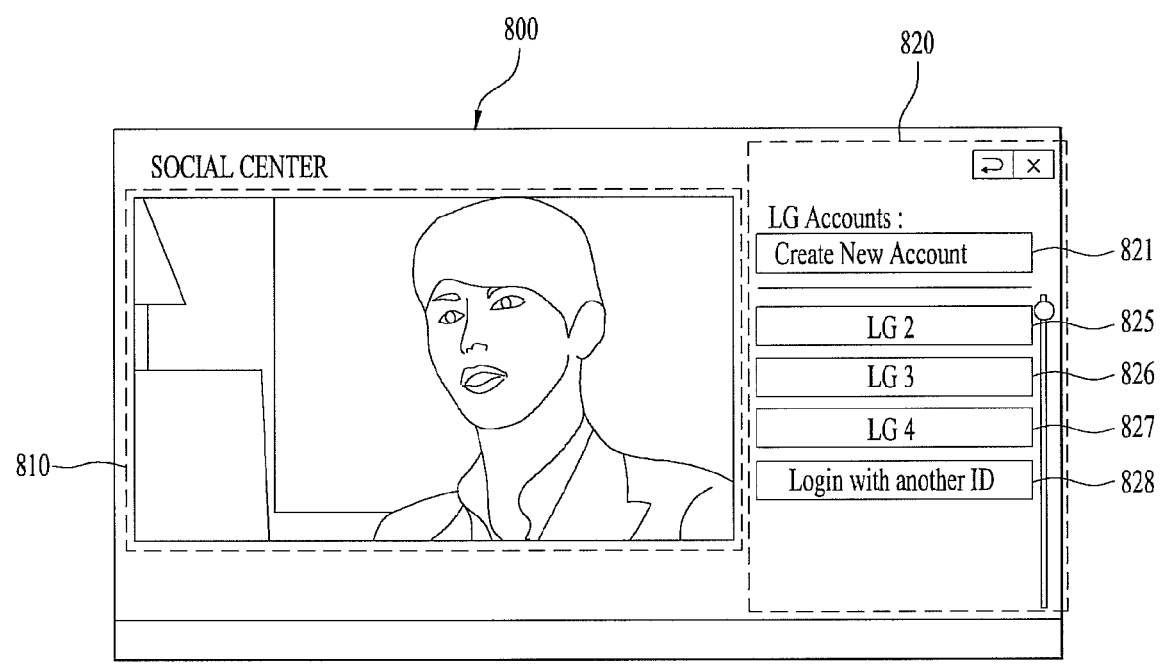
FIG. 8 is a diagram illustrating an exemplary embodiment of a logout screen of an electronic device according to the present invention.

FIG. 8 is a diagram illustrating an exemplary embodiment of a logout screen of an electronic device according to, the present invention.

Referring to FIG. 8, the display 402 may display a screen 800. The screen 800 is a logout screen of an electronic device. If a user logs out from the electronic device, the controller 440 may control the screen 800 to be displayed.

The screen 800 may include a content display region 810 and a login GUI region 820. The login GUI region 820 includes a button for generating a new user identifier and buttons 825, 826, 827, and 828 for selecting previously generated user identifiers.

The electronic device 400 provides environments which can be used by a plurality of users. The electronic device 400 may generate and manage a user identifier with respect to each of a plurality of users.

Figure 9:
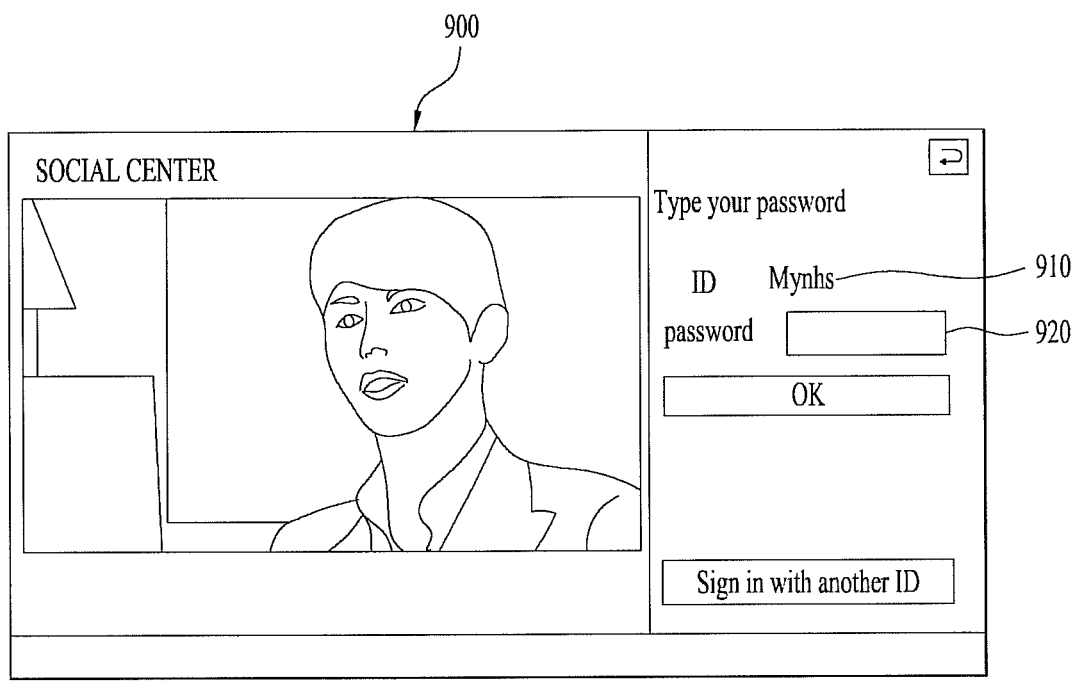
FIG. 9 is a diagram illustrating an exemplary embodiment of a login screen of an electronic device according to the present invention.

FIG. 9 is a diagram illustrating an exemplary embodiment of a login screen of an electronic device according to the present invention.

Referring to FIG. 9, the display 402 displays a screen 900. Upon detecting a user action for selecting the button 825 of the screen 800, the controller 440 may control the screen 900 to be displayed in response to detecting of the user action.

The screen 900 displays a user identifier 910 related to the selected button 825 and an input box 920 for receiving a password of the user identifier 910.

Figure 10:
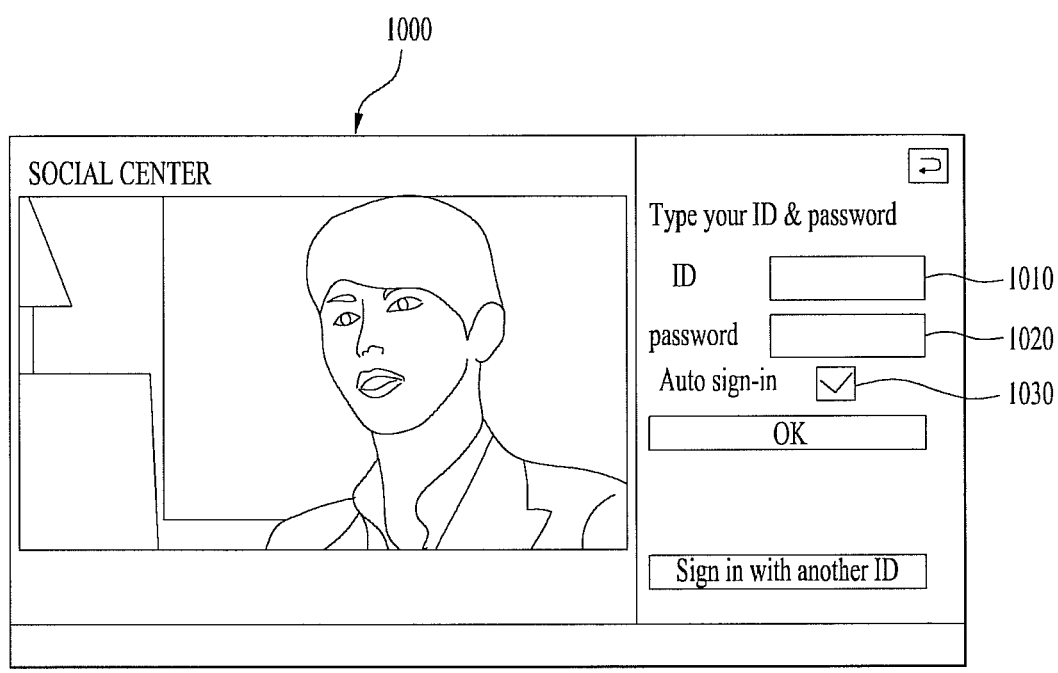
FIG. 10 is a diagram illustrating another exemplary embodiment of a login screen of an electronic device according to the present invention.

FIG. 10 is a diagram illustrating another exemplary embodiment of a login screen of an electronic device according to the present invention.

Referring to FIG. 10, the display 402 displays a screen 1000. The controller 440 may display the screen 1000 as a login screen. The controller 440 may control the screen 1000 to be displayed when an electronic device is booted.

The screen 1000 includes an input box 1010 for receiving a user identifier and a check box 1030 for setting an automatic sign-in function.

If the check box 1030 is checked, the controller 440 controls a sign-in function to be automatically performed. The automatic sign-in function refers to a function for automatically performing login to an SNS server through an SNS account related to the user identifier.

Figure 11:
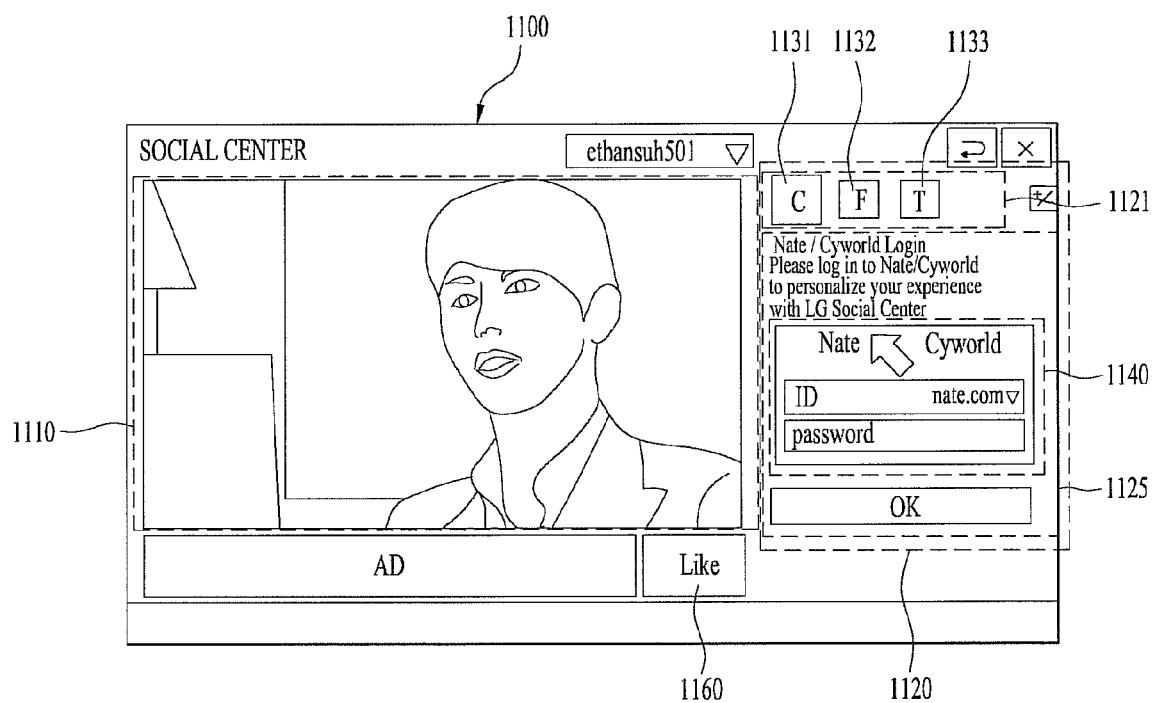
FIG. 11 is a diagram illustrating an exemplary embodiment of a screen for logging in to a Social Networking Service (SNS) server in an electronic device according to the present invention.

FIG. 11 is a diagram illustrating an exemplary embodiment of a screen for logging in to an SNS server in an electronic device according to the present invention.

Referring to FIG. 11, the display 402 may display a screen 1100. The screen 1100 is a screen for logging in to an SNS server in an electronic device. The screen 1100 may be displayed when a user action for selecting one of the icons 731, 732, 733, and 734 of the screen 700 is detected. Alternatively, the screen 110 may be displayed as a login initial screen of the electronic device.

The screen 1100 includes a content display region 1110, an active region 1120, and a recommendation button 1160 for recommending content. A user may perform an action for requesting content recommendation by selecting the recommendation button 1160.

The active region 1120 includes a menu region 1121 and a page region 1125. The page region 1125 displays a GUI 1140 for receiving authentication information for login to the SNS server indicated by a selected icon 1131.

Authentication information input on the GUI 1140 may be stored in the storage unit 445. The storage unit 445 may store a currently logged-in user identifier and the authentication information input on the GUI 1140 to be associated with each other.

The controller 440 may control the currently logged-in user identifier and the authentication information input on the GUI 1140 to be transmitted to the server 10. The server 10 may store the received user identifier and authentication information to be associated with each other.

Figure 12:
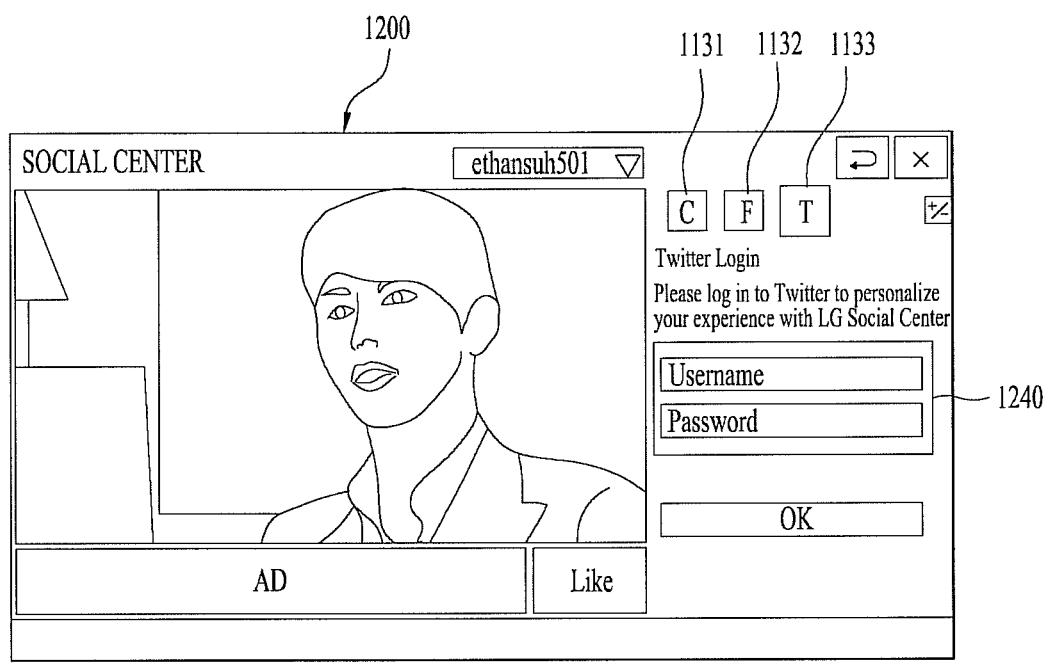
FIG. 12 is a diagram illustrating another exemplary embodiment of a screen for logging in to an SNS server in an electronic device according to the present invention.

FIG. 12 is a diagram illustrating another exemplary embodiment of a screen for logging in to an SNS server in an electronic device according to the present invention Referring to FIG. 12, the display 402 displays a screen 1200. The screen 1200 may be a screen displayed when an icon 1133 is selected from the menu region 1121 of the screen 1100 of FIG. 11. A GUI 1240 serves to receive authentication information for login to an SNS server indicated by the selected icon 1133.

Figure 13:
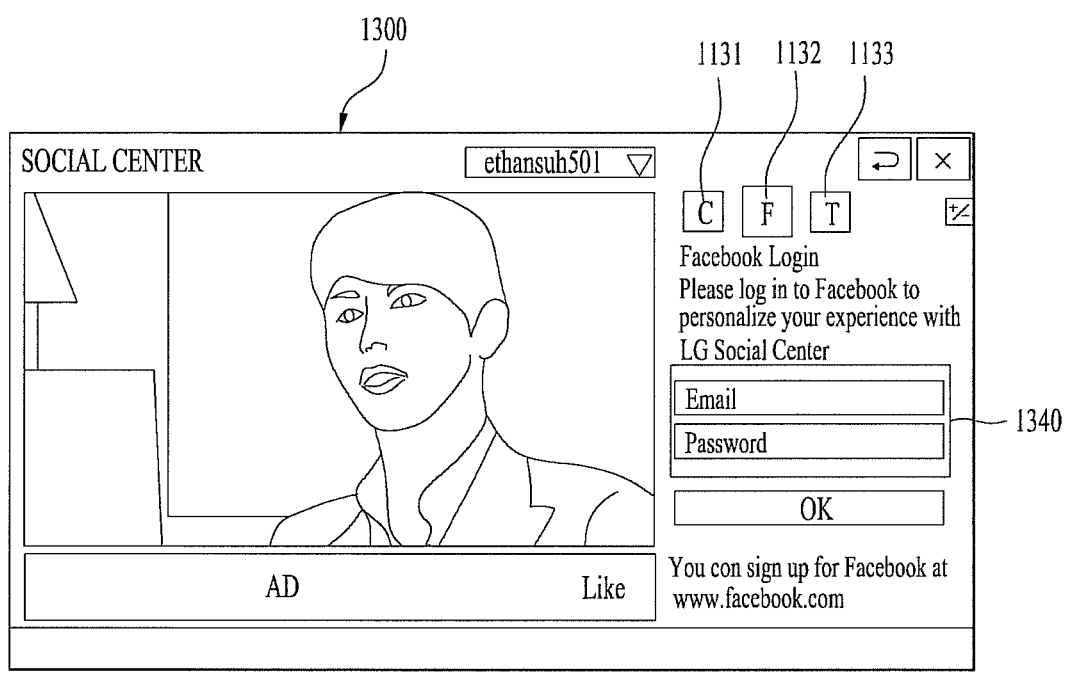
FIG. 13 is a diagram illustrating still another exemplary embodiment of a screen for logging in to an SNS server in an electronic device according to the present invention.

FIG. 13 is a diagram illustrating still another exemplary embodiment of a screen for logging in to an SNS server in an electronic device according to the present invention.

Referring to FIG. 13, the display 402 displays a screen 1300. The screen 1300 may be a screen displayed when an icon 1132 is selected from the menu region 1121 of the screen 1100 of FIG. 11. A GUI 1340 serves to receive authentication information for login to an SNS server indicated by the selected icon 1132.

Figure 14:
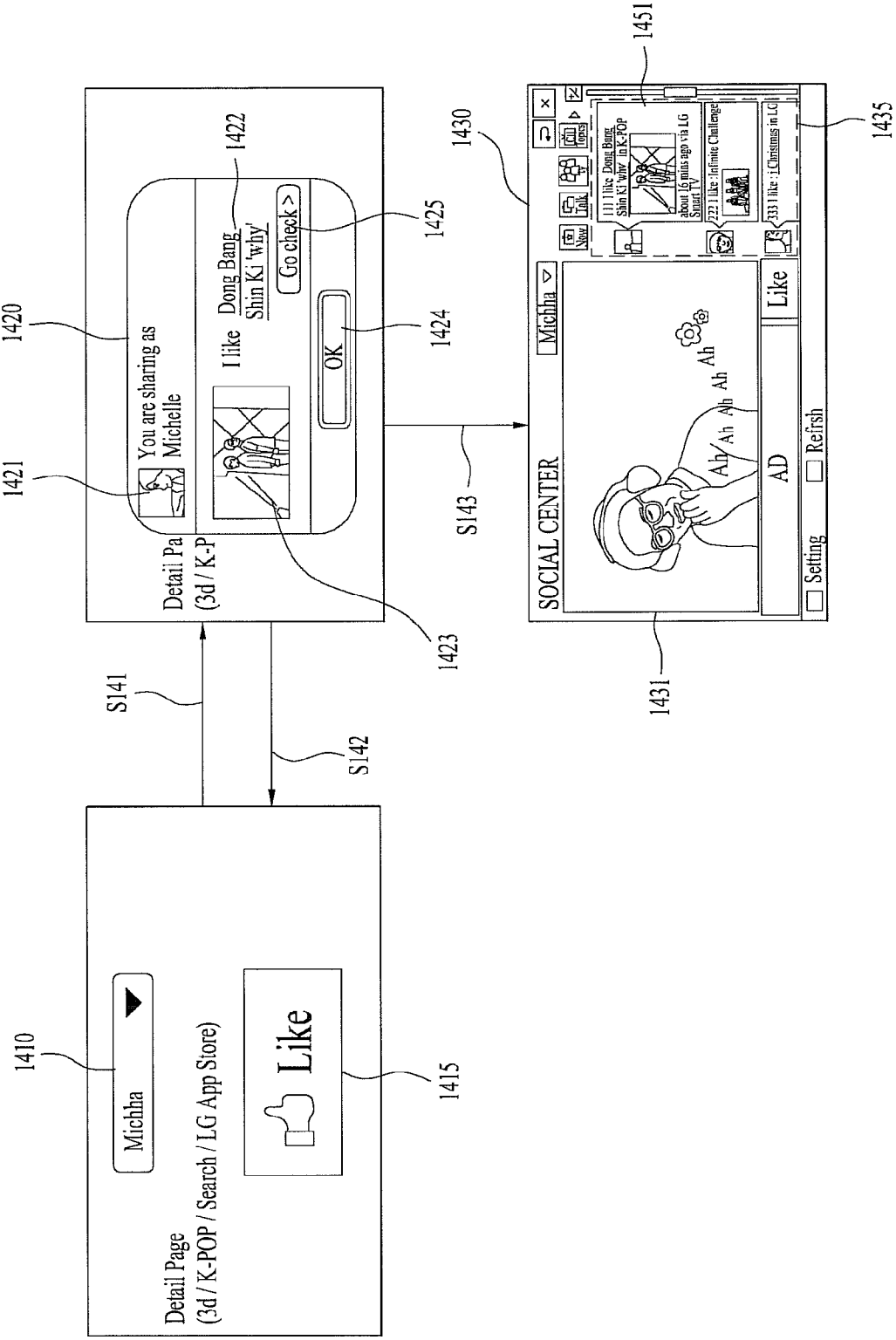
FIG. 14 is a diagram illustrating an exemplary embodiment of a screen displayed in an execution process of a method for providing a content recommendation service after account linkage with an SNS server in a logged in state of an electronic device according to the present invention.

FIG. 14 is a diagram illustrating an exemplary embodiment of a screen displayed in an execution process of a method for providing a content recommendation service after account linkage with an SNS server in a logged in state of an electronic device according to the present invention.

Referring to FIG. 14, the controller 440 detects a user action for requesting content recommendation under the state that a user logs in to an electronic device using a user identifier 'Michha' 1410 (step S141). Here, the user action may be an action for selecting a "Like" button 1415 and recommended content may be content displayed on a current screen.

The controller 440 displays a content recommendation confirmation message 1420 on the screen in response to the detected user action. The content recommendation confirmation message 1420 includes a user identifier 1421, content information 1422 about recommended content, a thumbnail 1423 of the recommended content, an "OK" button 1424, and a "Go check" button 1425. In some embodiments, the content recommendation confirmation message 1420 includes at least one of the user identifier 1421, the content information 1422 about recommended content, the thumbnail 1423 of the recommended content, the "OK" button 1424, or the "Go check" button 1425.

Upon detecting a user action for selecting the "OK" button 1424 (step S142), the controller 440 controls the content recommendation confirmation message 1420 to appear from the screen. The display 402 may continue to display the screen which is a screen prior to display of the content recommendation confirmation message 1420.

Upon detecting a user action for selecting the "Go check" button 1425, the controller 440 controls a screen 1430 to be displayed. The screen 1430 is a screen displayed in an active mode and includes a content display region 1431 and a page region 1435. The page region 1435 displays a display page including a feed 1451 associated with the content recommended in step S141.

Figure 15:
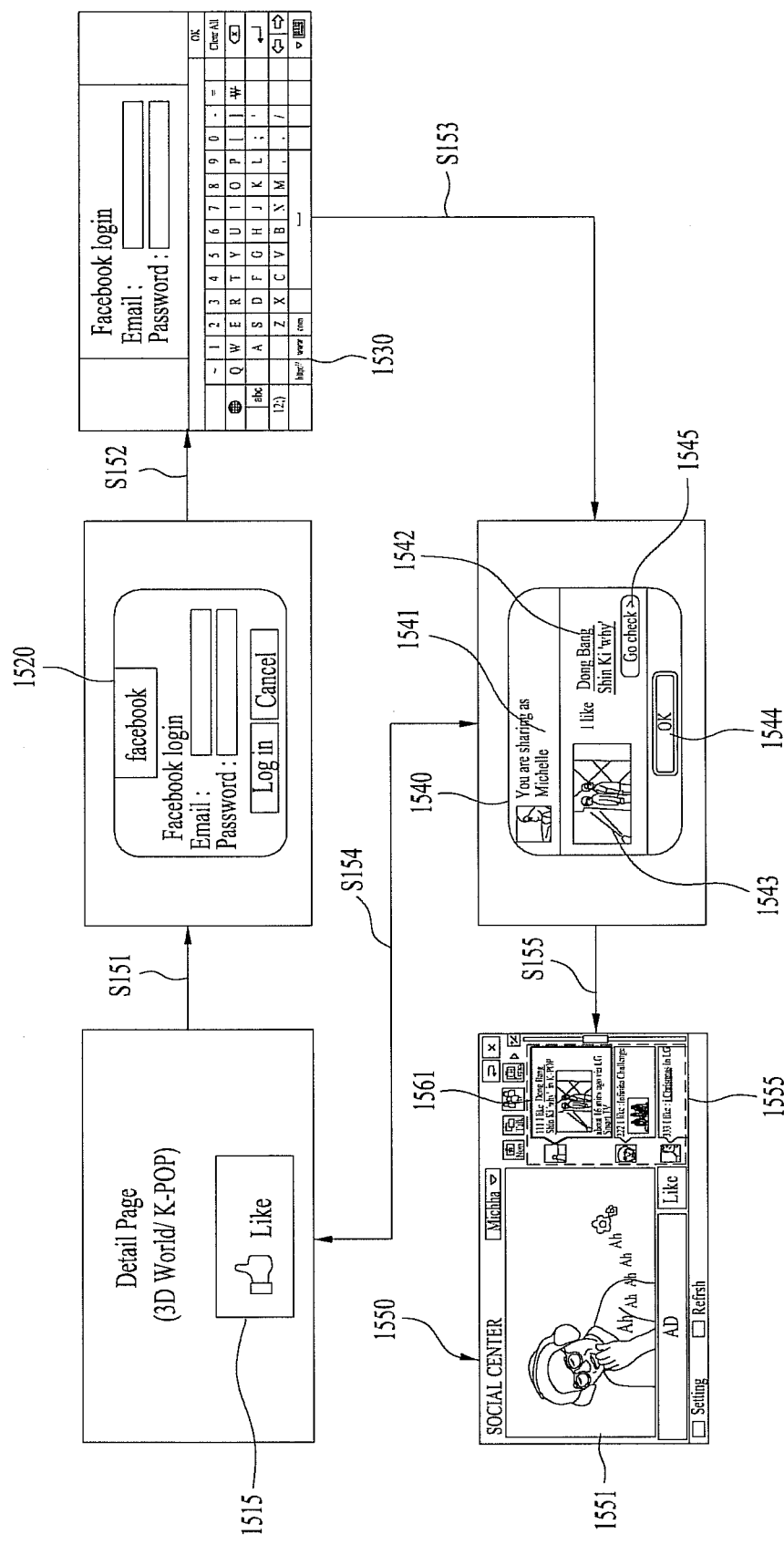
FIG. 15 is a diagram illustrating an exemplary embodiment of a screen displayed in an execution process of a method for providing a content recommendation service before account linkage with an SNS server in a logged in state of an electronic device according to the present invention.

FIG. 15 is a diagram illustrating an exemplary embodiment of a screen displayed in an execution process of a method for providing a content recommendation service before account linkage with an SNS server in a logged in state of an electronic device according to the present invention.

Referring to FIG. 15, the controller 440 detects a user action for requesting content recommendation under the state that a user logs in to an electronic device using a user identifier 'Michha' (step S151). Here, the user action may be an action for selecting a "Like" button 1515 and recommended content may be content displayed on a current screen.

The controller 440 may confirm whether the user has logged in to an SNS server in response to the detected user action. If the user has not logged in to the SNS server, the controller 440 controls a message 1520 for requesting login to the SNS server to be displayed.

Upon detecting a user action for requesting text input (step S152), the controller 440 may control a virtual keyboard 1530 to be displayed.

If the user completes authentication information input for login to the SNS server (S153), the controller 440 displays a content recommendation confirmation message 1540 on a screen. The content recommendation confirmation message 1540 includes a user identifier 1541, content information 1542 about recommended content, a thumbnail 1543 of the recommended content, an "OK" button 1544, and a "Go check" button 1545. In some embodiments, the content recommendation confirmation message 1540 includes at least one of the user identifier 1541, the content information 1542 about recommended content, the thumbnail 1543 of the recommended content, the "OK" button 1544, or the "Go check" button 1545.

Upon detecting a user action for selecting the "OK" button 1544 (step S154), the controller 440 controls the content recommendation confirmation message 1540 to disappear from the screen. The display 402 may continue to display the screen prior to display of the content recommendation confirmation message 1420.

Upon detecting a user action for selecting the "Go check" button 1525, the controller 440 controls a screen 1550 to be displayed. The screen 1550 includes a content display region 1551 and a page region 1555. The page region 1555 displays a display page including a feed 1561 associated with the content recommended in step S151. The displayed display page may be received from the SNS server to which the user has logged in in step S153.

Figure 16:
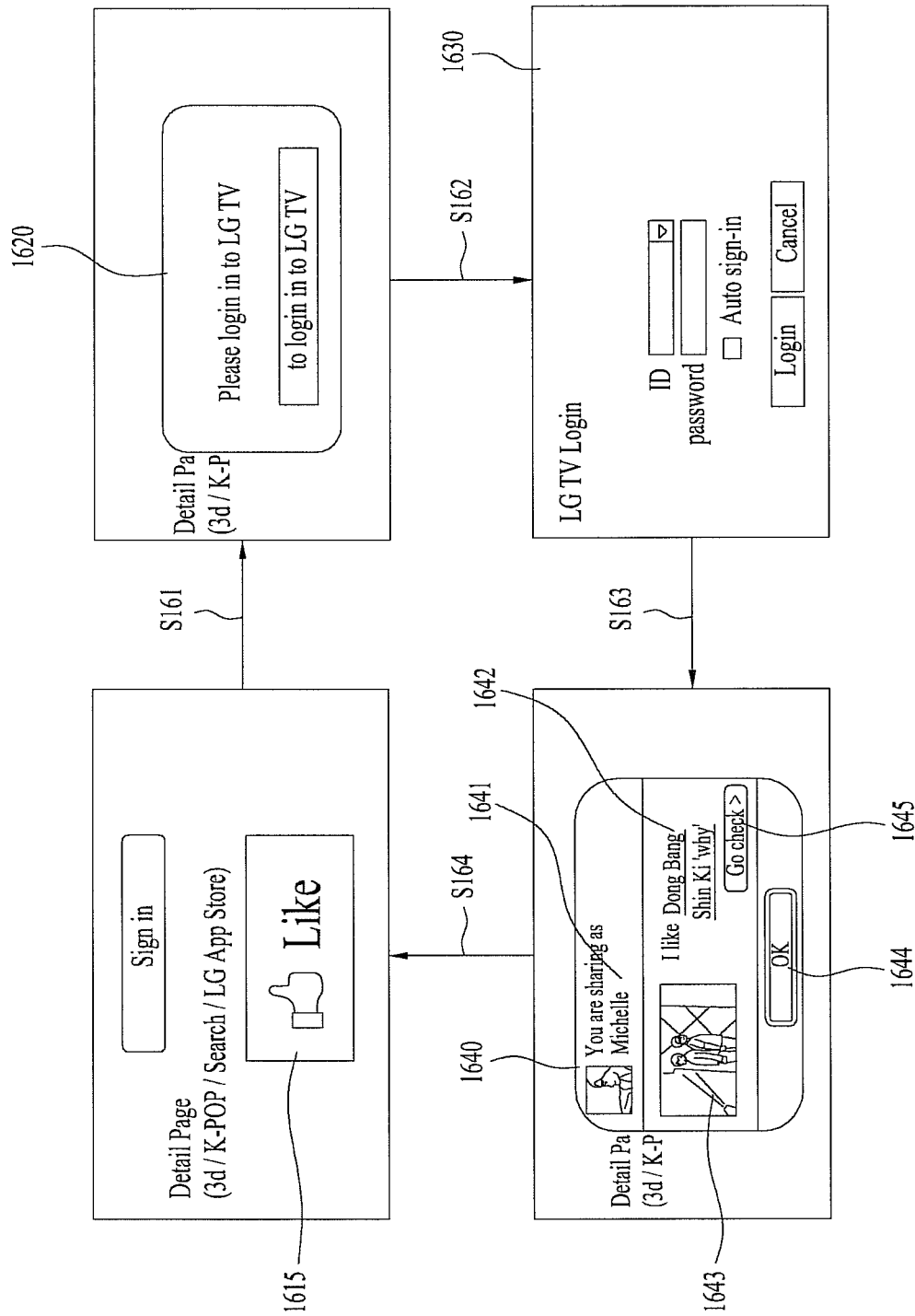
FIG. 16 is a diagram illustrating an exemplary embodiment of a screen displayed in an execution process of a method for providing a content recommendation service after account linkage with an SNS server in a logged out state of an electronic device according to the present invention.

FIG. 16 is a diagram illustrating an exemplary embodiment of a screen displayed in an execution process of a method for providing a content recommendation service after account linkage with an SNS server in a logged out state of an electronic device according to the present invention.

Referring to FIG. 16, the controller 440 detects a user action for requesting content recommendation under the state that a user has not logged in to an electronic device (step S161). Here, the user action may be an action for selecting a "Like" button 1615 and recommended content may be content displayed on a current screen.

The controller 440 may confirm whether the user has logged in to the electronic device in response to the detected user action. If the user has not logged in to the electronic device, the controller 440 controls a message 1620 for requesting login to the electronic device to be displayed.

Upon detecting a user action for requesting login (step S162), the controller 440 may control a GUI 1630 for receiving authentication information to be displayed on a screen.

If the user completes authentication information input for login to the electronic device (step S163), the controller 440 displays a content recommendation confirmation message 1640 on a screen. The content recommendation confirmation message 1640 includes a user identifier 1641, content information 1642 about recommended content, a thumbnail 1643 of the recommended content, an "OK" button 1644, and a "Go check" button 1645. Here, the user identifier 1641 may be input through the GUI 1630. In some embodiments, the content recommendation confirmation message 1640 includes at least one of the user identifier 1641, the content information 1642 about recommended content, the thumbnail 1643 of the recommended content, the "OK" button 1644, or the "Go check" button 1645.

Upon detecting a user action for selecting the "OK" button 1644 (step S164), the controller 440 controls the content recommendation confirmation message 1640 to disappear from the screen. The display 402 may continue to display the screen prior to display of the content recommendation confirmation message 1640.

Figure 17:
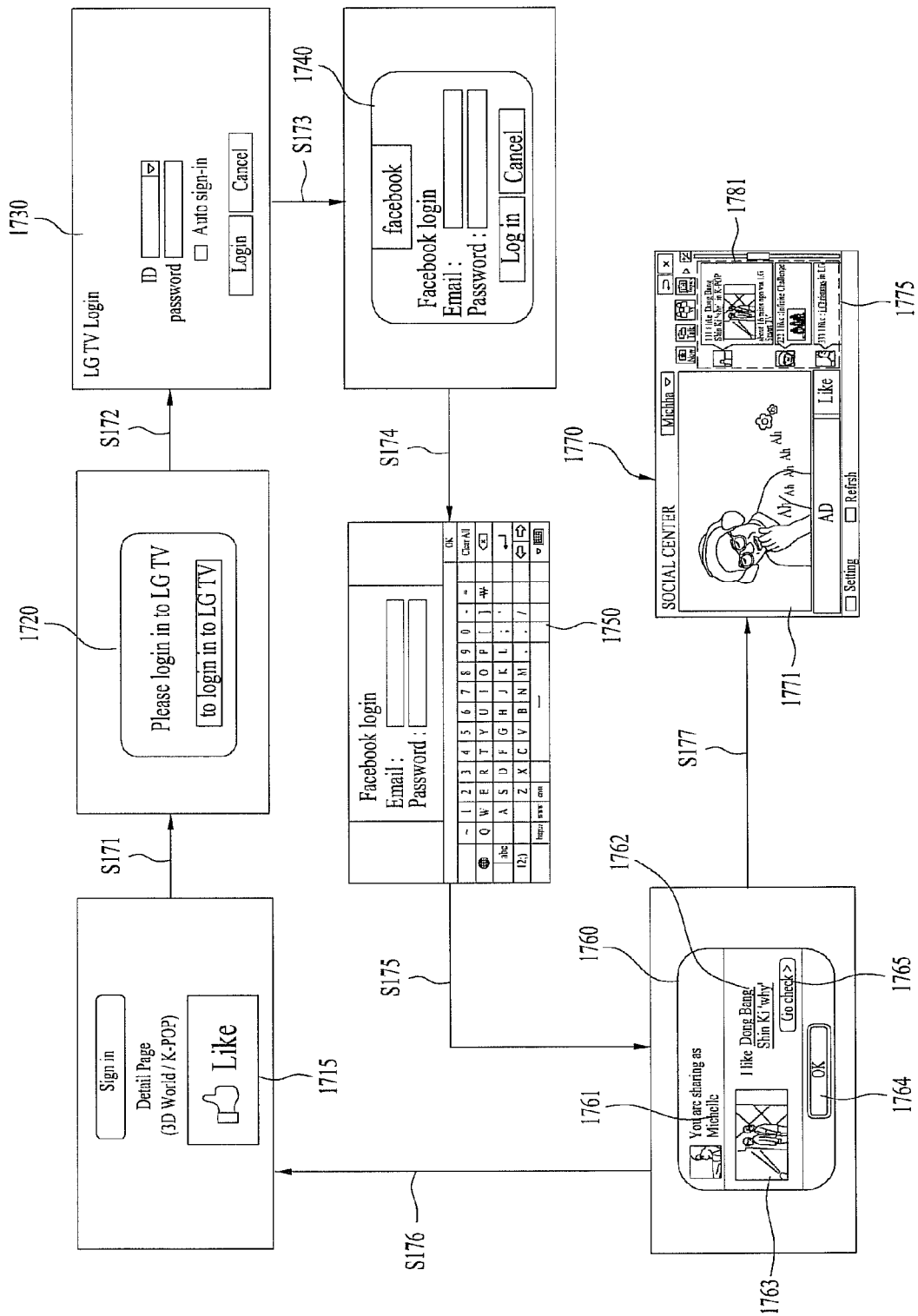
FIG. 17 is a diagram illustrating an exemplary embodiment of a screen displayed in an execution process of a method for providing a content recommendation service before account linkage with an SNS server in a logged out state of an electronic device according to the present invention.

FIG. 17 is a diagram illustrating an exemplary embodiment of a screen displayed in an execution process of a method for providing a content recommendation service before account linkage with an SNS server in a logged out state of an electronic device according to the present invention.

Referring to FIG. 17, the controller 440 detects a user action for requesting content recommendation under the state that a user has not logged in to an electronic device (step S171). Here, the user action may be an action for selecting a "Like" button 1715 and recommended content may be content displayed on a current screen.

The controller 440 may confirm whether the user has logged in to the electronic device in response to the detected user action. If the user has not logged in to the electronic device, the controller 440 controls a message 1720 for requesting login to the electronic device to be displayed.

Upon detecting a user action for requesting login (step S172), the controller 440 may control a GUI 1730 for receiving authentication information to be displayed on a screen.

If the user completes authentication information input for login to the electronic device (step S173), the controller 440 may confirm whether the user has logged in to an SNS server.

If the user has not logged in to the SNS server, the controller 440 controls a message 1740 for requesting login to the SNS server to be displayed.

Upon detecting a user action for requesting text input (step S174), the controller 440 may control a virtual keyboard 1750 to be displayed on a screen.

If the user completes authentication information input for login to the SNS server (step S175), the controller 440 controls a content recommendation confirmation message 1760 to be displayed on the screen. The content recommendation confirmation message 1760 includes a user identifier 1761, content information 1762 about recommended content, a thumbnail 1763 of the recommended content, an "OK" button 1764, and a "Go check" button 1765. Here, the user identifier 1761 may be input through the GUI 1730. In some embodiments, the content recommendation confirmation message 1760 includes at least one of the user identifier 1761, the content information 1762 about recommended content, the thumbnail 1763 of the recommended content, the "OK" button 1764, or the "Go check" button 1765.

Upon detecting a user action for selecting the "OK" button 1764 (step S176), the controller 440 controls the content recommendation confirmation message 1760 to disappear from the screen. The display 402 may continue to display the screen prior to display of the content recommendation confirmation message 1760.

Upon detecting a user action for selecting the "Go check" button 1765, the controller 440 controls a screen 1770 to be displayed. The screen 1770 includes a content display region 1771 and a page region 1775. The page region 1775 displays a display page including a feed 1451 associated with the content recommended in step S171. Here, the displayed display page may be received from the SNS server to which the user logs in using the authentication information.

Figure 18:
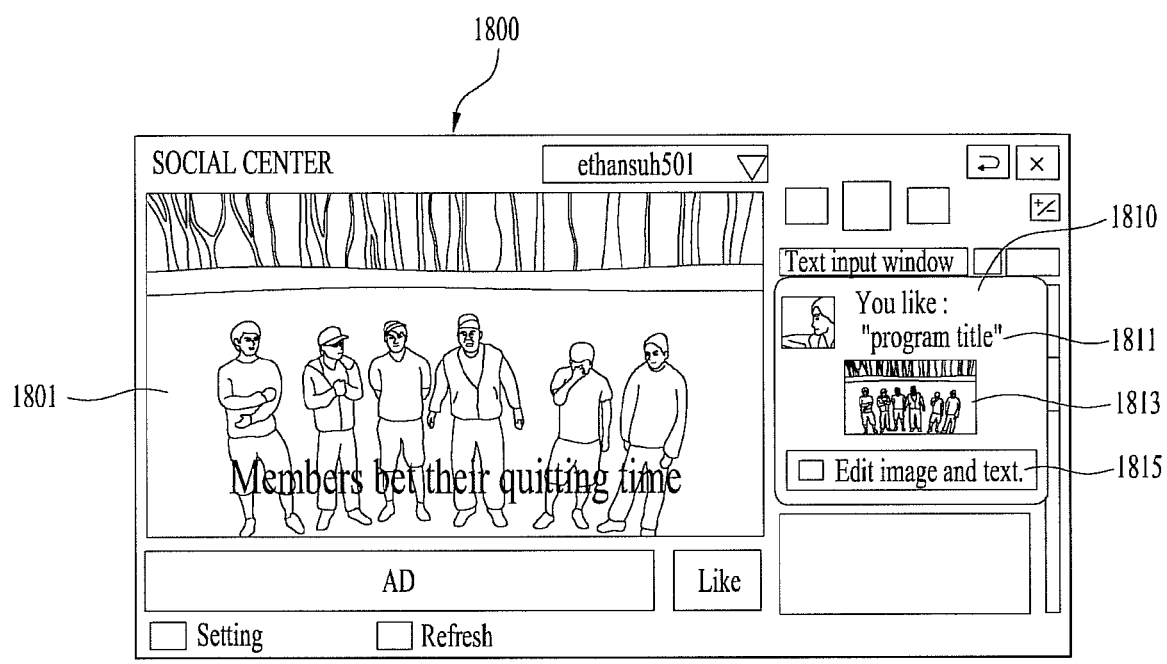
FIG. 18 is a diagram illustrating an exemplary embodiment of a screen on which a content recommendation confirmation message is displayed.

FIG. 18 is a diagram illustrating an exemplary embodiment of a screen on which a content recommendation confirmation message is displayed.

Referring to FIG. 18, the display 402 displays a screen 1800. The screen 1800 corresponds to a screen on which a content recommendation confirmation message 1810 is displayed in the state that content 1801 is displayed in an active mode. The content recommendation confirmation message 1810 includes content information 1811 about the content, a thumbnail 1813, and an editing execution button 1815. Here, the thumbnail 1813 may be obtained by capturing an image of content displayed when a user action for requesting content recommendation is detected.

A user may edit the content information 1811 through a user action for selecting the editing execution button 1815.

Figure 19:
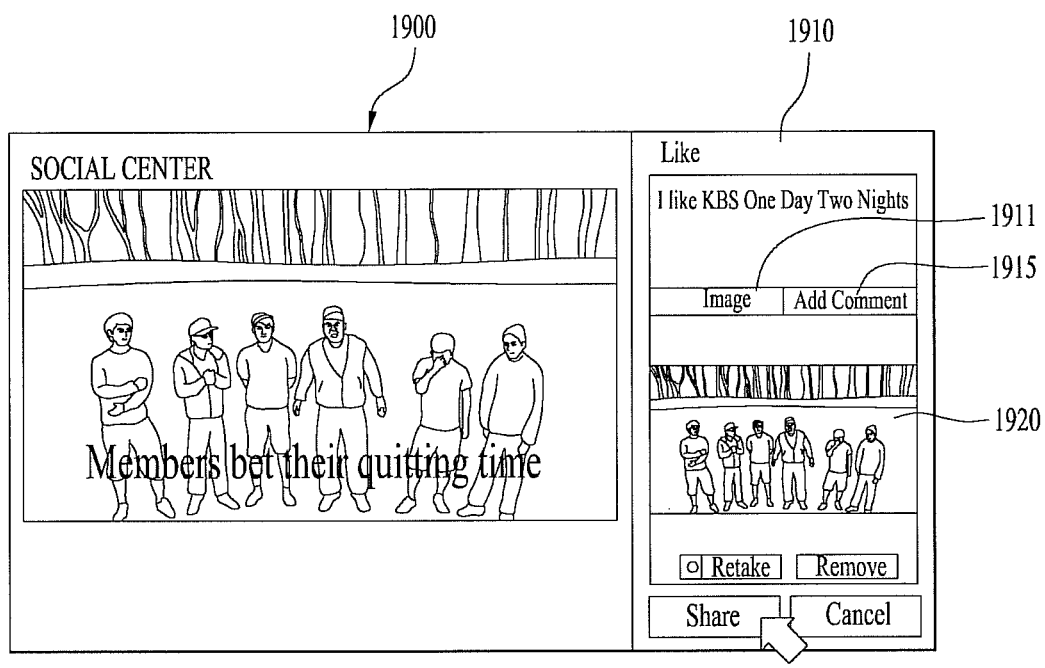
FIG. 19 is a diagram illustrating an exemplary embodiment of a screen on which a GUI for information editing is displayed.

FIG. 19 is a diagram illustrating an exemplary embodiment of a screen on which a GUI for information editing is displayed.

Referring to FIG. 19, the display 402 displays a screen 1900. The screen 1900 may be displayed when a user action for selecting the editing execution button 1815 of the screen 1800 is detected.

The screen 1900 includes a GUI 1910 for information editing.

The GUI 1910 includes an image editing tab 1911 and a text editing tab 1915. The GUI 1910 on which the image editing tab 1911 has been selected is displayed on the screen 1900. A user may delete the thumbnail 1920, replace the thumbnail 1920 with another thumbnail, and edit the thumbnail 1920, using the GUI 1910.

Figure 20:
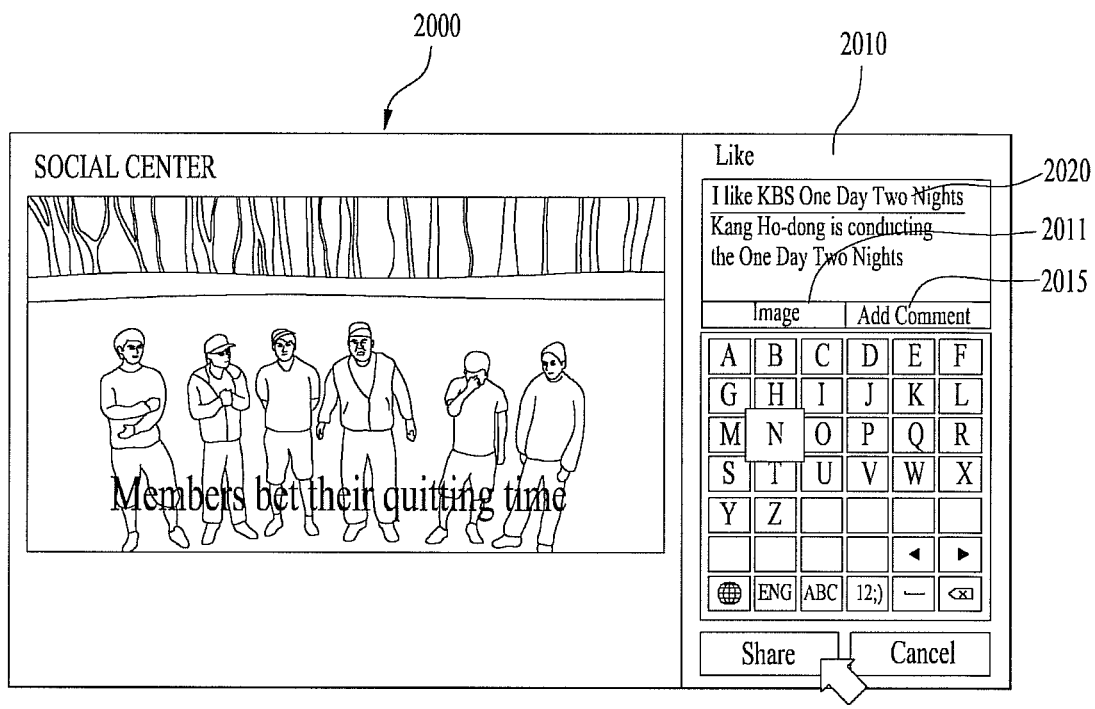
FIG. 20 is a diagram illustrating another exemplary embodiment of a screen on which a GUI for information editing is displayed.

FIG. 20 is a diagram illustrating another exemplary embodiment of a screen on which a GUI for information editing is displayed.

Referring to FIG. 20, the display 402 displays a screen 2000. The screen 2000 may be displayed when a user action for selecting the editing execution button 1815 of the screen 1800 is detected.

The screen 2000 includes a GUI 2010 for information editing.

The GUI 2010 includes an image editing tab 2010 and a text editing tab 2015. On the screen 2000 is displayed the GUI 2010 on which the text editing tab 2015 has been selected. A user may input and edit a content description 2020 using the GUI 2010.

Figure 21:
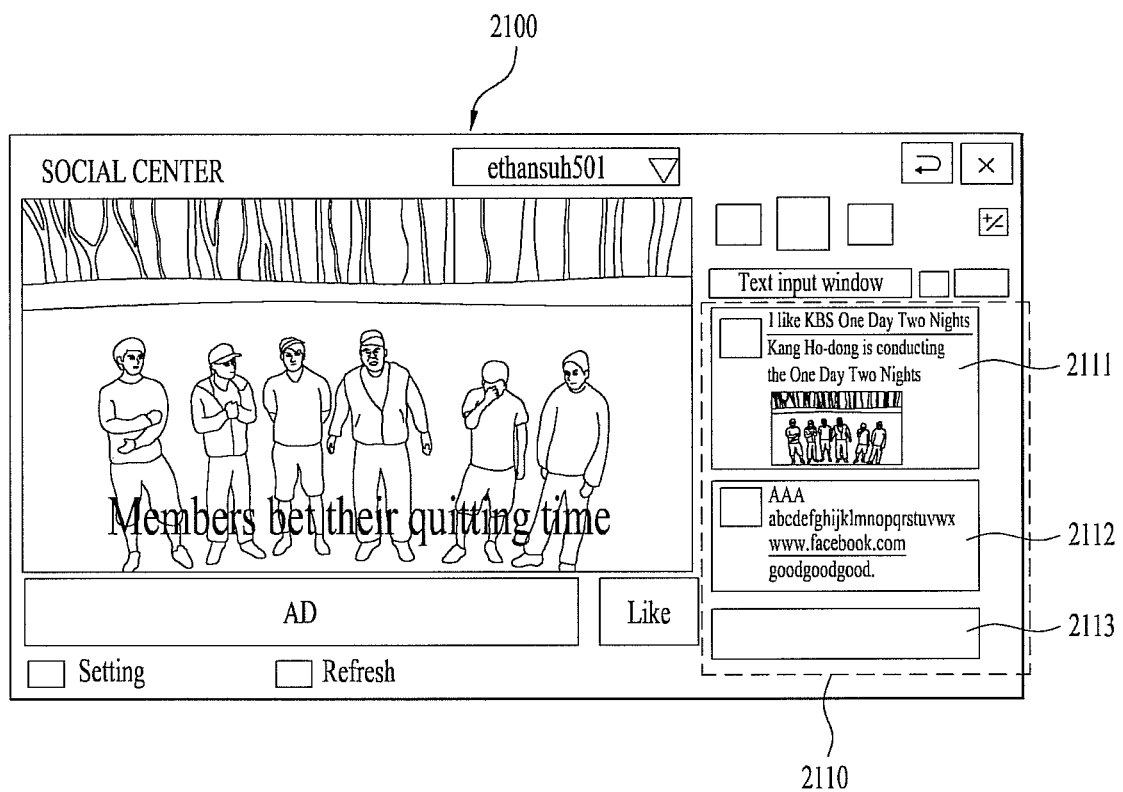
FIG. 21 is a diagram illustrating an exemplary embodiment of a screen on which a display page is displayed.

FIG. 21 is a diagram illustrating an exemplary embodiment of a screen on which a display page is displayed.

Referring to FIG. 21, the display 402 displays a screen 2100. The screen 2100 displays a display page 2110. The display page 2110 may be received from an SNS server.

The display page 2110 includes a plurality of feeds 2111, 2112, and 2113. The feed 2111 includes the content information 1811 and thumbnail 1813 included in the content recommendation confirmation message 1810 of the screen 1800 of FIG. 18. The feed 2111 also includes the content description 2020 of the screen 2000 of FIG. 20.

Figure 22:
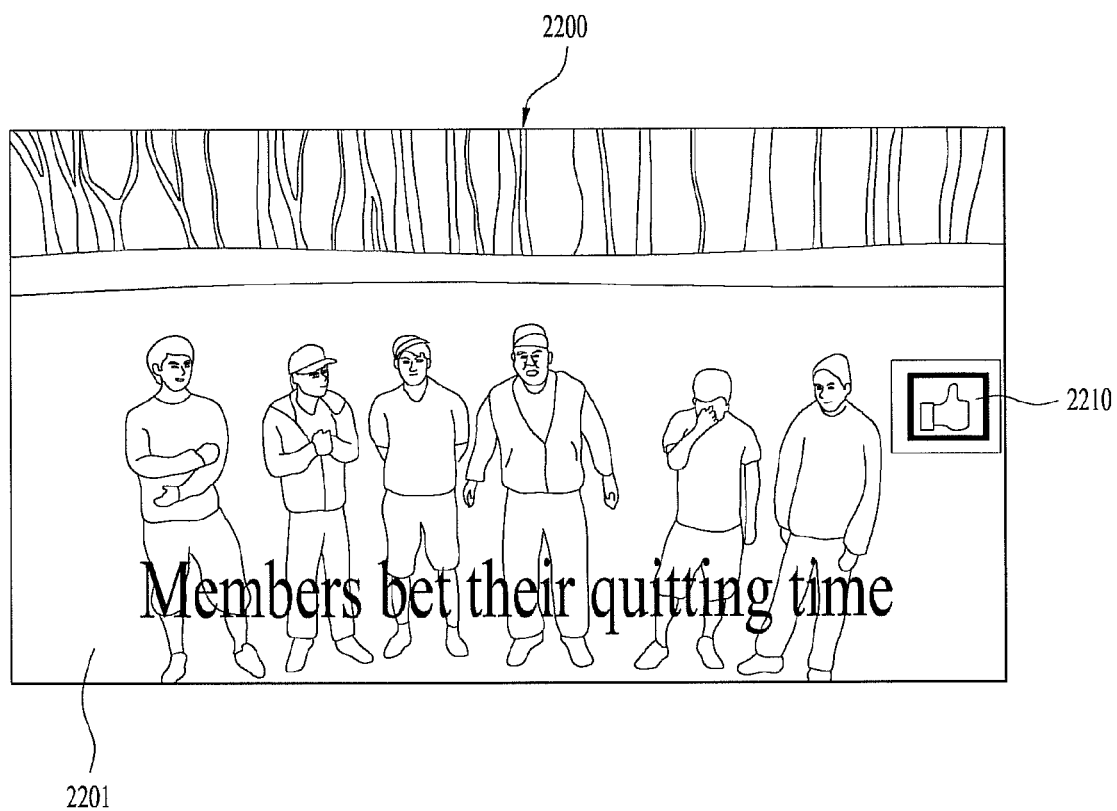
FIG. 22 is a diagram illustrating an exemplary embodiment of a screen on which content in a fullscreen mode is displayed.

FIG. 22 is a diagram illustrating an exemplary embodiment of a screen on which content is displayed in a fullscreen mode.

Referring to FIG. 22, the display 402 displays a screen 2200. The screen 2200 displays content 2201 in a fullscreen mode. The screen 2200 includes a "Like" button 2210 for recommending displayed content. A user may take an action for requesting content recommendation by selecting the "Like" button 2210 or a specific key on a remote controller.

Figure 23:
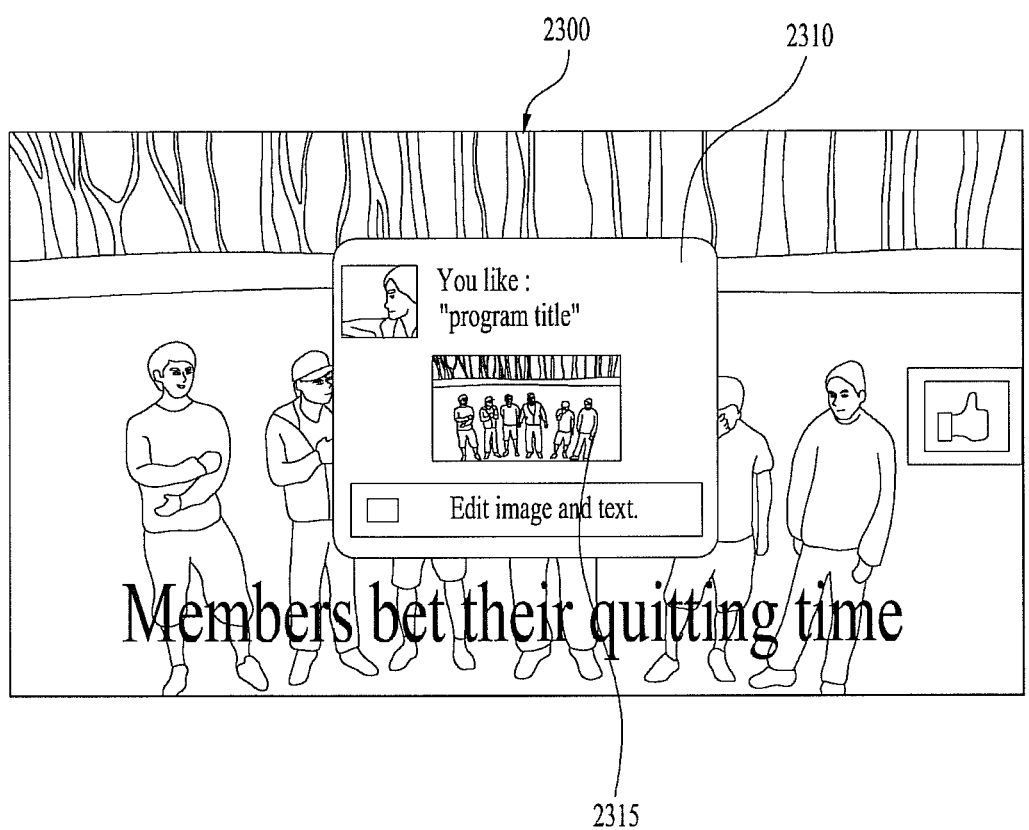
FIG. 23 is a diagram illustrating an exemplary embodiment of a screen on which a content recommendation confirmation message is displayed in a fullscreen mode.

FIG. 23 is a diagram illustrating an exemplary embodiment of a screen on which a content recommendation confirmation message is displayed in a fullscreen mode.

Referring to FIG. 23, the display 402 displays a screen 2300. The screen 2300 corresponds to a screen on which a content recommendation confirmation message 2310 is displayed in a fullscreen mode. The controller 440 may control the screen 2300 to be displayed when a user action for requesting content recommendation is detected under the state the screen 2200 of FIG. 22 is displayed.

The content recommendation confirmation message 2310 includes an image 2315 of the content 2201 displayed on the screen 2200 in the form of a thumbnail.

FIG. 24 is a diagram explaining an exemplary embodiment of a process in which a content recommendation confirmation message disappears.

Referring to FIG. 24, a content recommendation confirmation message 2410 displayed on a screen may disappear after a predetermined time. The content recommendation confirmation message 2410 may disappear while moving in a direction 2455 towards a location 2451 at which a specific icon 2422 of a menu region 2420 is present. The specific icon 2422 may be an icon for displaying a display page of an SNS server. The display page may include a feed which contains details of recommendation about content recommended by the content recommendation confirmation message 2410.

Figure 25:
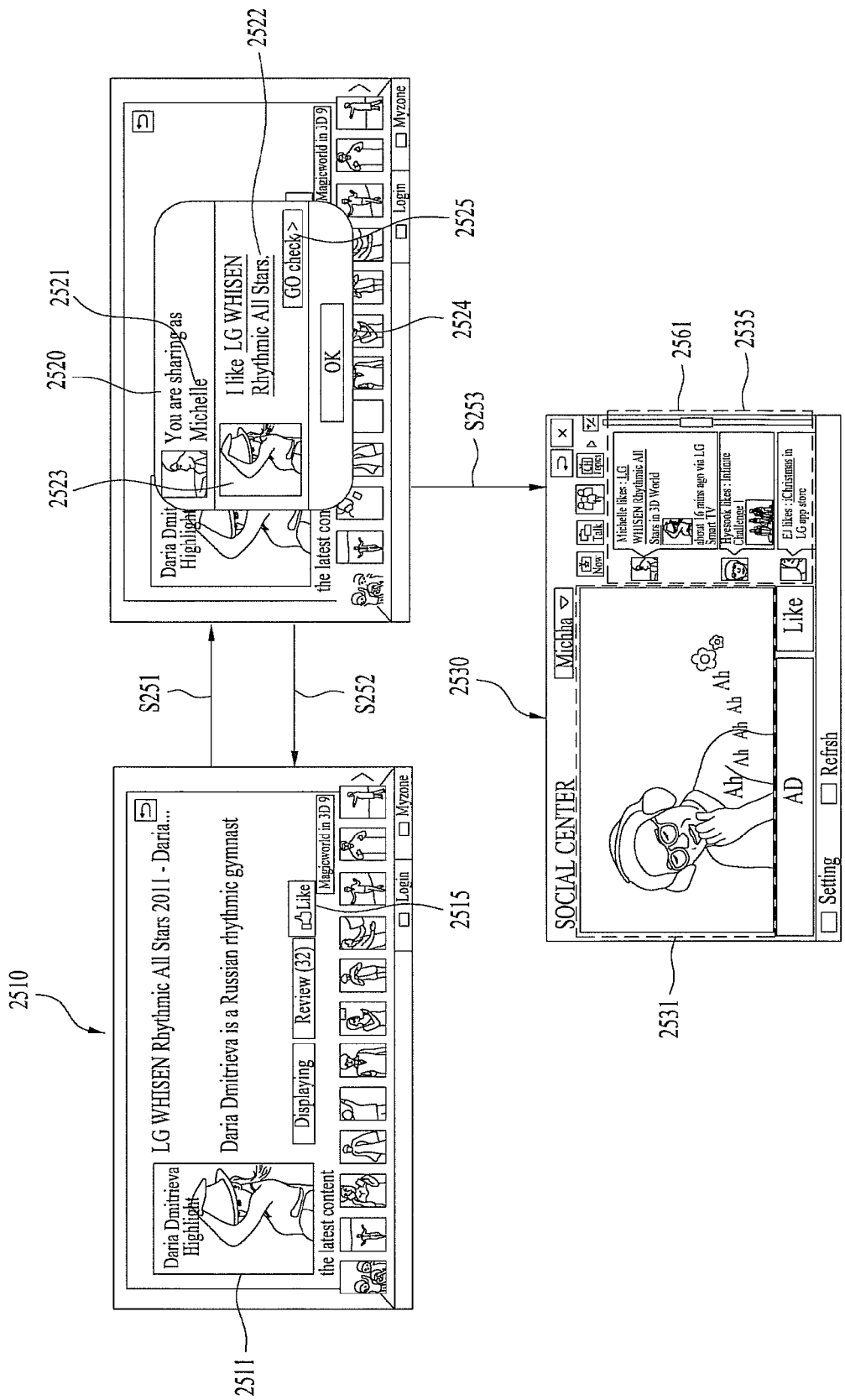
FIG. 25 is a diagram illustrating an exemplary embodiment of a screen displayed in the execution process of a method for providing a content recommendation service according to the present invention.

FIG. 25 is a diagram illustrating an exemplary embodiment of a screen displayed in the execution process of a method for providing a content recommendation service according to the present invention.

Referring to FIG. 25, the display 402 displays a screen 2510. The screen 2510 displays a page including a detailed description of video content 2511. The page may be a web page or an execution screen of an application.

Under the state that the screen 2510 is displayed, the controller 440 detects a user action for requesting content recommendation (step S251). The user action may be an action for selecting a "Like" button 2515. Here, recommended content may be the content 2511 displayed on the screen 2510.

The controller 440 displays a content recommendation confirmation message 2520 on the screen in response to the detected user action. The content recommendation confirmation message 2520 includes a user identifier 2521, content information 2522 about recommended content, a thumbnail 2523 of the recommended content, an "OK" button 2524, and a "Go check" button 2525. The user identifier 2521 may be an identifier of a user logged in to an electronic device and the thumbnail 2523 may be a thumbnail 2511.

Upon detecting a user action for selecting the "OK" button 2524 (step S252), the controller 440 controls the content recommendation confirmation message 2520 to disappear from the screen. The display 402 may continue to display the screen 2510 which is a screen prior to display of the content recommendation confirmation message 2520.

Upon detecting a user action for selecting the "Go check" button 2525, the controller 440 controls a screen 2530 to be displayed. The screen 2530 includes a display region 2531 and a page region 2535. The page region 2535 displays a display page including a feed 2561 associated with content recommended in step S251. Here, the displayed display page may be received from an SNS server.

Figure 26:
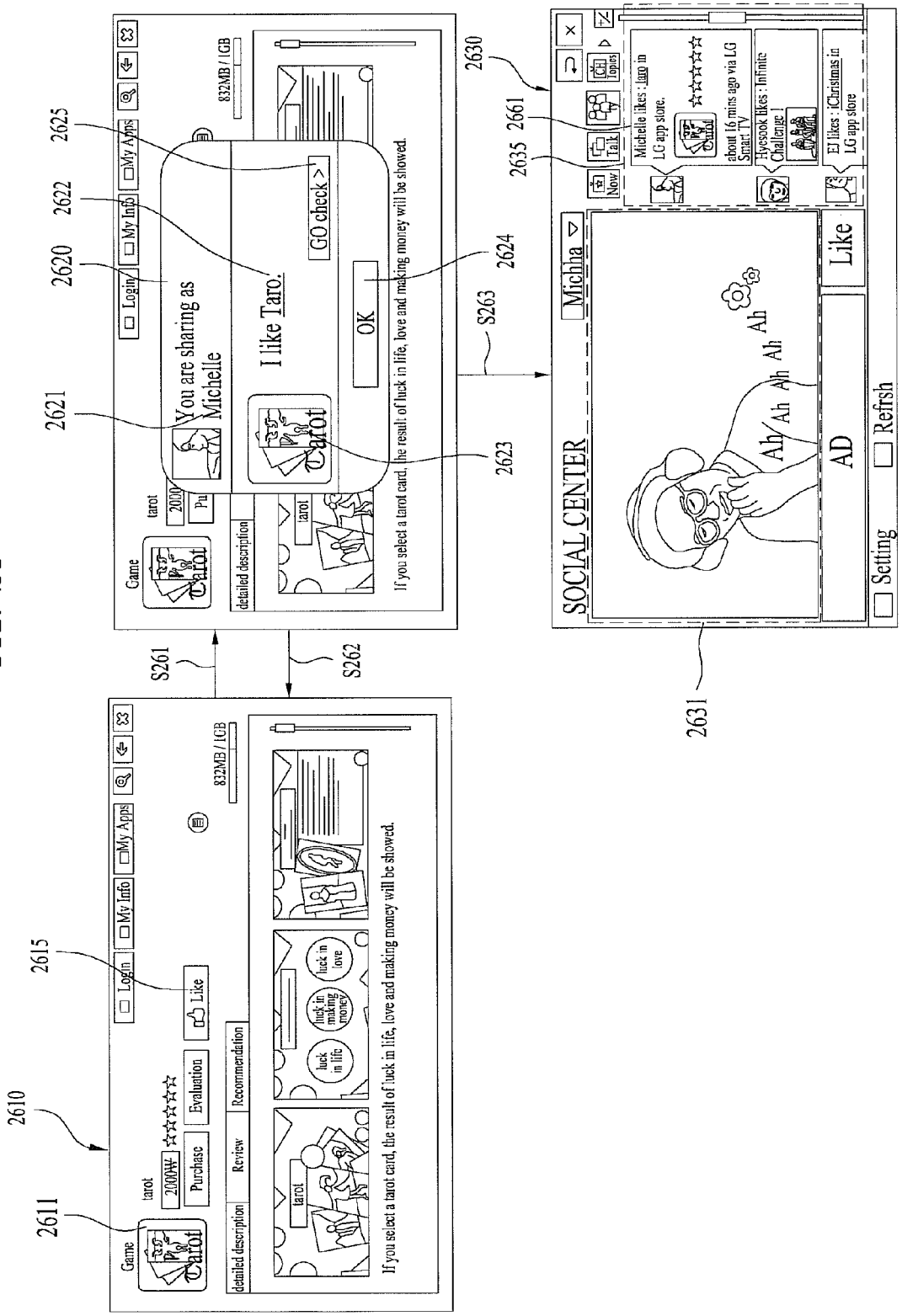
FIG. 26 is a diagram illustrating another exemplary embodiment of a screen displayed in the execution process of a method for providing a content recommendation service according to the present invention.

FIG. 26 is a diagram illustrating another exemplary embodiment of a screen displayed in the execution process of a method for providing a content recommendation service according to the present invention.

Referring to FIG. 26, the display 402 displays a screen 2610. The screen 2610 displays a page including a detailed description of an application 2611. The page may be a web page or an execution screen of an application.

Under the state that the screen 2610 is displayed, the controller 440 detects a user action for requesting content recommendation (step S261). The user action may be an action for selecting a "Like" button 2615. Here, recommended content may be the content 2611 displayed on the screen 2610.

The controller 440 displays a content recommendation confirmation message 2620 on the screen in response to the detected user action. The content recommendation confirmation message 2620 includes a user identifier 2621, content information 2622 about recommended content, a thumbnail 2623 of the recommended content, an "OK" button 2624, and a "Go check" button 2625. The user identifier 2621 may be an identifier of a user logged in to an electronic device and the thumbnail 2623 may be a thumbnail 2611.

Upon detecting a user action for selecting the "OK" button 2624 (step S262), the controller 440 controls the content recommendation confirmation message 2620 to disappear from the screen. The display 402 may continue to display the screen 2610 which is a screen prior to display of the content recommendation confirmation message 2620.

Upon detecting a user action for selecting the "Go check" button 2625, the controller 440 controls a screen 2630 to be displayed. The screen 2630 includes a display region 2631 and a page region 2635. The page region 2635 displays a display page including a feed 2661 associated with content recommended in step S261. Here, the displayed display page may be received from an SNS server.

Figure 27:
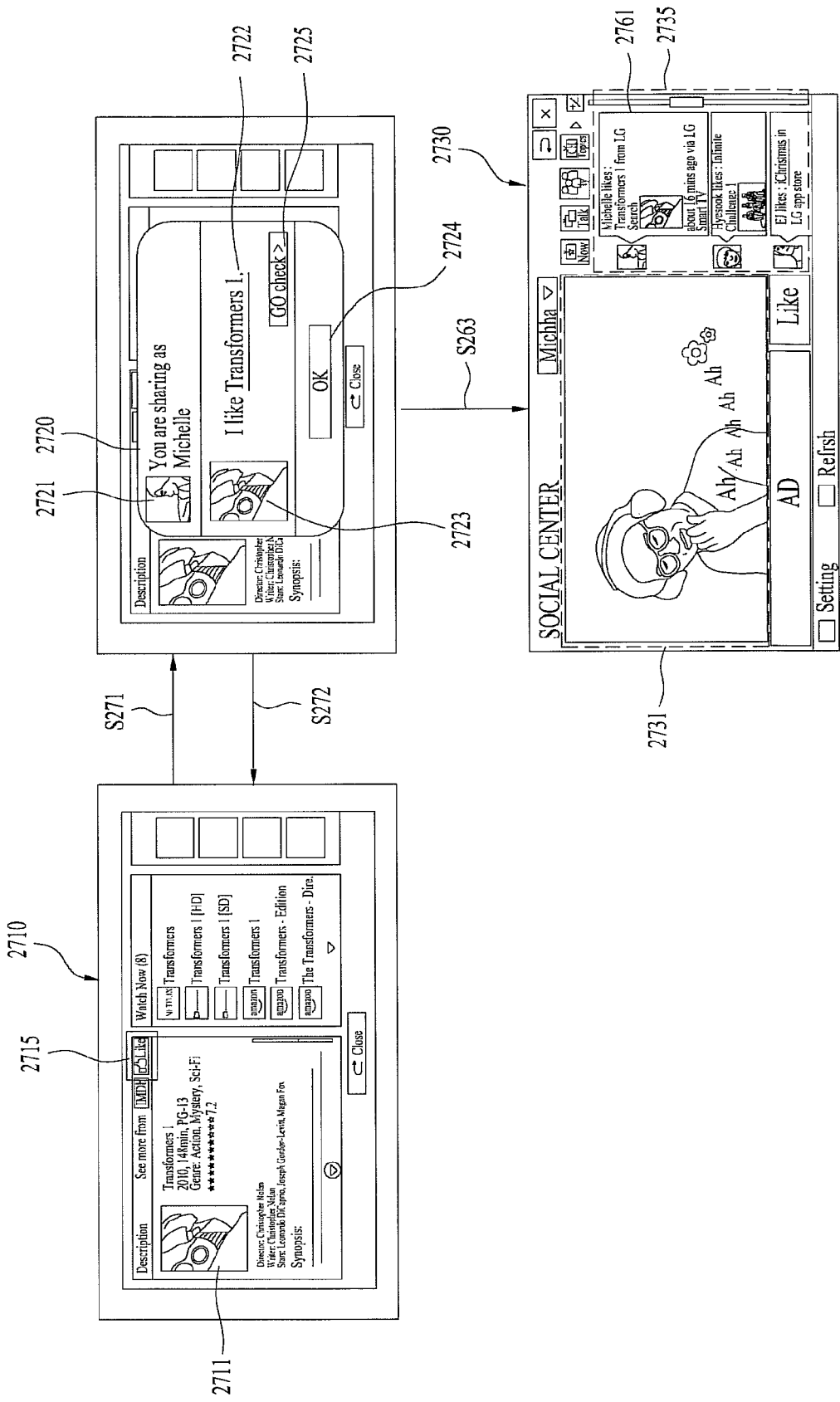
FIG. 27 is a diagram illustrating still another exemplary embodiment of a screen displayed in the execution process of a method for providing a content recommendation service according to the present invention.

FIG. 27 is a diagram illustrating still another exemplary embodiment of a screen displayed in the execution process of a method for providing a content recommendation service according to the present invention.

Referring to FIG. 27, the display 402 displays a screen 2710. The screen 2710 displays a page including a detailed description of Video On Demand (VOD) content 2711. The page may be a web page or an execution screen of an application.

Under the state that the screen 2710 is displayed, the controller 440 detects a user action for requesting content recommendation (step S271). The user action may be an action for selecting a "Like" button 2715. Here, recommended content may the content 2711 displayed on the screen 2510.

The controller 440 displays a content recommendation confirmation message 2720 on the screen in response to the detected user action. The content recommendation confirmation message 2720 includes a user identifier 2721, content information 2722 about recommended content, a thumbnail 2723 of the recommended content, an "OK" button 2724, and a "Go check" button 2725. The user identifier 2721 may be an identifier of a user logged in to an electronic device and the thumbnail 2723 may be the thumbnail 2711.

Upon detecting a user action for selecting the "OK" button 2724 (step S272), the controller 440 controls the content recommendation confirmation message 2720 to disappear from the screen. The display 402 may continue to display the screen 2710 which is a screen prior to display of the content recommendation confirmation message 2570.

Upon detecting a user action for selecting the "Go check" button 2725, the controller 440 a screen 2730 to be displayed. The screen 2730 includes a display region 2731 and a page region 2735. The page region 2735 displays a display page including a feed 2761 associated with content recommended in step S271. Here, the displayed display page may be received from an SNS server.

Figure 28:
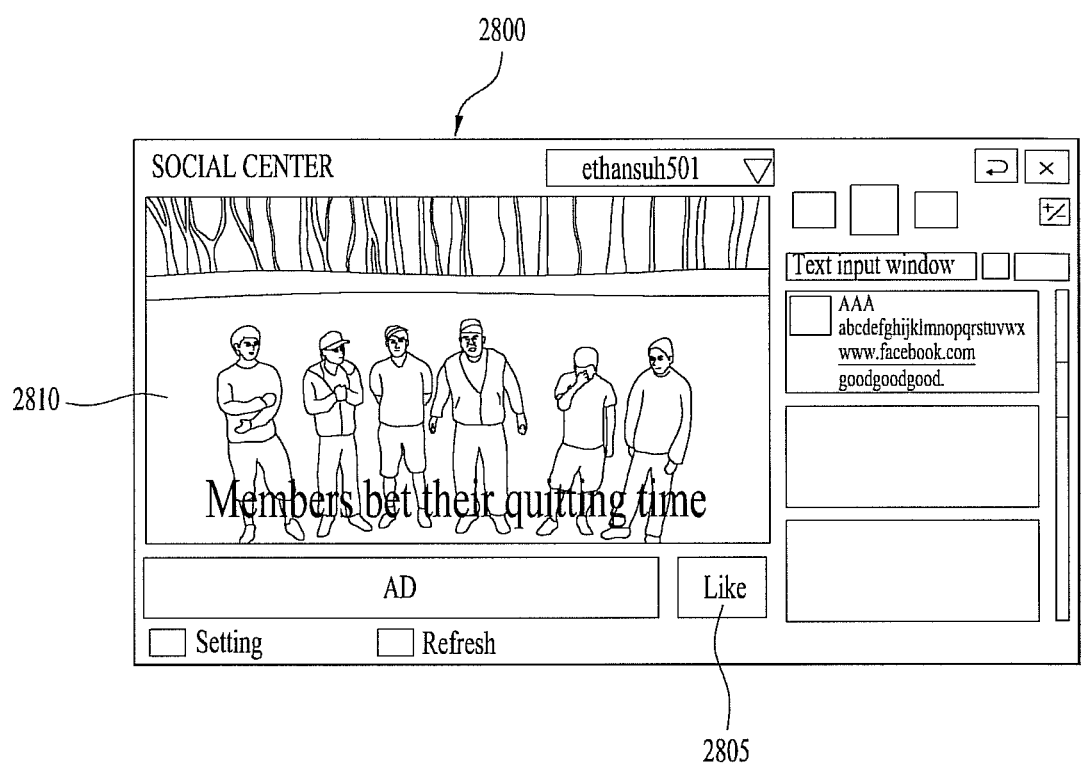
FIG. 28 is a diagram illustrating a screen on which a real-time broadcast is displayed.

FIG. 28 is a diagram illustrating a screen on which a real-time broadcast is displayed.

Referring to FIG. 28, the display 402 displays a screen 2800. The screen 2800 displays a real-time broadcast program 2810.

When the screen 2800 is displayed, the controller 440 may detect a user action for requesting content recommendation. The user action may be an action for selecting a "Like" button 2805. Here, recommended content may be the real-time broadcast program 2810 displayed on the screen 2800.

In response to the detected user action, the controller 440 may display the content recommendation confirmation message 1810 of FIG. 18. The content information 2811 of the content recommendation confirmation message 1810 may include broadcast information about the real-time broadcast program 2810 and the thumbnail 1813 may be a thumbnail of the displayed image 2810.

Figure 29:
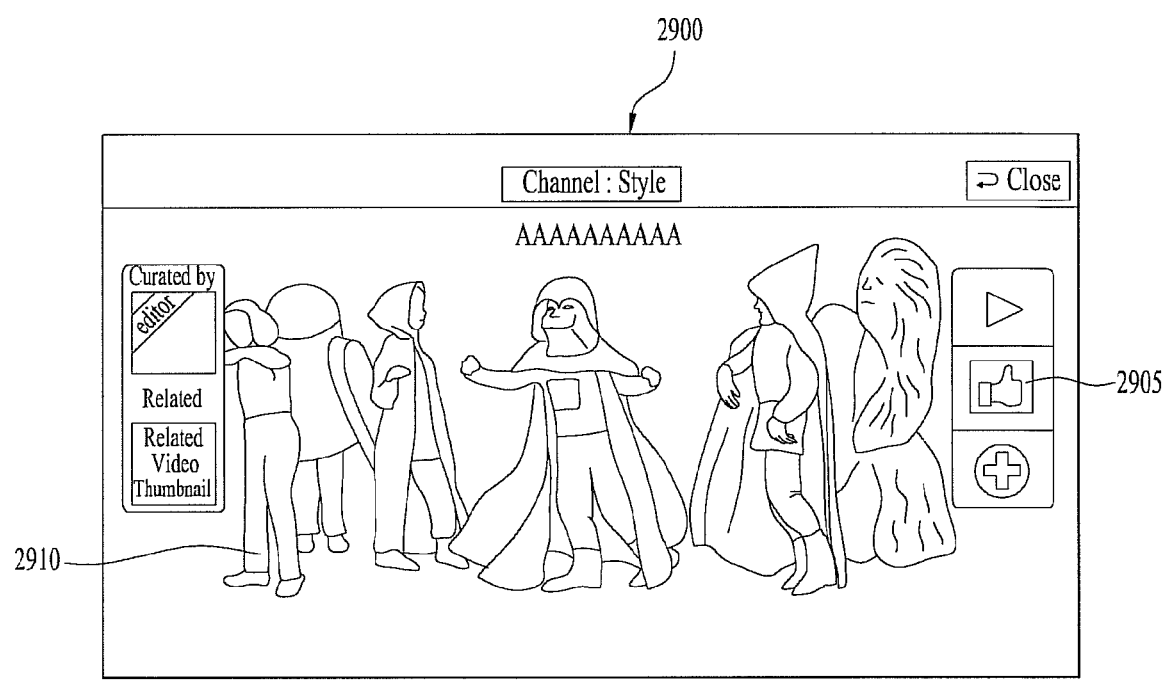
FIG. 29 is a diagram illustrating a screen on which Video On Demand (VOD) content is displayed.

FIG. 29 is a diagram illustrating a screen on which Video On Demand (VOD) content is displayed.

Referring to FIG. 28, the display 402 displays a screen 2900. The screen 2900 displays VOD content 2910.

When the screen 2900 is displayed, the controller 440 may detect a user action for requesting content recommendation. The user action may be an action for selecting a "Like" button 2905. Here, recommended content may be the VOD content 2910 displayed on the screen 2800.

In response to detecting of the user action, the controller 440 may display the content recommendation confirmation message 1810 of FIG. 18. The content information 2811 of the content recommendation confirmation message 1810 may include content information about the VOD content 2910 and the thumbnail 1813 may be a thumbnail of the displayed image 2910.

Figure 30:
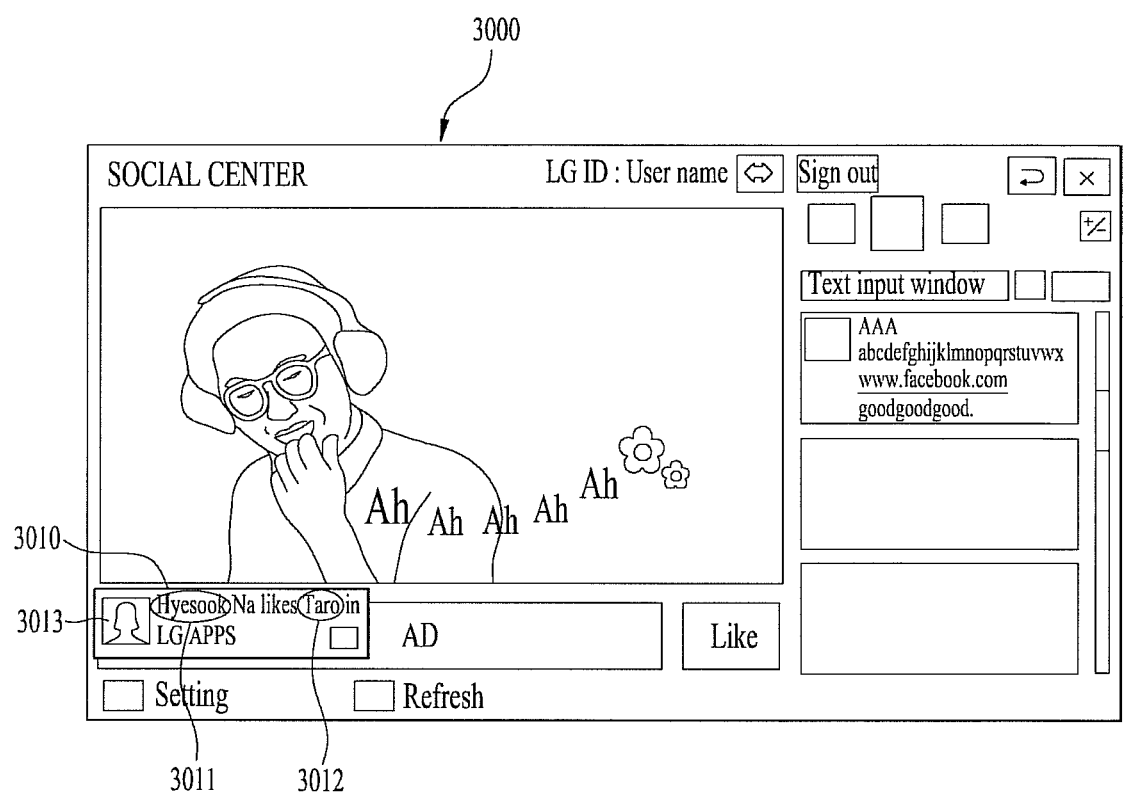
FIG. 30 is a diagram illustrating an exemplary embodiment of a screen on which a message indicating content recommended by other users is displayed.

FIG. 30 is a diagram illustrating an exemplary embodiment of a screen on which a message indicating content recommended by other users is displayed.

Referring to FIG. 30, the display 402 displays a screen 3000. The screen 3000 is an exemplary screen on which a content recommendation notification message 3010 is displayed in an active mode. The content recommendation notification message 3010 includes a username 3011 of a user who recommends content, a recommended content name 3012, and a user thumbnail 3013. In some embodiments, the content recommendation notification message 3010 may include at least one of the username 3011, the recommended content name 3012, or the user thumbnail 3013.

The network interface 420 may receive a message indicating content recommendation from an SNS server. The message may include a content recommendation username, a content name, a user thumbnail, and a feed indicator of a display page. The feed indicator indicates a feed associated with content recommended by the user. Upon receipt of the message, the controller 440 may control the content recommendation notification message 3010 to be displayed. Upon receiving a content post relay message from the server 10, the SNS server may transmit a message indicating content recommendation to an electronic device of an SNS user.

Upon detecting a user action for selecting the content recommendation notification message 3010, the controller 440 directs focus toward a feed of a display page associated with the content recommendation notification message 3010. The associated feed may be a feed indicated by a feed indicator included in the message indicating content recommendation.

Figure 31:
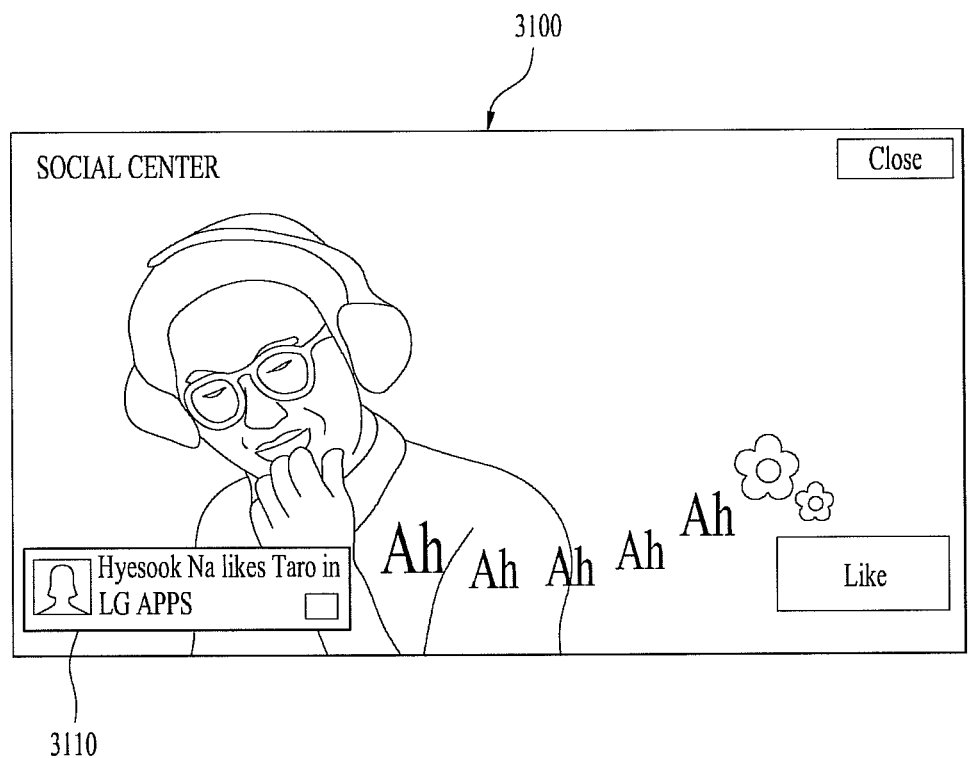
FIG. 31 is a diagram illustrating another exemplary embodiment of a screen on which a message indicating content recommended by other users is displayed.

FIG. 31 is a diagram illustrating another exemplary embodiment of a screen on which a message indicating content recommended by other users is displayed.

Referring to FIG. 31, the display 402 displays a screen 3100. The screen 3100 is an exemplary screen on which a content recommendation notification message 3110 is displayed in a fullscreen mode.

Upon detecting a user action for selecting the content recommendation notification message 3110, the controller 440 switches a screen mode from the fullscreen mode to an active mode. The controller 440 directs focus towards a feed of a display page associated with the content recommendation message 3110 in response to detecting of the user action. The associated feed may be a feed indicated by a feed indicator included in a message indicating content recommendation.

Figure 32:
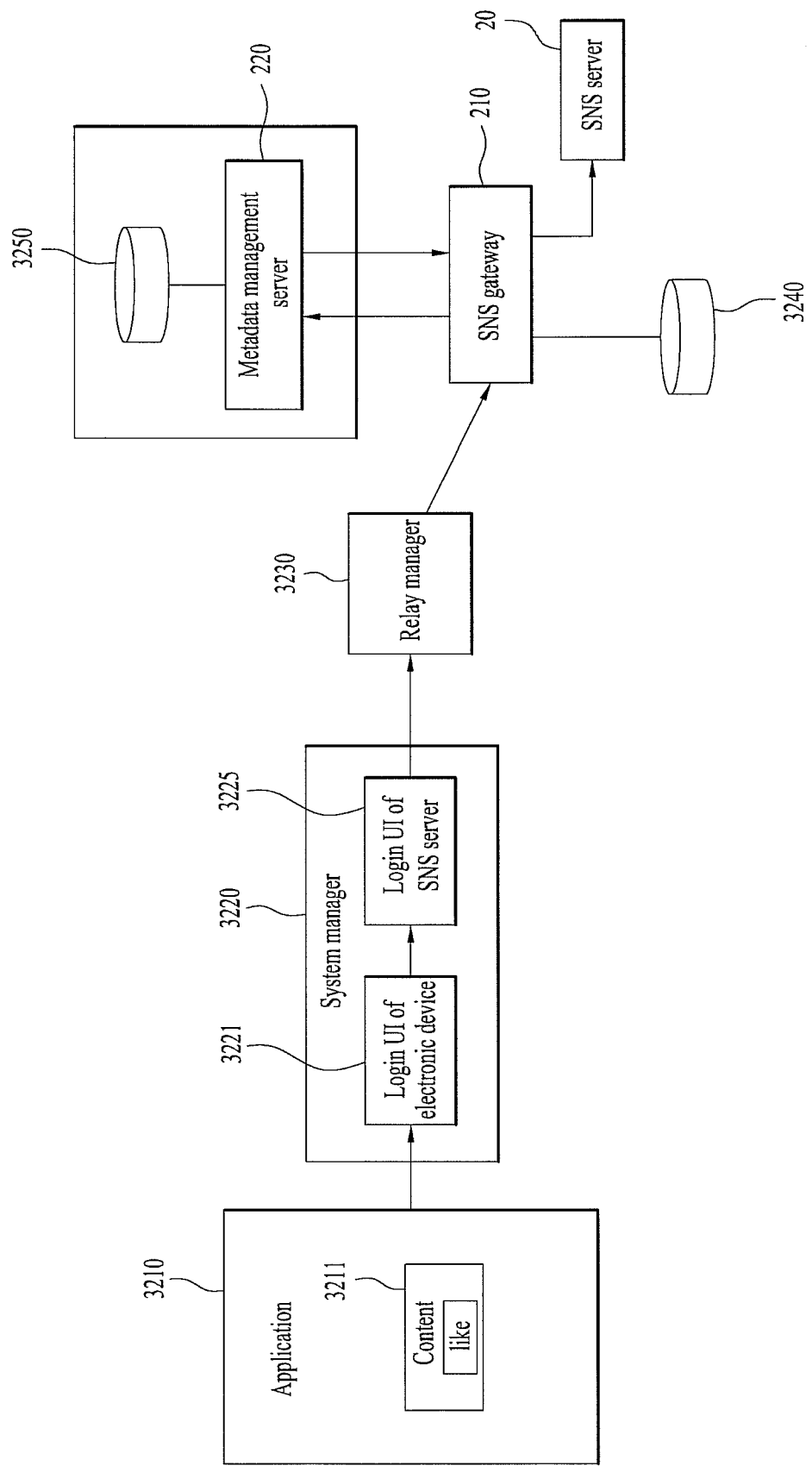
FIG. 32 is a diagram illustrating an exemplary embodiment of data flow in an execution process of a method for providing a content recommendation service according to the present invention.

FIG. 32 is a diagram illustrating an exemplary embodiment of data flow in an execution process of a method for providing a content recommendation service according to the present invention.

Referring to FIG. 32, the controller 440 may include an application 3210, a system manager 3220, and a relay manager 3230. In some embodiments, the application 3210, the system manager 3220, and the relay manager 3230 may be a process executed in the controller 440.

The application 3210 displays content 3211. The content 3211 may include at least one of text, image content, audio content, video content, real-time broadcast program, or an application. The application 3210 may be a web browser, a content player, or a dedicated application.

The application 3210 detects a user action for requesting recommendation of the content 3211. The application 3210 extracts content information about the content 3211 in response to the detected user action. The application 3210 captures at least part of displayed images of the content 3211.

The application 3210 transfers the extracted content information and the captured image to the system manager 3220. The content information may include at least one of content post information or content playback information. The content post information may include at least one of a country code, a region code, a content name, a content module name, or a web URL. The content playback information may include at least one of content type information, an audio ID (or an audio identifier), a content ID (or a content identifier), a channel name, a physical channel number, a major channel number, a minor channel number, a source index, a start time, or an end time. The captured image may be included in a content thumbnail binary.

The system manager 3220 checks whether a user has logged in to an electronic device. If the user has not logged in to the electronic device, the system manager 3220 displays a login User Interface (UI) 3221. The login UI 3221 may be the GUI 1630 shown in FIG. 16. The system manager 3220 may process the execution process shown in FIG. 16.

The system manager 3220 checks whether the user has logged in to an SNS server. If the user has not logged in to the SNS server, the system manager 3220 displays a login UI 3225. The login UI 3225 may be the message 1520 shown in FIG. 15. The system manager 3220 may process the execution process shown in FIG. 15

The system manager 3220 transmits, to the relay manager 3230, at least one of content information, an image, a user identifier of a user logged in to the electronic device, a session identifier for identifying a session with the SNS server, or a session identifier secret, transferred by the application 3210.

In some embodiments, the application 3210 may check whether the user has logged in to the electronic device and the SNS server and may display the login UIs 3221 and 3225.

The relay manager 3230 transmits, to an SNS gateway 210, content information, an image, a user identifier, a session identifier, and a session identifier secret, transferred by the system manager 3220.

The SNS gateway 210 receives the content information, image, user identifier, session identifier, and session identifier secret from the relay manager 3230. The SNS gateway 210 then assigns metadata ID to the received content information and transmits the metadata ID, content information, image, and user identifier to a metadata management server 220. The metadata management server 220 stores the metadata ID, content information, image, and user identifier in a storage region 3250 in association with each other.

The SNS gateway 210 stores the metadata ID, the user identifier, an SNS account related to a session identifier, and content information in a storage region 3240 in association with each other.

The SNS gateway 210 transmits the metadata ID, content information, and image to an SNS server 20 through a session indicated by the session identifier. The SNS server 20 generates a display page which includes a feed for recommending content indicated by a content ID in the content information or updates an existing display page so that the updated display page includes the feed. The SNS gateway 210 may transmit a content post relay message including the metadata ID, content information, and image to the SNS server 20.

Figure 33:
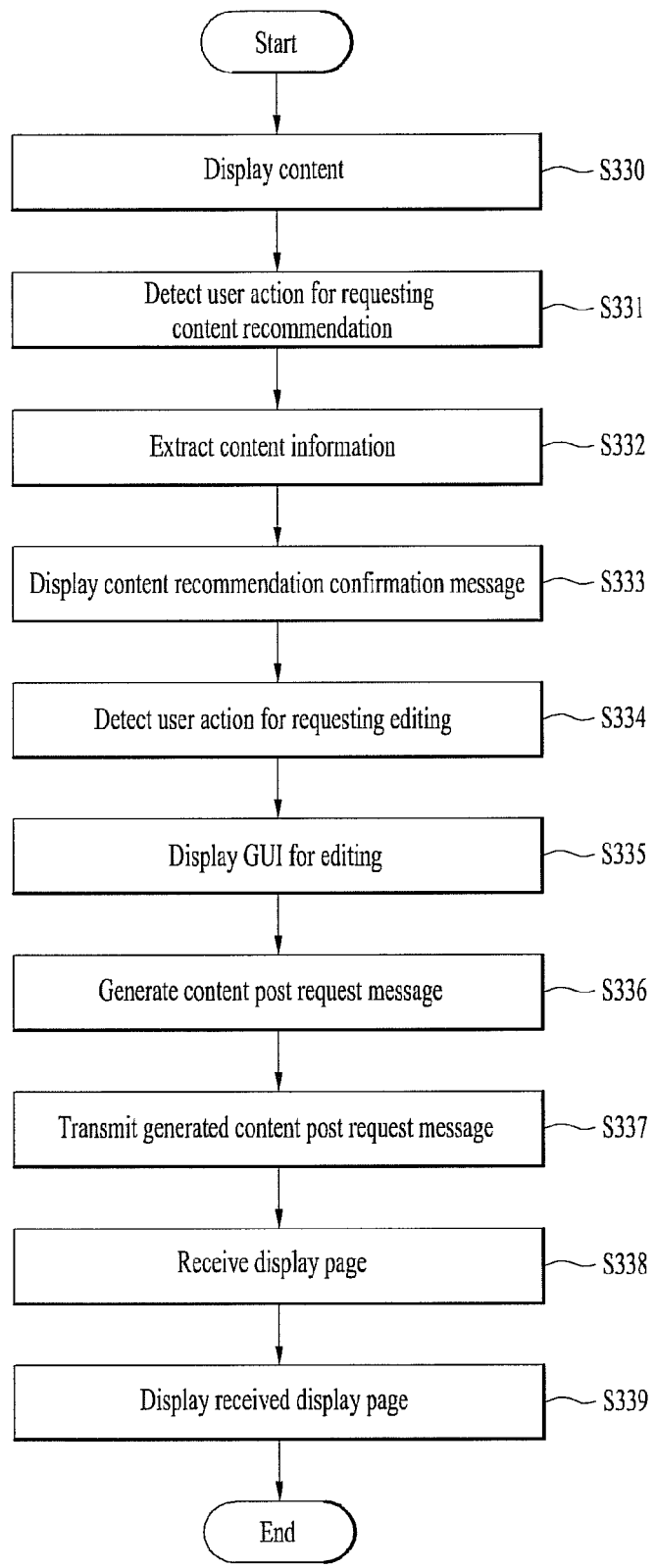
FIG. 33 is a flowchart illustrating an execution process of an exemplary embodiment of a method for providing a content recommendation service according to the present invention.

FIG. 33 is a flowchart illustrating an execution process of an exemplary embodiment of a method for providing a content recommendation service according to the present invention.

Referring to FIG. 33, the display 401 displays content (step S330). The displayed content may include at least one of text, image content, audio content, video content, real-time broadcast program, or an application. The content may be displayed on a web page, may be a search result, or may be a page on which a detailed description of the content is displayed. The content may be displayed in a fullscreen mode or an active mode.

The controller 440 detects a user action for requesting recommendation of the content (step S331).

The controller 440 extracts content information about the content displayed on a screen in response to the detected user action (S332). The extracted content information may include at least one of content post information or content playback information.

If the displayed content is a real-time broadcast program, the content information may include at least one of a photo of a user recommending the content, a username, active type information indicating content recommendation, a title, a broadcast screen, content type information indicating the real-time broadcast program, a channel number of the real-time broadcast program, a name of a broadcasting station broadcasting the real-time broadcast program, or a title of the real-time broadcast program.

If the displayed content is an application, the content information may include at least one of a photo of a user recommending the content, a username, active type information indicating content recommendation, a title, an application photo, content type information indicating the application, an application ID, or a URL.

If the displayed content is VOD content, the content information may include at least one of a photo of a user recommending the content, a username, active type information indicating content recommendation, a VOD content photo, content type information indicating the VOD content, or a URL.

If the displayed content is a search result, the content information may include at least one of a photo of a user recommending the content, a username, active type information indicating content recommendation, a content title included in the search result, a content photo included in the search result, content type information indicating a type of content included in the search result, an application ID, a content ID, or a URL.

If the displayed content is a page displaying a detailed description of the content, the content information may include at least one of a photo of a user recommending the content, a username, active type information indicating content recommendation, a content title included in the page, a content photo included in the page, content type information indicating a type of content included in the page, an application ID, a content ID, or a URL.

The display 402 displays a content recommendation confirmation message (step S333). The content recommendation confirmation message may include the recommendation confirmation message 1420 of FIG. 14, the recommendation confirmation message 1540 of FIG. 15, the recommendation confirmation message 1640 of FIG. 16, the recommendation confirmation message 1760 of FIG. 17, or the recommendation confirmation message 1810 of FIG. 18. The content recommendation confirmation message may also include the execution process of FIG. 14, the execution process of FIG. 15, the execution process of FIG. 16, or the execution process of FIG. 17.

Step S333 may further include a step of obtaining ID information. The ID information may include at least one of a user identifier, a session identifier for identifying a session with an SNS server, or a session identifier secret. Step S333 may further include a step of obtaining a session identifier for identifying a session with an SNS to which a user has logged in and a session identifier secret and a step of obtaining a user identifier of a user who has logged in to the electronic device 400.

Step S333 may further include a step of capturing at least part of the displayed content and a step of recording part of the displayed content.

The controller 440 detects a user action for requesting editing (step S334). The user action may be an action for selecting the editing execution button 1815 of the recommendation confirmation message 1810 of FIG. 18.

The controller 440 controls a GUI for editing to be displayed in response to the detected user action (step S335). The displayed GUI may be the GUI 1910 of FIG. 19 or the GUI 2010 of FIG. 20. A user may edit content information through the GUI.

The controller 440 generates a content post request message including the extracted content information, the obtained ID information, and the edited information (step S336).

The network interface 420 transmits the generated content post request message to the relay server 10 (step S337).

The network interface 420 receives feed data or a display page from the SNS server 20 (step S338). The received feed data may be for displaying a feed associated with the content post request message and the received display page may include a feed associated with the content post request message. The feed includes details of recommendation of the content displayed in step S330. The display page may be automatically received from the SNS server 20 or may be transmitted when requested.

The display 402 displays the received display page (step S339). The display page may include the display page 2110 of FIG. 21, the display page 2535 of FIG. 25, the display page 2635 of FIG. 26, or the display page 2735 of FIG. 27.

Figure 34:
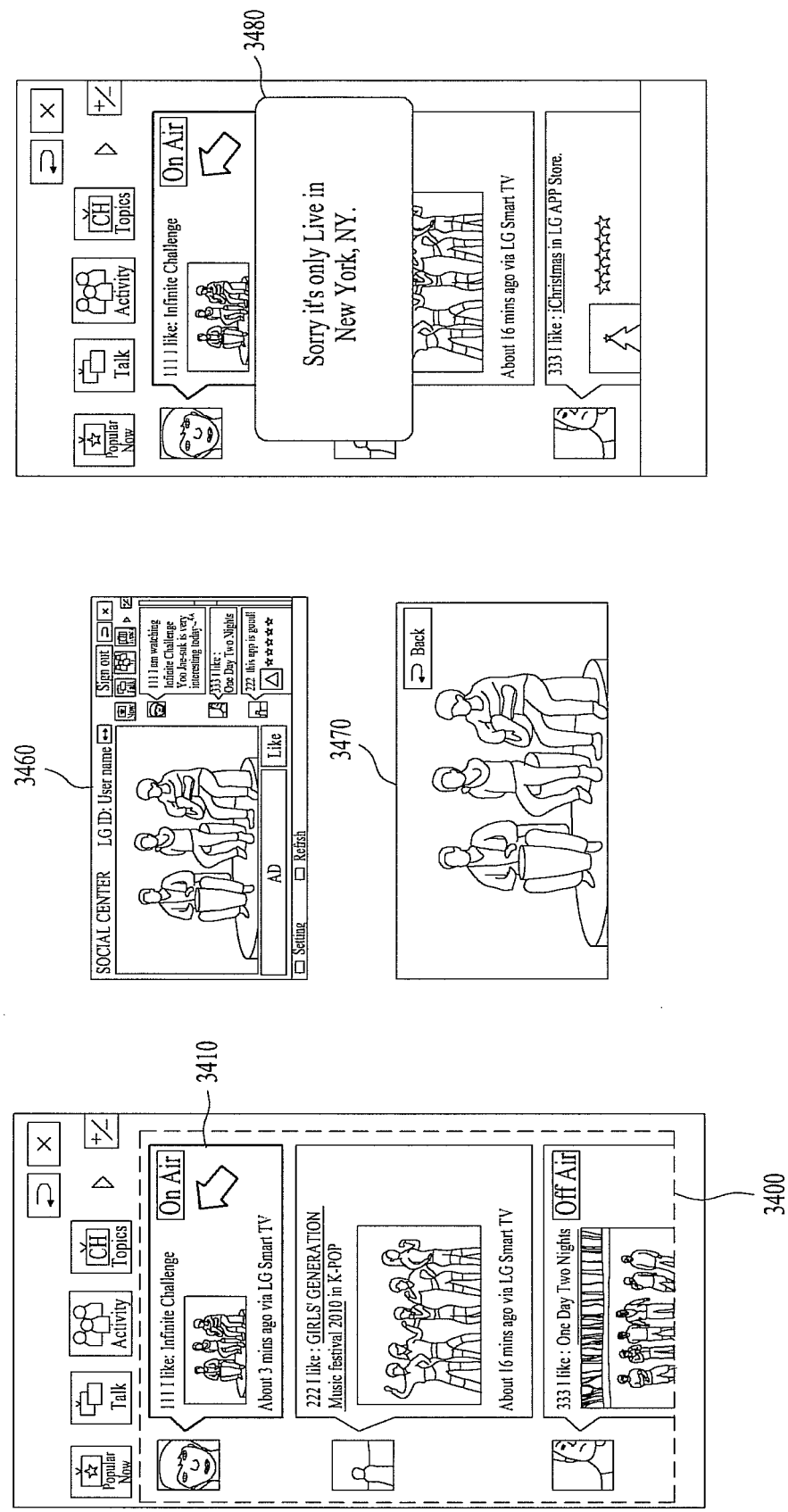
FIG. 34 is a diagram illustrating an exemplary embodiment of a screen executing a function associated with a feed.

FIG. 34 is a diagram illustrating an exemplary embodiment of a screen on which a function associated with a feed is executed.

Referring to FIG. 34, upon detecting a user action for selecting a feed 3410 of a display page 3400, the controller 440 controls a screen 3460 or a screen 3470 to be displayed in response to the detected user action. The screen 3460 displays a real-time broadcast program recommended by the feed 3410 in an active mode. The screen 3470 displays the real-time broadcast program in a fullscreen mode. Here, the title of the real-time broadcast program recommended by the feed 3410 is "Endless Challenge 1".

If the real-time broadcast program recommended by the feed 3410 cannot be displayed, the controller 440 may control a message 3480 indicating that the real-time broadcast program cannot be broadcast to be displayed. The message 3480 indicates that the real-time broadcast program cannot be broadcast because a service is not available in a corresponding region.

Figure 35:
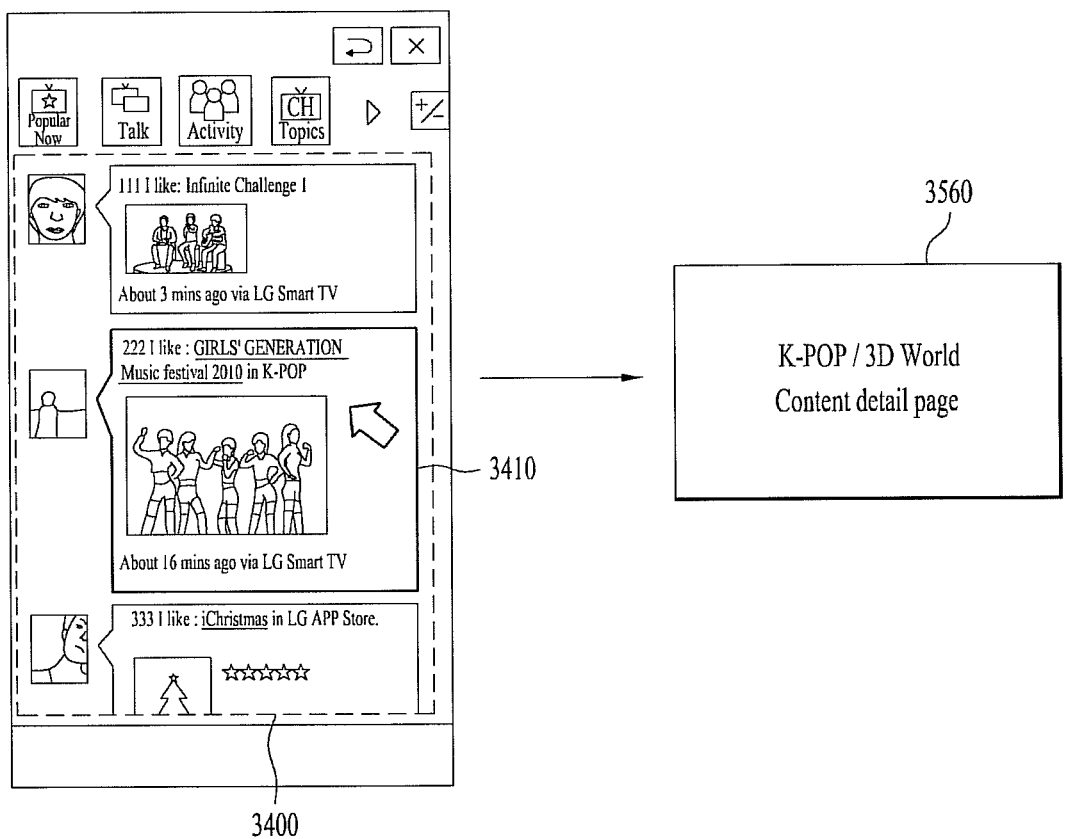
FIG. 35 is a diagram illustrating another exemplary embodiment of a screen on which a function associated with a feed is executed.

FIG. 35 is a diagram illustrating another exemplary embodiment of a screen on which a function associated with a feed is executed.

Referring to FIG. 35, upon detecting a user action for selecting a feed 3420 of the display page 3400, the controller 440 controls a screen 3560 to be displayed in response to the detected user action. The screen 3560 may be a screen on which content recommended by the feed 3420 is executed or a page for purchase is displayed. The content recommended by the feed 3420 is a music video entitled "Girls' Generation Tokyo Music Festival 2010".

Figure 36:
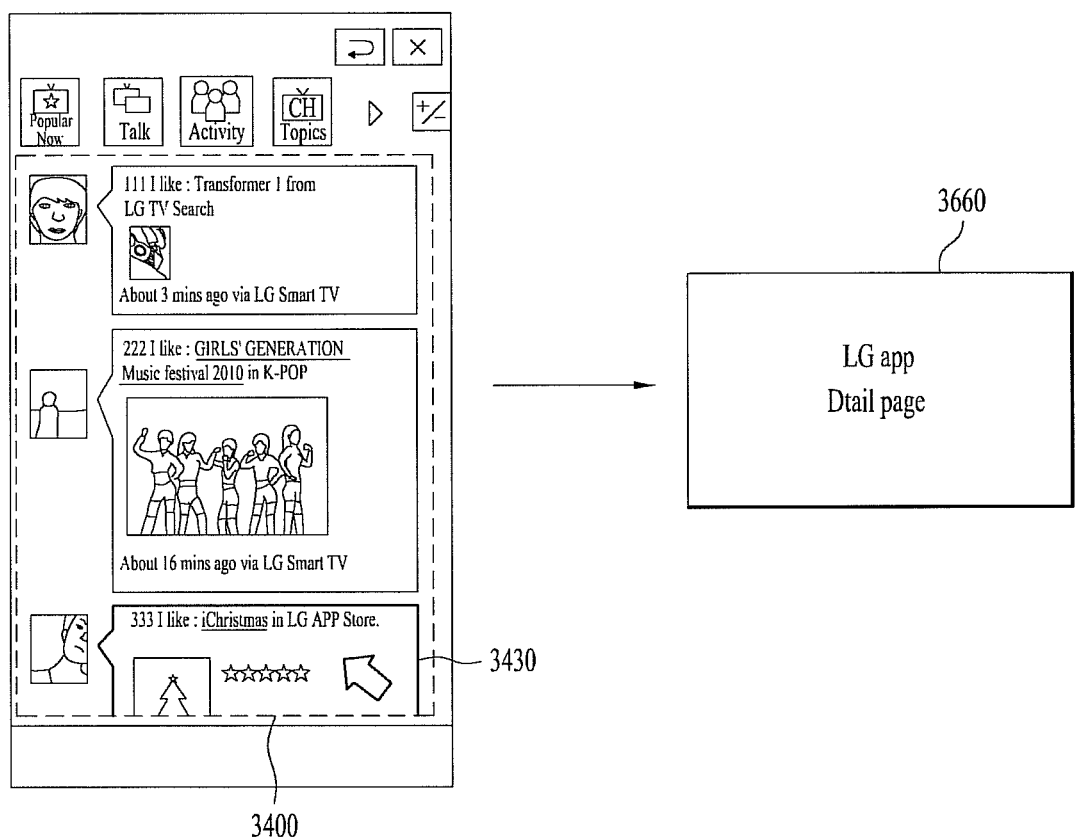
FIG. 36 is a diagram illustrating still another exemplary embodiment of a screen on which a function associated with a feed is executed.

FIG. 36 is a diagram illustrating still another exemplary embodiment of a screen on which a function associated with a feed is executed.

Referring to FIG. 36, upon detecting a user action for selecting a feed 3430 of the display page 3400, the controller 440 displays a screen 3660 to be displayed in response to the detected user action. The screen 3660 may be a screen on which content recommended by the feed 3430 is executed or a page for purchase is displayed. The content recommended by the feed 3430 is a web entitled "iChristmas".

Figure 37:
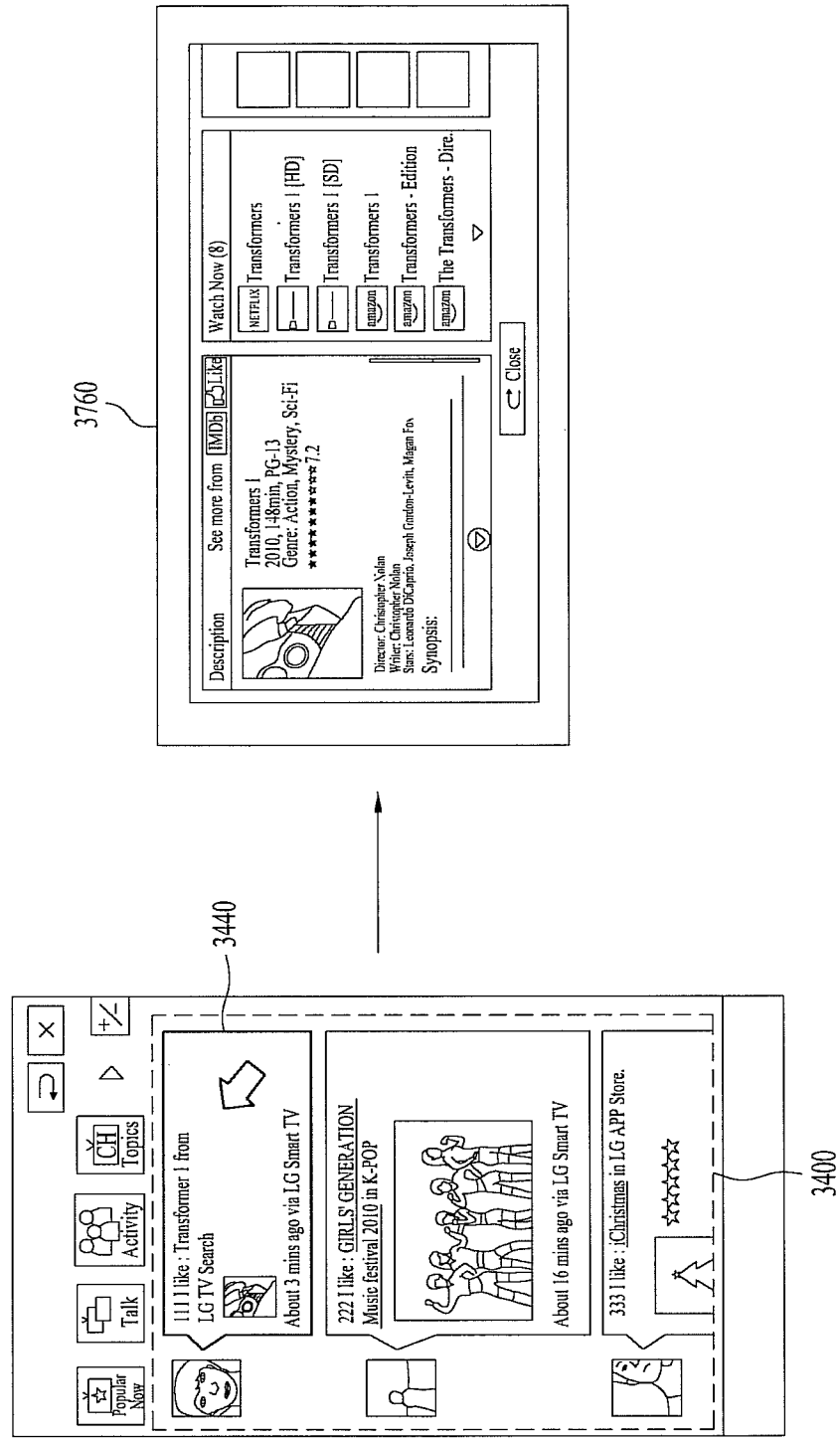
FIG. 37 is a diagram illustrating a further exemplary embodiment of a screen on which a function associated with a feed is executed.

FIG. 37 is a diagram illustrating a further exemplary embodiment of a screen executing a function associated with a feed.

Referring to FIG. 37, upon detecting a user action for selecting a feed 3440 of the display page 3400, the controller 440 controls a screen 3760 to be displayed in response to the detected user action. The screen 3760 may be a screen on which a page including a detailed description of content recommended by the feed 3440 is displayed. The content recommended by the feed 3440 is a web entitled "Transformer 1".

Figure 38:
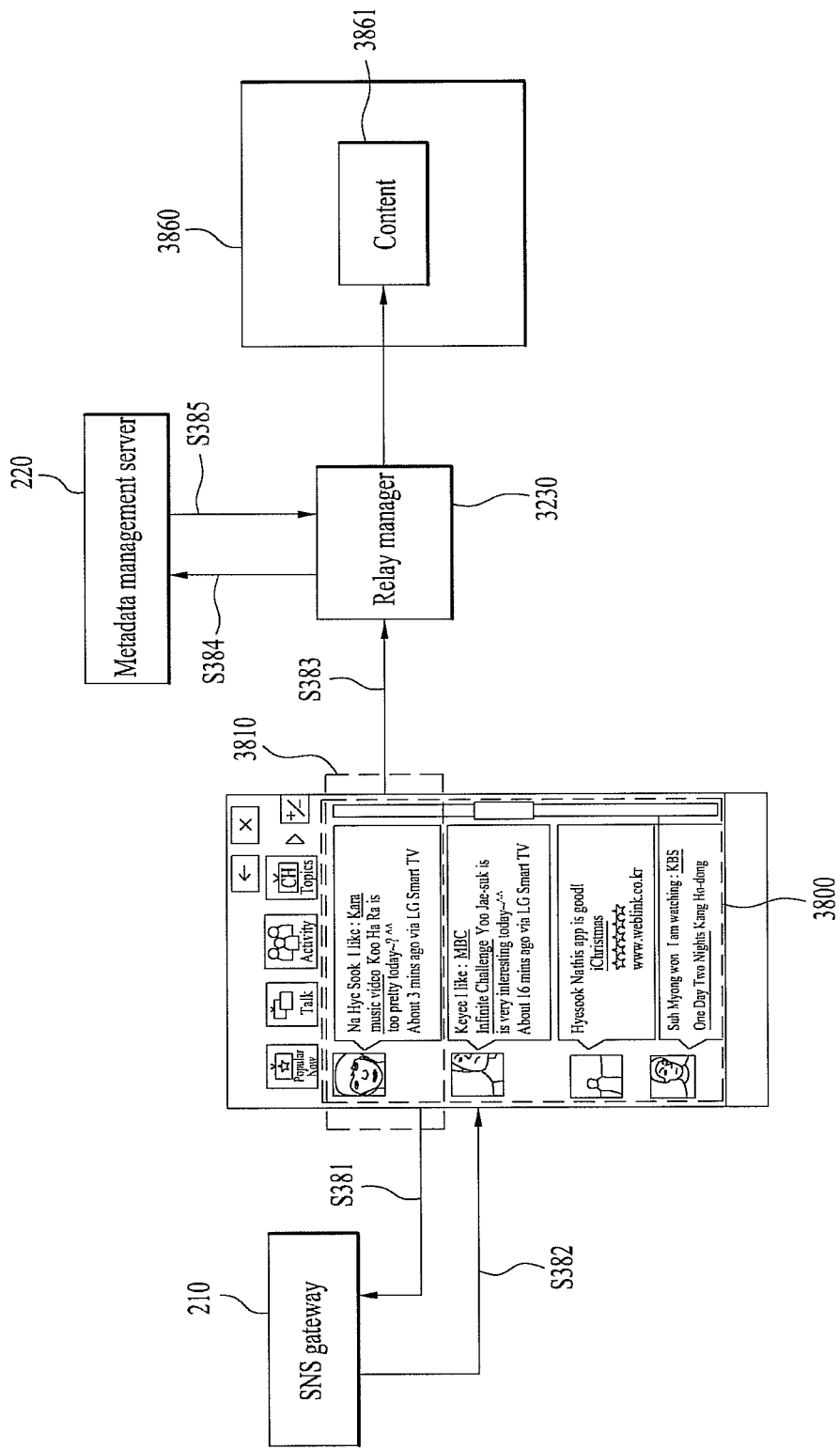
FIG. 38 is a diagram illustrating another exemplary embodiment of data flow in an execution process of a method for providing a content recommendation service according to the present invention.

FIG. 38 is a diagram illustrating another exemplary embodiment of data flow in an execution process of a method for providing a content recommendation service according to the present invention.

Referring to FIG. 38, the network interface 420 transmits a message for requesting a display page to an SNS gateway 210 (step S381).

The network interface 420 receives feed data or a display page from the SNS server 20 (step S382). The feed data may be data for displaying a feed related to a content post request message and the received display page may include a feed related to the content post request message. The feed may include details of recommendation for content displayed in step S330 of FIG. 33. A display page 3800 may include a feed for displaying the feed data received in step S382 or may be an image for displaying the display page received in step S382. Feeds of the display page 3800 may include respective associated metadata IDs.

In some embodiments, the network interface 420 may directly transmit the message for requesting a display page to an SNS server and may directly receive the display page 3800 from the SNS server as a response to the message.

The controller 440 detects a user action for selecting a feed 3810. The controller 440 transmits a metadata ID associated with the selected feed 3810 to a relay manager 3230 in response to the detected user action (step S383). The relay manager 3230 requests a metadata management server 210 to transmit metadata associated with the metadata ID.

The metadata management server 210 transmits the metadata associated with the metadata ID to the relay manager 3230 (step S385). The network interface 420 receives the metadata and transmits the metadata to the relay manager 3230.

The relay manager 3230 displays content 3861 on a screen 3860 using the received metadata. The screen 3860 may display at least one of a detailed description page of content, a search result, a content execution screen, or a content image frame. The screen 3860 may be one of the screen 2510 of FIG. 25, the screen 2610 of FIG. 26, and the screen 2710 of FIG. 27.

Figure 39:
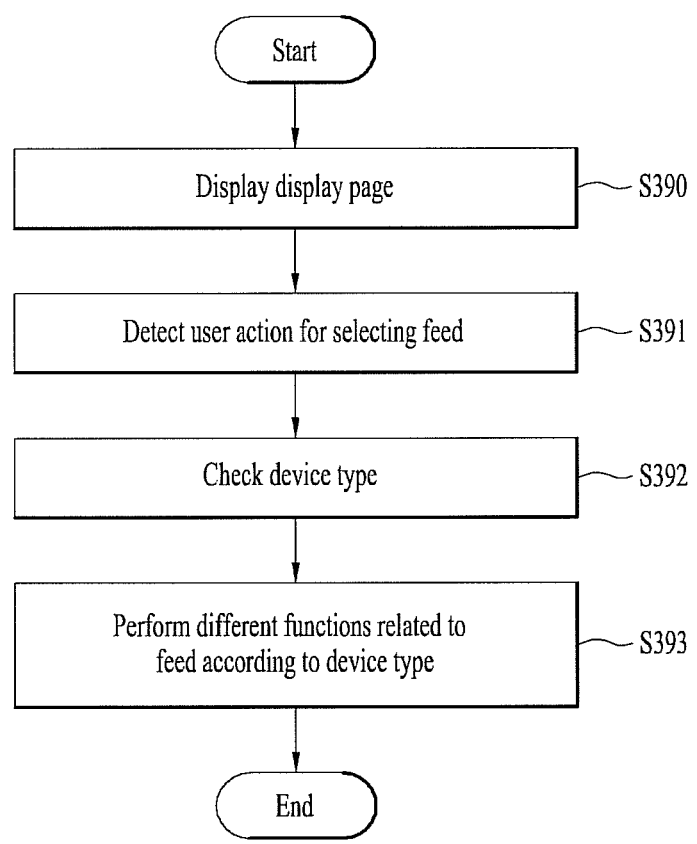
FIG. 39 is a flowchart illustrating an execution process of another exemplary embodiment of a method for providing a content recommendation service according to the present invention.

FIG. 39 is a flowchart illustrating an execution process of another exemplary embodiment of a method for providing a content recommendation service according to the present invention.

Referring to FIG. 39, the display 402 displays a display page (step S390). The display page may be received in step S338 of FIG. 33 or in step S382 of FIG. 38. The display page may include a feed for displaying the feed data received in step S338 of FIG. 33 and a feed for displaying the feed data received in step S382 of FIG. 38. The display page may also include the display page 2110 of FIG. 21, the display page 2535 of FIG. 25, the display page 2635 of FIG. 26, and the display page 2735 of FIG. 27.

The controller 440 detects a user action for selecting a feed included in the display page (step S391).

The controller 440 checks a device type in response to the detected user action (step S392). The device type may be at least one of a digital TV, a personal computer system, a notebook computer, or a mobile terminal.

The controller 440 performs different functions related to a feed according to a checking result (step S393). The functions related to feeds may include at least one of a function for displaying the real-time broadcast program described with reference to FIG. 34, a function for displaying a page for executing or purchasing music video content described with reference to FIG. 35, a function for displaying a page for executing or purchasing web content described with reference to FIG. 36, or a function for displaying a page including a detailed description of VOD content described with reference to FIG. 37.

For example, if a device type is a mobile terminal and a function of the selected feed is for displaying a real-time broadcast program, the controller 440 controls a message for requesting real-time broadcast program display to be transmitted to a digital TV. The message may include metadata which is received in step S385 of FIG. 38. If a device type is a digital TV and a function of the selected feed is for displaying a real-time broadcast program, the controller 440 controls the display 402 to display the real-time broadcast program.

Figure 40:
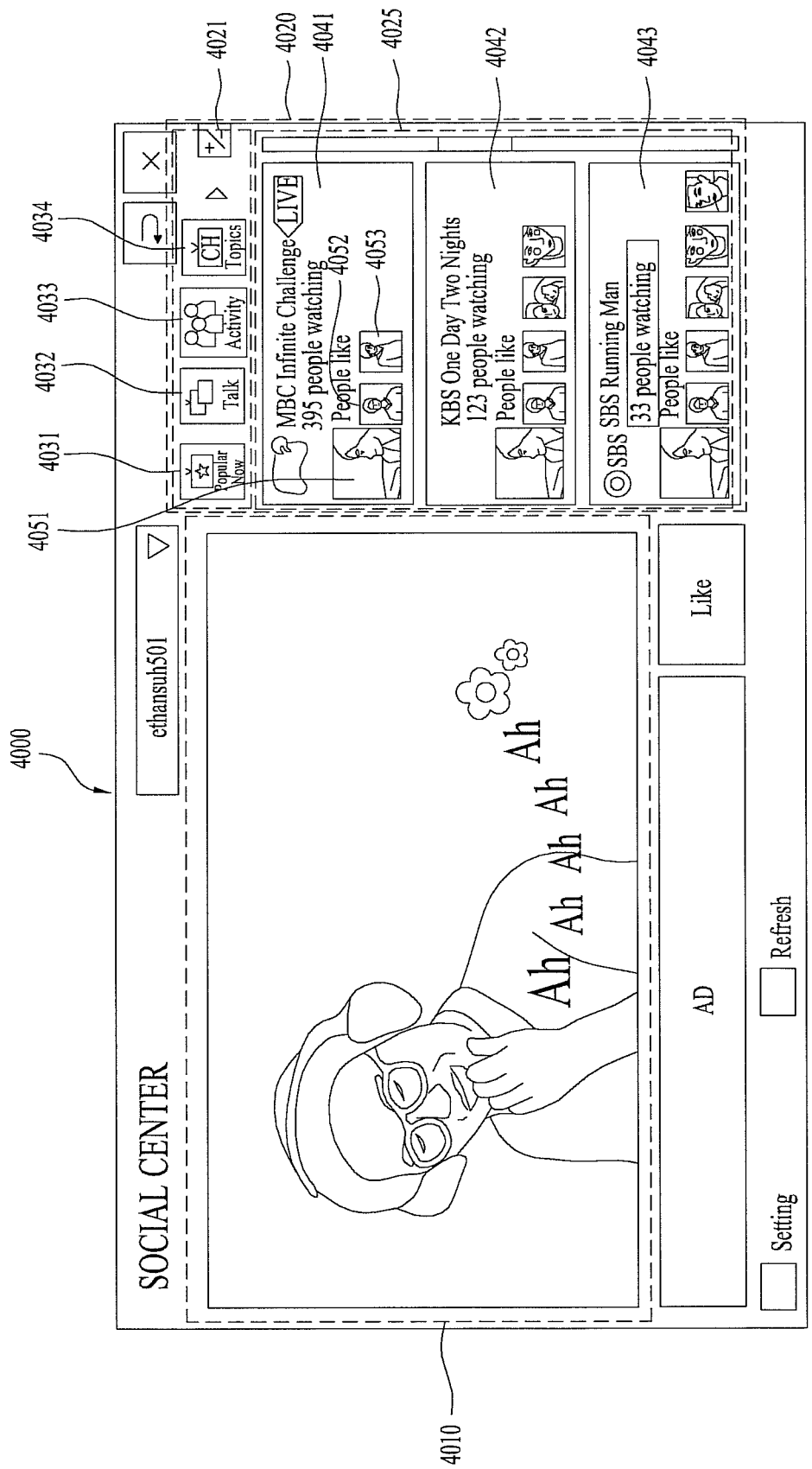
FIG. 40 is a diagram illustrating an exemplary embodiment of a screen on which view information is displayed on a display page.

FIG. 40 is a diagram illustrating an exemplary embodiment of a screen on which view information is displayed on a display page.

Referring to FIG. 40, the display 420 displays a screen 4000. Upon detecting a user action for requesting a broadcast rank, the controller 440 controls the screen 4000 to be displayed in response to the detected user action.

The screen 4000 may include a content display region 4010 and an active region 4020. The content display region 4010 displays content. The active region 4020 may include a menu region 4021 for selecting an SNS server or services and a page region 4025 for displaying a display page related to the services. The menu region 4021 includes icons 4031, 4032, 4033, and 4034 for selecting specific services and the page region 4025 displays feeds 4041, 4042, and 4043 included in the display page. A user action for requesting broadcast rank may be an action for selecting the icon 4031 for selecting a Popular Now service. The Popular Now service refers to a service for providing view information.

The feeds 4041, 4042, and 4034 include the number of users who view real-time broadcast programs associated with the respective feeds. The number of users of the feed 4041 is 395, the number of users of the feed 4042 is 123, and the number of users of the feed 4043 is 33. The number of users may be the number of users of a social networking environment who view a real-time broadcast related to the feed in one country. According to the number of users, the feeds 4041, 4042, and 4043 may be displayed in arrangement of descending or ascending order.

The feeds 4041, 4042, and 4043 include lists of users who have recommended related real-time broadcast programs. For example, the feed 4041 enumerates photos 4051, 4052, and 4053 included in the user lists. The user lists include at least one of user photos or user SNS accounts.

The feeds 4041, 4042, and 4040 include broadcast information about related real-time broadcast programs. The broadcast information includes at least one of a channel name, a major channel number, a minor channel number, a broadcast program name, a broadcast start time, or a broadcast end time. For example, the feed 4041 includes a channel name of a real-time broadcast program entitled "Endless Challenge", a major channel number, a minor channel number, a broadcast start time, and a broadcast end time. The broadcast information may further include at least one of country information or region information.

Figure 41:
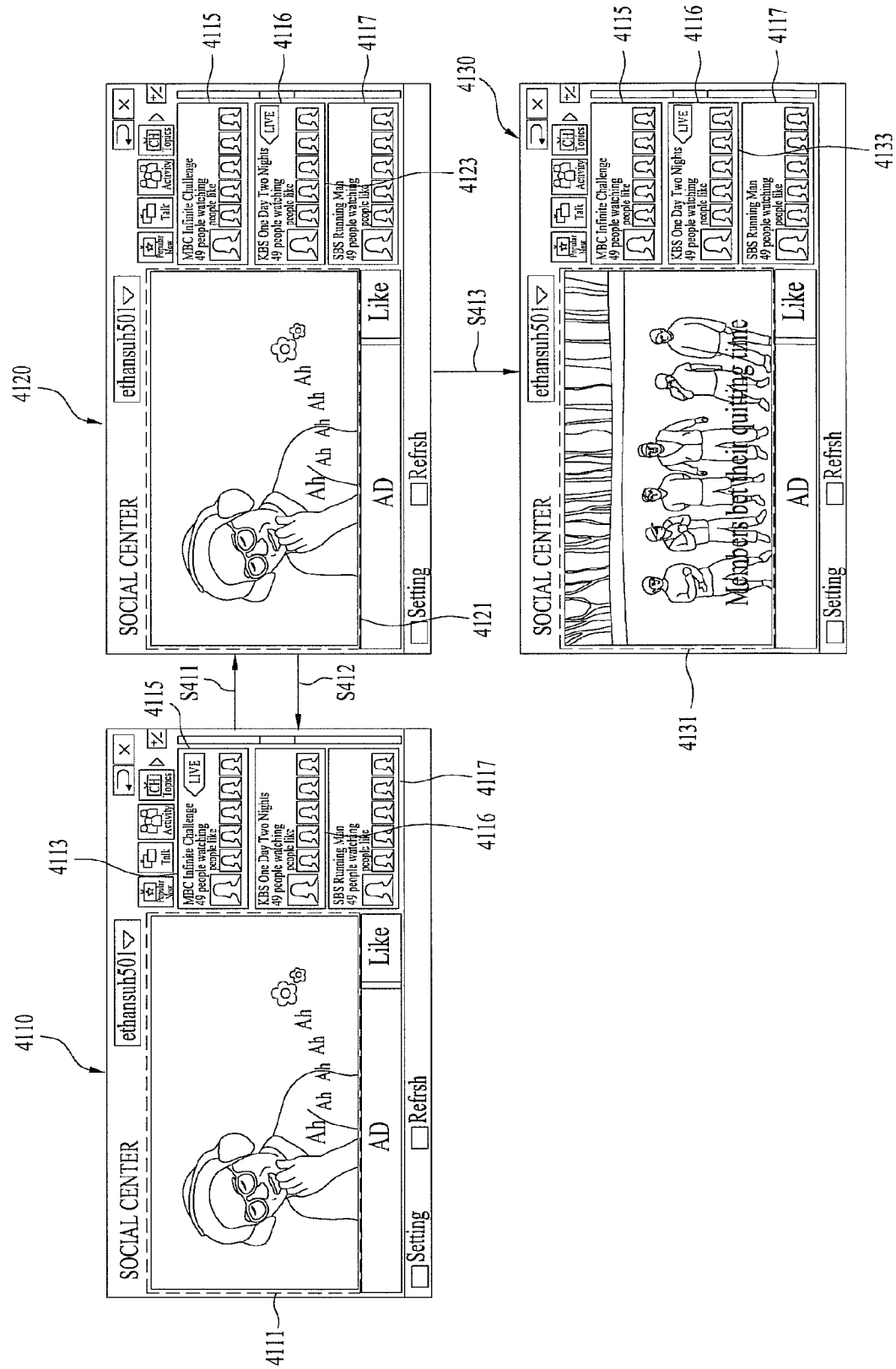
FIG. 41 is a diagram explaining a real-time broadcast program switching process according to feed selection on a display page including view information.

FIG. 41 is a diagram explaining a real-time broadcast program switching process according to feed selection on a display page including view information.

Referring to FIG. 41, upon detecting a user action for selecting a feed 4115, the controller 440 controls a real-time broadcast program related to the feed 4115 to be displayed in a content display area 4111.

Under the state that the screen 4110 is displayed, the controller 440 detects a user action for selecting a down key (step S411). The controller 440 shifts an indicator 4113 located at the feed 4115 to a feed 4116 and the display 402 displays a screen 4120. The real-time broadcast program displayed on the content display region 4111 is continuously displayed in a content display region 4121. The feed 4115 associated with the real-time broadcast program displayed in the content display region 4111 has a background color distinguishable from other feeds 4116 and 4117.

Under the state that the screen 4120 is displayed, the controller 440 detects a user action for selecting an up key (step S412). In response to the detected, user action, the controller 440 shifts an indicator 4123 to the location 4113 and the display 402 displays the screen 4110.

Under the state the screen 4120 is displayed, the controller 440 detects a user action for selecting a selection key (e.g. OK key) (step S413). In response to the detected user action, the display 402 displays a screen 4130. A real-time broadcast program region 4131 displays a real-time broadcast program related to the feed 4116. The color of the feed 4116 is changed to a color distinguishable from the feeds 4115 and 4116. The color of the feed 4115 is changed to the same color as a background color of the feed 4117.

Figure 42:
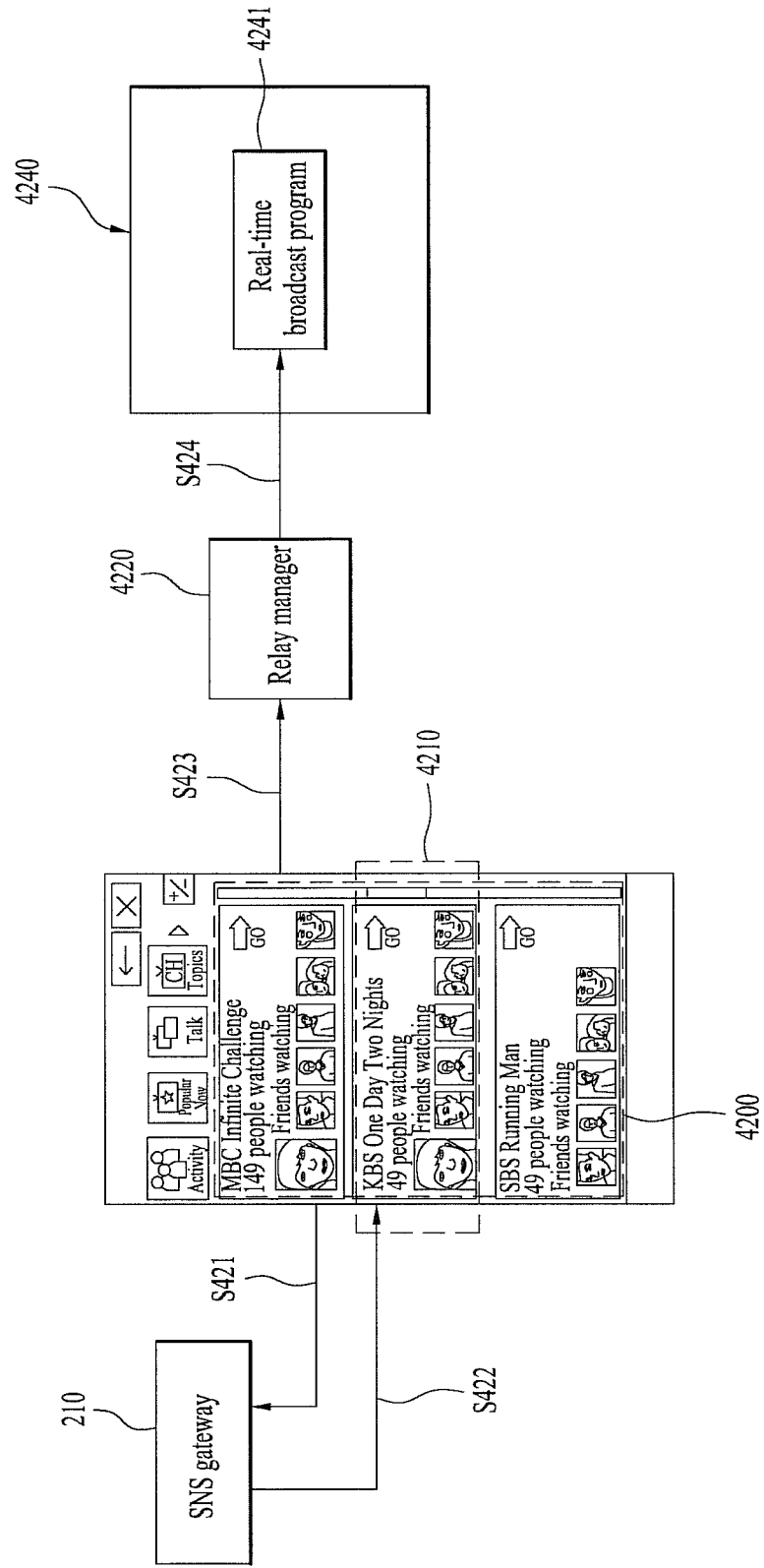
FIG. 42 is a diagram illustrating an exemplary embodiment of data flow in an execution process of a method for providing view information according to the present invention.

FIG. 42 is a diagram illustrating an exemplary embodiment of data flow in an execution process of a method for providing view information according to the present invention.

Referring to FIG. 42, the network interface 420 transmits a message for requesting a broadcast rank to an SNS gateway 210 (step S421). The SNS gateway 210 transmits feed data or a display page as a response to the message.

The network interface 420 receives the feed data or the display page transmitted by the SNS gateway 210 (step S422). The received data may be for displaying the feeds included in the display page 4025 of FIG. 40 and the received display page may be the display page 4025 of FIG. 40. A display page 4200 may be an image of the received display page displayed on a screen.

The controller 440 detects a user action for selecting a feed 4210. A scheme for selecting the feed 4210 may be the above-described scheme in FIG. 41.

In response to the detected user action, the controller 440 transmits broadcast information about a real-time broadcast program associated with the selected feed 4210 to a relay manager 4220 (step S423). The broadcast information may include at least one of a channel name, a major channel number, a minor channel number, a start time, or an end time.

The relay manager 4220 receives the broadcast information transmitted by the controller 440, stops content displayed in a content display region, and controls a real-time broadcast program 4241 indicated by the received broadcast information to be displayed on a screen 4240 (step S424). The screen 4240 may be one of the screen 4110 or 4130 of FIG. 41.

Figure 43:
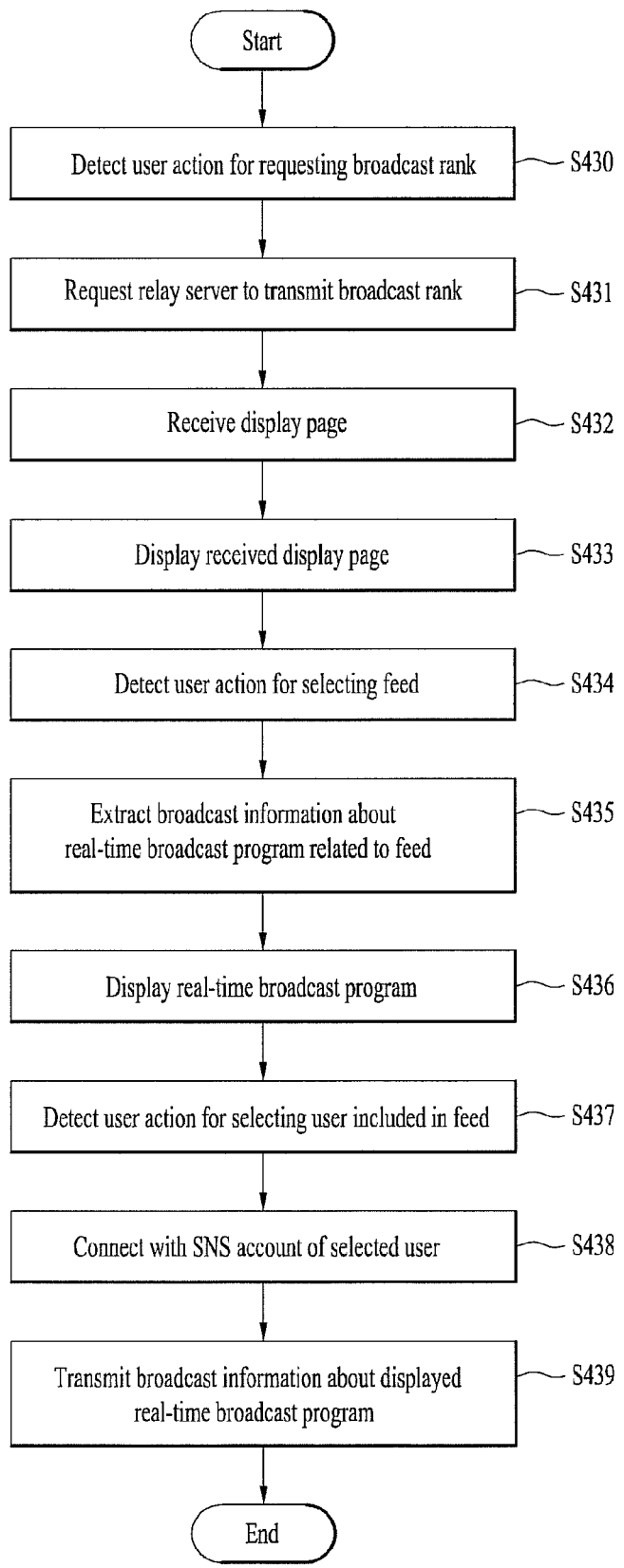
FIG. 43 is a flowchart illustrating an exemplary embodiment of an execution process of a method for providing view information according to the present invention.

FIG. 43 is a flowchart illustrating an exemplary embodiment of an execution process of a method for providing view information according to the present invention.

Referring to FIG. 43, the controller 440 detects a user action for requesting broadcast rank (step S430). The user action may be an action for selecting the icon 4031 of FIG. 40.

In response to the detected user action, the controller 440 requests the relay server 10 to transmit broadcast rank (step S431). The relay server 10 generates a display page including at least one feed associated with a real-time broadcast program in response to the request and transmits the generated display page. The relay server 10 may generate feed data for displaying the feed and generate the display page including the generated feed data. One of the at least one feed includes the number of users who view the associated real-time broadcast program. The number of users may be the number of users of a social networking environment who view the real-time broadcast related to the feed in one country.

The feed further includes a list of users who recommend the real-time broadcast program. The user list includes at least one of user photos or user SNS accounts. The feed further includes broadcast information about the real-time broadcast program. The broadcast information includes at least one of a channel number, a major channel number, a minor channel number, a broadcast program name, a broadcast start time, or a broadcast end time.

In some embodiments, the relay server 10 may transmit feed data to the electronic device 400 without generating the display page. In this case, the electronic device 400 may generate or update a display page using the feed data received from the relay server 10 and display the generated or updated display page.

In some embodiments, the relay server 10 may transmit the display page or the feed data through a broadcast or multicast scheme. In this case, the electronic device 400 may receive the display page or feed data by accessing an address to which the display page or feed data is broadcast or multicast. Here, the address may include at least one of an IP address, a port number, or a URL.

In some embodiments, the electronic device 400 may access a specific address in step S431 and receive the feed data and the display page through the accessed address. The address may include at least one of an IP address, a port number, or a URL.

The network interface 420 receives the display page transmitted by the relay server 10 (step S432).

The display 402 displays the received display page (step S433). Feeds of the displayed display page may be arranged based on the number of users. The displayed display page may be one of the display page 4025 of FIG. 40 and the display page 4200 of FIG. 42.

The controller 440 detects a user action for selecting a feed (step S434). A user may take the user action by the above-described scheme in FIG. 41.

In response to the detected user action, the controller 440 may extract broadcast information about a real-time broadcast program associated with the selected feed. The extracted broadcast information may include at least one of a channel name, a major channel number, a minor channel number, a start time, or an end time.

The tuner 405 tunes to a channel indicated by the extracted broadcast information and receives a real-time broadcast program indicated by the broadcast information through the channel. The display 402 displays the received real-time broadcast program (step S436). The display 402 may display the screen 4110 or 4130 of FIG. 41.

The controller 440 detects a user action for selecting a user included in the feed. The user action may be an action for selecting the thumbnail 4051 of FIG. 40.

The controller 440 controls connection with an SNS account of the selected user (step S438). Though such connection, the user of the electronic device 400 may chat with the selected user, exchange messages with the selected user, and view the program together with the selected user.

The network interface 420 transmits broadcast information about the real-time broadcast program displayed on a screen to the relay server 10 (step S439). The controller 440 may control the broadcast information to be transmitted when the real-time broadcast program is displayed for a time exceeding a preset time. The broadcast information may include at least one of a channel name, a major channel number, a minor channel number, a broadcast program name, a broadcast start time, or a broadcast end time. The broadcast information may further include at least one of country information or region information. The relay server 10 receives the broadcast information and calculates the number of users who view each real-time broadcast program based on the received broadcast information. The relay server 10 generates a display page including a feed related to each real-time broadcast program using the broadcast information and the calculated number of users.

Figure 44:
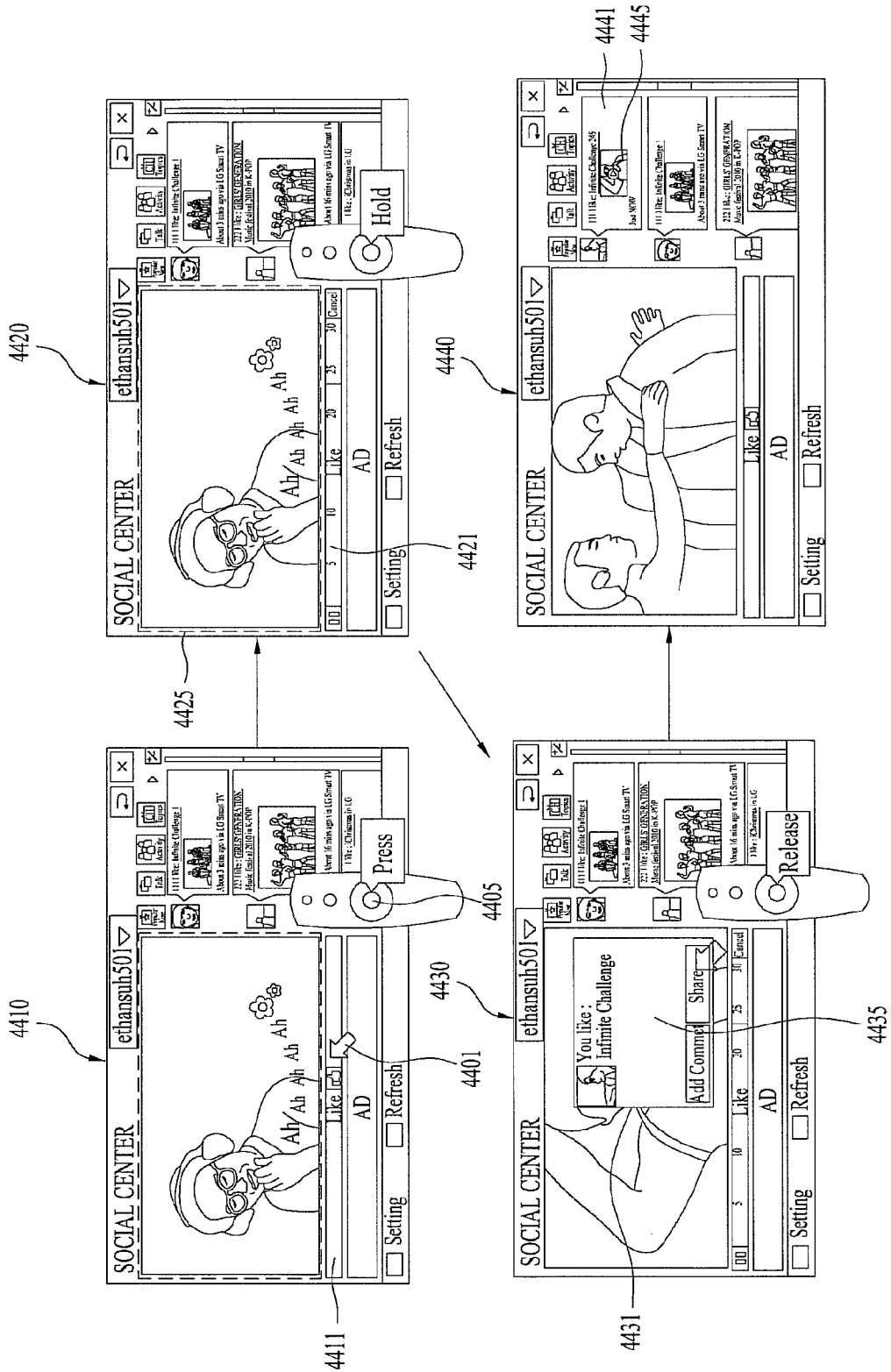
FIG. 44 is a diagram illustrating an exemplary embodiment of screens displayed in a process of recording part of displayed content.

FIG. 44 is a diagram illustrating an exemplary embodiment of screens displayed in a process of recording part of displayed content.

Referring to FIG. 44, the display 402 displays a screen 4410. A pointer 4401 on the screen 4410 is located over a "Like" button 4411.

Under the state that the screen 4410 is displayed, the controller 440 detects a user action for pressing a button for content recommendation. The button for content recommendation may be an "OK" button 4405.

The display 402 displays a screen 4420. The screen 4420 includes a progress bar 4421 indicating a recording progress state. The progress bar 4421 may be displayed when the button 4405 for content recommendation is pressed for a time exceeding a preset time. While the button 4405 for content recommendation continues to be pressed, the controller 440 stores an image frame of content displayed in the content display region 4425 of the screen 4420 in the storage unit 445.

The display 402 displays a screen 4430. The screen 4430 displays a content recommendation confirmation message 4431. The content recommendation confirmation message 4431 includes a button 4435 for viewing a recorded part. Upon detecting a user action for releasing content recommendation, the controller 440 stops storing the image frame in response to the detected user action and controls the content recommendation confirmation message 4431 to be displayed. The controller 440 may generate a media file or a video file including the image frame stored in the storage unit 445.

The display 402 displays a screen 4440. The screen 4440 displays a feed 4441 for recommending content displayed in the screens 4410, 4420, and 4430. The feed 4441 includes a selection button 4445 for selecting the generated video file or media file.

Figure 45:
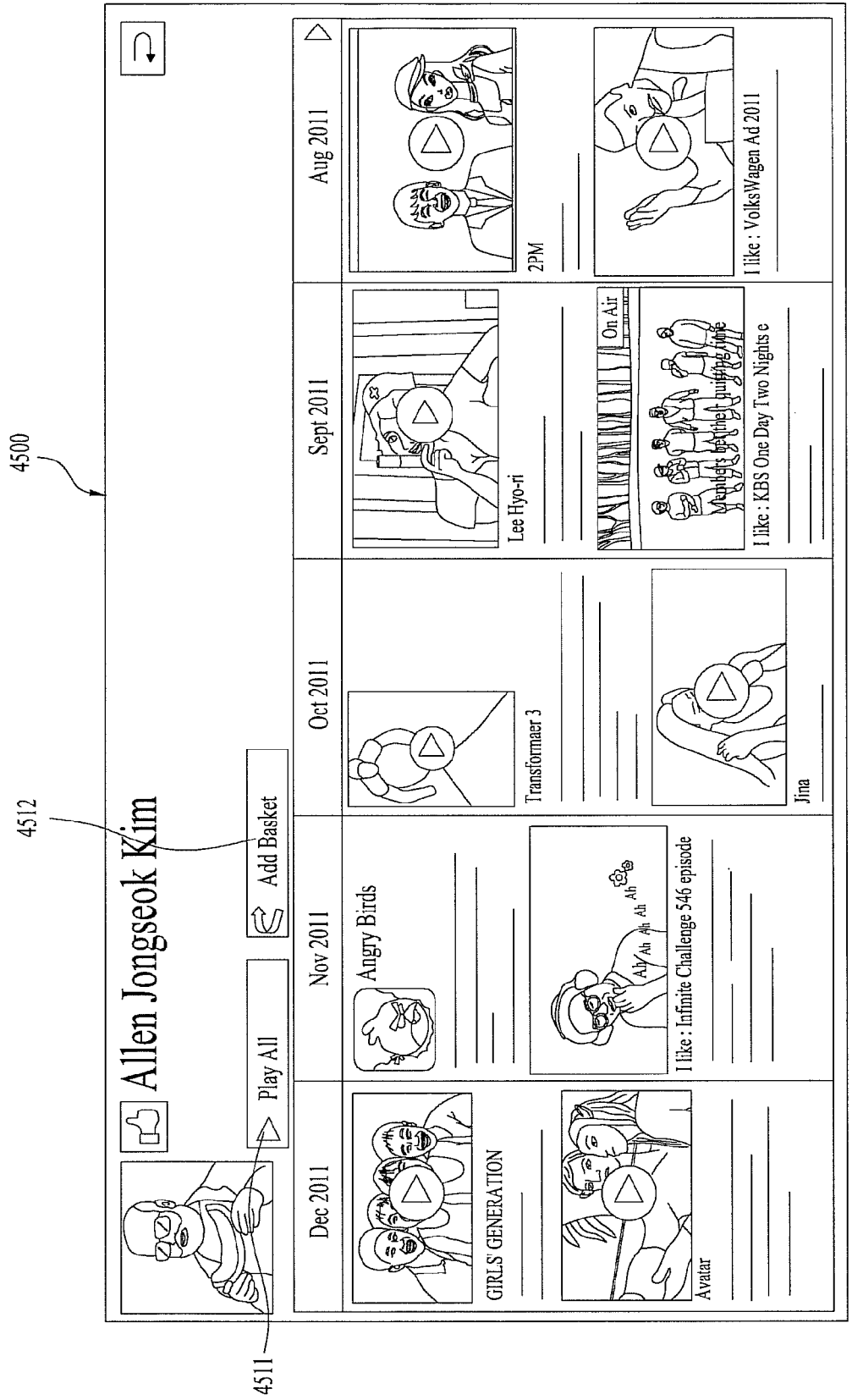
FIG. 45 is a diagram illustrating an exemplary embodiment of an activity electronic program guide.

FIG. 45 is a diagram illustrating an exemplary embodiment of an activity electronic program guide.

Referring to FIG. 45, an activity electronic program guide 4500 displays feeds generated on a month basis (e.g. December 2011, November 2011, October 2011, September 2011, and August 2011). The feeds relate to recommended content.

The activity electronic program guide 4500 includes a Play All button 4511 and an Add Basket button 4512. A user may take an action for selecting the Play All button 4511 of the activity electronic program guide 4500 so that content related to the feeds of the activity electronic program guide 4500 can be consecutively executed or displayed. A user may take an action for selecting the Add Basket button 4512 so that content related to the feeds of the activity electronic program guide 4500 can be stored in the storage unit 445 or a preset storage space of a web.

The electronic device 400 may generate the activity electronic program guide 4500 using a display page transmitted by an SNS server. In some embodiments, the relay server 10 may generate the activity electronic program guide 4500 using a content post request message received from the electronic device 400 or a display page transmitted by an SNS server. In some embodiments, the SNS server may generate the activity electronic program guide 4500 and provide the activity electronic program guide 4500 to the electronic device 400.

Figure 46:
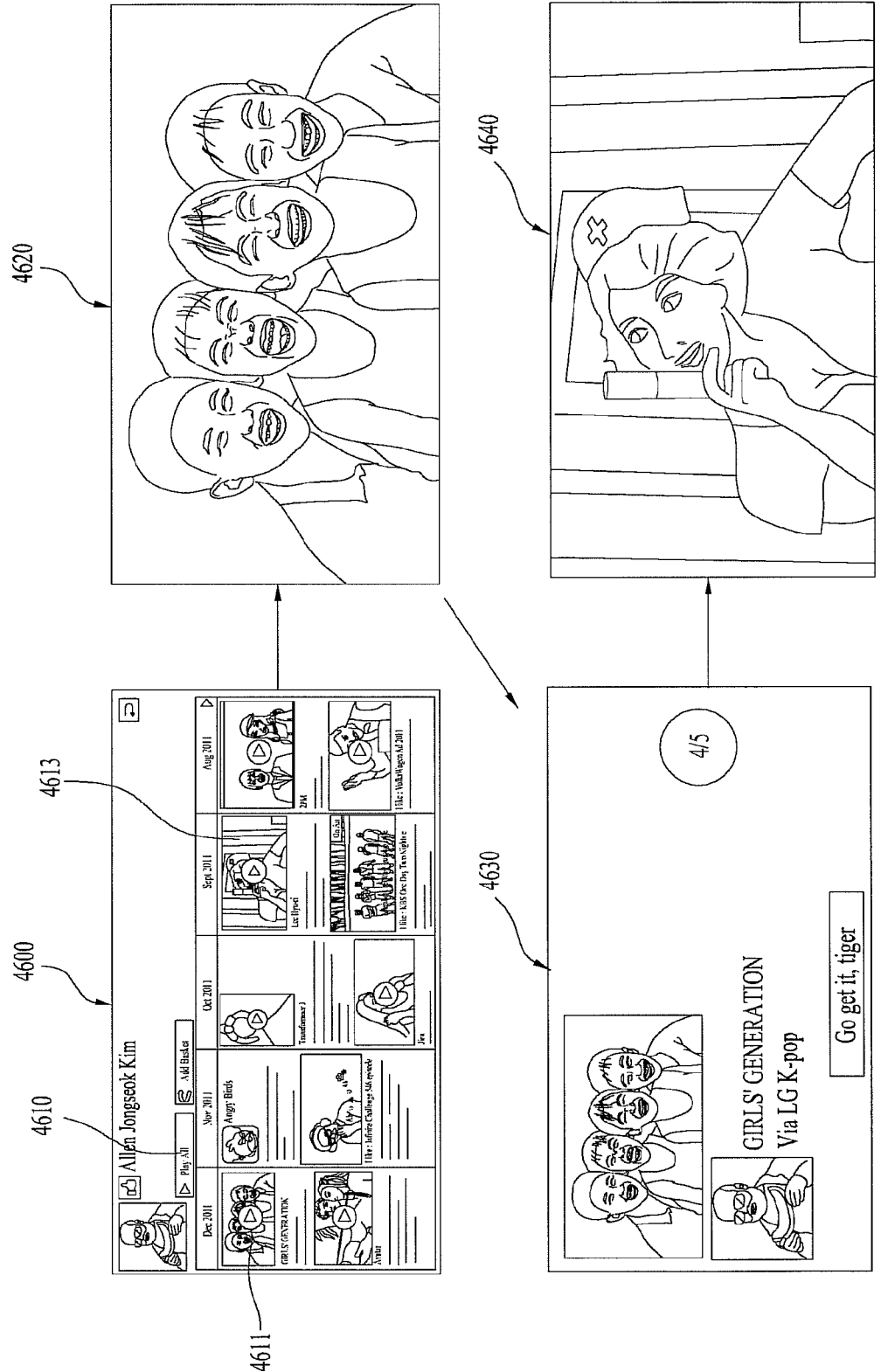
FIG. 46 is a diagram explaining an exemplary embodiment of a process of displaying content introduced in an activity electronic program guide.

FIG. 46 is a diagram explaining an exemplary embodiment of a process of displaying content introduced in an activity electronic program guide.

Referring to FIG. 46, upon detecting a user action for selecting a Play All button 4610 of an activity electronic program guide 4600, the controller 440 controls a screen 4620 to be displayed in response to the detected user action.

The screen 4620 is a screen on which content associated with a feed 4611 is displayed. If content display is completed, a screen 4630 is displayed. The screen 4630 is a screen on which a page including a detailed description of the content is displayed.

Under that state that the screen 4630 is displayed, the controller 440 controls content associated with another feed to be automatically displayed when no user action is detected for a preset time. A screen 4640 is a screen on which content related to a feed 4613 is displayed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for providing information between users of a social networking environment, comprising:
   receiving feed data for displaying a plurality of feeds associated with a plurality of real-time broadcast programs, wherein one of the plurality of feeds includes information regarding a total number of users viewing the associated real-time broadcast programs;
   determining a broadcast rank based on a total number of users viewing the associated real-time broadcast programs;
   displaying the broadcast rank along with simultaneously displaying the plurality of feeds on a screen, wherein the plurality of feeds are displayed in an activity electronic program guide generated on a month basis, wherein the activity electronic program guide includes feeds that are reproduced directly by selecting a play button; and
   recording the plurality of feeds directly by pressing a button, on a remote control, corresponding to a content recommendation.

2. The method of claim 1, wherein the at least one of the displayed feeds is displayed on the screen of a television.

3. The method of claim 2, wherein the television includes a first input receiver to provide a signal having a first protocol and a second input receiver to provide a signal having a second protocol.

4. The method of claim 1, wherein the information regarding the total number of users includes a total number of users logged in to a server.

5. The method of claim 1, wherein the information regarding the total number of users includes information regarding users watching the associated real-time broadcast programs.

6. The method of claim 1, wherein the information regarding the total number of users includes information regarding users who like the associated real-time broadcast programs.

7. An electronic device for providing information between users of a social networking environment, comprising:
   a network interface for receiving feed data for displaying a plurality of feeds associated with a plurality of real-time broadcast programs, wherein one of the plurality of feeds includes information regarding a total number of users viewing the associated real-time broadcast programs;
   a controller for controlling reception of the feed data and determining a broadcast rank based on the total number of users viewing the associated real-time broadcast programs;
   a display for displaying the broadcast rank along with simultaneously displaying the plurality of feeds, wherein the plurality of feeds are displayed in an activity electronic program guide generated on a month basis, wherein the activity electronic program guide includes feeds that are reproduced directly by selecting a play button; and
   a user interface for recording the plurality of feeds directly by pressing a button, on a remote control, corresponding to a content recommendation.

8. The electronic device of claim 7, further comprising a tuner for receiving a real-time broadcast program.

9. The electronic device of claim 7, wherein the information regarding the total number of users includes a total number of users logged in to a server.

10. The electronic device of claim 7, wherein the information regarding the total number of users includes information regarding users watching the associated real-time broadcast programs.

11. The electronic device of claim 7, wherein the information regarding the total number of users includes information regarding users who like the associated real-time broadcast programs.

* * * * *